(12) United States Patent
Heo

(10) Patent No.: US 6,449,227 B1
(45) Date of Patent: Sep. 10, 2002

(54) DVD-AUDIO DISK, AND APPARATUS AND METHOD FOR PLAYING THE SAME

(75) Inventor: Jung-Kwon Heo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/047,363

(22) Filed: Mar. 25, 1998

Related U.S. Application Data

(63) Continuation-in-part of application No. 08/921,082, filed on Aug. 29, 1997, now abandoned.

(30) Foreign Application Priority Data

Mar. 25, 1997 (KR) .......................................... 97/10330
Oct. 9, 1997 (KR) .......................................... 97/51861

(51) Int. Cl.[7] .................................................. G11B 5/09
(52) U.S. Cl. .................................. 369/47.15; 369/275.3
(58) Field of Search ........................... 369/47.13, 47.15, 369/47.16, 47.19, 47.2, 47.21, 47.28, 47.35, 53.2, 53.24, 53.41, 59.13, 59.14, 59.21, 59.23, 59.25

(56) References Cited

U.S. PATENT DOCUMENTS

| | | | |
|---|---|---|---|
| 5,336,844 A | 8/1994 | Yamauchi et al. | |
| 5,778,142 A | 7/1998 | Taira et al. | |
| 5,949,955 A | 9/1999 | Nakai | |
| 5,960,152 A | 9/1999 | Sawabe et al. | |
| 5,978,762 A | 11/1999 | Smyth et al. | |
| 5,987,417 A | * 11/1999 | Heo et al. ................. | 369/59.21 |
| 6,023,552 A | 2/2000 | Kunihiro | |
| 6,272,082 B1 | 8/2001 | Ishii et al. | |
| 6,308,006 B1 | 10/2001 | Yamamoto et al. | |
| 6,222,805 B1 | 4/2002 | Mori et al. | |

OTHER PUBLICATIONS

U.S. patent application Ser. No. 09/526,275, Heo, filed Mar. 15, 2000.
U.S. patent application Ser. No. 09/908,558, Heo, filed Jul. 20, 2001.
U.S. patent application Ser. No. 08/797,290, Heo et al., filed Feb. 7, 1997.

* cited by examiner

Primary Examiner—Paul W. Huber
(74) Attorney, Agent, or Firm—Staas & Halsey LLP

(57) ABSTRACT

A DVD-Audio which includes a data zone for storing data to be reproduced and an information zone for storing information on the data to be reproduced. The information zone includes directories of a video title set (VIDEO_TS) and an audio title set (AUDIO_TS). The AUDIO_TS directory includes information on an audio manager (AMG) having information on audio titles. The data zone includes the audio titles each having an audio title set information (ATSI) followed by a plurality of contiguous audio objects (AOBs). The ATSI includes a plurality of audio stream attributes each having an audio coding mode, first to third quantization bit numbers, first to third sampling frequencies and decoding algorithm information relating to the number of audio channels. Each of the AOBs includes a plurality of audio packs recorded with audio data corresponding to the decoding algorithm stored in the audio stream attribute.

33 Claims, 44 Drawing Sheets

FIG. 6

| VIDEO TITLE SET INFORMATION (VTSI) |
|---|
| VIDEO OBJECT SET FOR VIDEO TITLE SET MENU (VTSM_VOBS) |
| VIDEO OBJECT SET FOR VIDEO TITLE SET TITLE (VTSTT_VOBS) |
| BACKUP OF VIDEO TITLE SET INFORMATION (VTSI_BUP) |

| |
|---|
| VIDEO TITLE SET INFORMATION MANAGEMENT TABLE (VTSI_MAT) |
| VIDEO TITLE SET PART_OF_TITLE SEARCH POINTER TABLE (VTS_PTT_SRPT) |
| VIDEO TITLE SET PROGRAM CHAIN INFORMATION TABLE (VTS_PGCIT) |
| VIDEO TITLE SET MENU PGCI UNIT TABLE (VTSM_PGCI_UT) |
| VIDEO TITLE SET TIME MAP TABLE (VTS_TMAPT) |
| VIDEO TITLE SET MENU CELL ADDRESS TABLE (VTSM_C_ADT) |
| VIDEO TITLE SET MENU VIDEO OBJECT UNIT ADDRESS MAP (VTSM_VOBU_ADMAP) |
| VIDEO TITLE SET CELL ADDRESS TABLE (VTS_C_ADT) |
| VIDEO TITLE SET VIDEO OBJECT UNIT ADDRESS MAP (VTS_VOBU_ADMAP) |

VTSI_MAT

| RBP | | CONTENTS | NUMBER OF BYTES |
|---|---|---|---|
| 0 TO 11 | VTS_ID | VTS IDENTIFIER | 12BYTES |
| 12 TO 15 | VTS_EA | END ADDRESS OF VTS | 4BYTES |
| 16 TO 27 | RESERVED | RESERVED | 12BYTES |
| 28 TO 31 | VTSI_EA | END ADDRESS OF VTSI | 4BYTES |
| 32 TO 33 | VERN | VERSION NUMBER OF DVD VIDEO SPECIFICATION | 2BYTES |
| 34 TO 37 | VTS_CAT | VTS CATEGORY | 90BYTES |
| 38 TO 127 | RESERVED | RESERVED | 4BYTES |
| 128 TO 131 | VTSI_MAT_EA | END ADDRESS OF VTSI_MAT | 60BYTES |
| 132 TO 191 | RESERVED | RESERVED | 4BYTES |
| 192 TO 195 | VTSM_VOBS_SA | START ADDRESS OF VTSM_VOBS | 4BYTES |
| 196 TO 199 | VTSTT_VOBS_SA | START ADDRESS OF VTSTT_VOBS | 4BYTES |
| 200 TO 203 | VTS_PTT_SRPT_SA | START ADDRESS OF VTS_PTT_SRPT | 4BYTES |
| 204 TO 207 | VTS_PGCIT_SA | START ADDRESS OF VTS_PGCIT | 4BYTES |
| 208 TO 211 | VTSM_PGCI_UT_SA | START ADDRESS OF VTSM_PGCI_UT | 4BYTES |
| 212 TO 215 | VTS_TMAPT_SA | START ADDRESS OF VTS_TMAPT | 4BYTES |
| 216 TO 219 | VTSM_C_ADT_SA | START ADDRESS OF VTSM_C_ADT | 4BYTES |
| 220 TO 223 | VTSM_VOBU_ADMAP_SA | START ADDRESS OF VTSTT_VOBU_ADMAP | 4BYTES |
| 224 TO 227 | VTS_C_ADT_SA | START ADDRESS OF VTS_C_ADT | 4BYTES |
| 228 TO 231 | VTS_VOBU_ADMAP_SA | START ADDRESS OF VTS_VOBU_ADMAP | 4BYTES |
| 232 TO 255 | RESERVED | RESERVED | 24BYTES |
| 256 TO 257 | VTSM_V_ATR | VIDEO ATTRIBUTE OF VTSM | 2BYTES |
| 258 TO 259 | VTSM_AST_Ns | NUMBER OF AUDIO STREAMS OF VTSM | 2BYTES |
| 260 TO 267 | VTSM_AST_ATR | AUDIO STREAM ATTRIBUTE OF VTSM | 8BYTES |
| 268 TO 323 | RESERVED | RESERVED | 56BYTES |
| 324 TO 339 | RESERVED | RESERVED | 16BYTES |
| 340 TO 341 | VTSM_SPST_Ns | NUMBER OF SUB-PICTURE STREAMS OF VTSM | 2BYTES |
| 342 TO 347 | VTSM_SPST_ATR | SUB-PICTURE STREAMS ATTRIBUTE TABLE OF VTSM | 6BYTES |
| 348 TO 511 | RESERVED | RESERVED | 164BYTES |
| 512 TO 513 | VTS_V_ATR | VIDEO ATTRIBUTE OF VTS | 2BYTES |
| 514 TO 515 | VTS_AST_Ns | NUMBER OF AUDIO STREAMS OF VTS | 2BYTES |
| 516 TO 579 | VTS_AST_ATRT | AUDIO STREAM ATTRIBUTE TABLE OF VTS | 64BYTES |
| 580 TO 595 | RESERVED | RESERVED | 16BYTES |
| 596 TO 597 | VTS_SPST_Ns | NUMBER OF SUB-PICTURE STREAMS OF VTS | 2BYTES |
| 598 TO 789 | VTS_SPST_ATRT | SUB-PICTURE STREAMS ATTRIBUTE TABLE OF VTS | 192BYTES |
| 790 TO 791 | RESERVED | RESERVED | 2BYTES |
| 792 TO 983 | VTS_MU_AST_ATRT | MULTICHANNEL AUDIO STREAMS ATTRIBUTE TABLE OF VTS | 192BYTES |
| 984 TO 1023 | RESERVED | RESERVED | 40BYTES |
| 1024 TO 2047 | RESERVED | RESERVED | 1024BYTES |

FIG. 7

VTS_AST_ATRT

| RBP | CONTENTS | NUMBER OF BYTES |
|---|---|---|
| 516 TO 523 | VTS_AST_ATR OF AUDIO STREAM #0 | 8BYTES |
| 524 TO 531 | VTS_AST_ATR OF AUDIO STREAM #1 | 8BYTES |
| 532 TO 539 | VTS_AST_ATR OF AUDIO STREAM #2 | 8BYTES |
| 540 TO 547 | VTS_AST_ATR OF AUDIO STREAM #3 | 8BYTES |
| 548 TO 555 | VTS_AST_ATR OF AUDIO STREAM #4 | 8BYTES |
| 556 TO 563 | VTS_AST_ATR OF AUDIO STREAM #5 | 8BYTES |
| 564 TO 571 | VTS_AST_ATR OF AUDIO STREAM #6 | 8BYTES |
| 572 TO 579 | VTS_AST_ATR OF AUDIO STREAM #7 | 8BYTES |

FIG. 8A

| RBP | CONTENTS | NUMBER OF BYTES |
|---|---|---|
| 792 TO 815 | VTS_MU_AST_ATR OF AUDIO STREAM #0 | 24BYTES |
| 816 TO 839 | VTS_MU_AST_ATR OF AUDIO STREAM #1 | 24BYTES |
| 840 TO 863 | VTS_MU_AST_ATR OF AUDIO STREAM #2 | 24BYTES |
| 864 TO 887 | VTS_MU_AST_ATR OF AUDIO STREAM #3 | 24BYTES |
| 888 TO 911 | VTS_MU_AST_ATR OF AUDIO STREAM #4 | 24BYTES |
| 912 TO 935 | VTS_MU_AST_ATR OF AUDIO STREAM #5 | 24BYTES |
| 936 TO 959 | VTS_MU_AST_ATR OF AUDIO STREAM #6 | 24BYTES |
| 960 TO 983 | VTS_MU_AST_ATR OF AUDIO STREAM #7 | 24BYTES |
| | TOTAL | 192BYTES |

FIG. 9A

VTS_MU_AST_ATR(1)

| b191 b190 | b189 b188 | b187 b186 b185 b184 |
|---|---|---|
| AUDIO MIXED FLAG | ACH0 MIX MODE | AUDIO CHANNEL CONTENTS |

| b183 b182 | b181 b180 | b179 b178 b177 b176 |
|---|---|---|
| AUDIO MIXED FLAG | ACH1 MIX MODE | AUDIO CHANNEL CONTENTS |

| b175 b174 | b173 b172 | b171 b170 b169 b168 |
|---|---|---|
| AUDIO MIXING PHASE | ACH2 MIX MODE | AUDIO CHANNEL CONTENTS |

| b167 b166 | b165 b164 | b163 b162 b161 b160 |
|---|---|---|
| AUDIO MIXING PHASE | ACH3 MIX MODE | AUDIO CHANNEL CONTENTS |

| b159 b158 | b157 b156 | b155 b154 b153 b152 |
|---|---|---|
| AUDIO MIXING PHASE | ACH4 MIX MODE | AUDIO CHANNEL CONTENTS |

| b151 b150 | b149 b148 | b147 b146 b145 b144 |
|---|---|---|
| AUDIO MIXING PHASE | ACH5 MIX MODE | AUDIO CHANNEL CONTENTS |

| b143 b142 | b141 b140 | b139 b138 b137 b136 |
|---|---|---|
| AUDIO MIXING PHASE | ACH6 MIX MODE | AUDIO CHANNEL CONTENTS |

| b135 b134 | b133 b132 | b131 b130 b129 b128 |
|---|---|---|
| AUDIO MIXING PHASE | ACH7 MIX MODE | AUDIO CHANNEL CONTENTS |

FIG. 9B

VTS_MU_AST_ATR(2)

| b127 | b126 | b125 | b124 | b123 | b122 | b121 | b120 |
|------|------|------|------|------|------|------|------|
| α0 | | | | | | | |

| b119 | b118 | b117 | b116 | b115 | b114 | b113 | b112 |
|------|------|------|------|------|------|------|------|
| β0 | | | | | | | |

| b111 | b110 | b109 | b108 | b107 | b106 | b105 | b104 |
|------|------|------|------|------|------|------|------|
| α1 | | | | | | | |

| b103 | b102 | b101 | b100 | b99 | b98 | b97 | b96 |
|------|------|------|------|------|------|------|------|
| β1 | | | | | | | |

| b95 | b94 | b93 | b92 | b91 | b90 | b89 | b88 |
|------|------|------|------|------|------|------|------|
| α2 | | | | | | | |

| b87 | b86 | b85 | b84 | b83 | b82 | b81 | b80 |
|------|------|------|------|------|------|------|------|
| β2 | | | | | | | |

| b79 | b78 | b77 | b76 | b75 | b74 | b73 | b72 |
|------|------|------|------|------|------|------|------|
| α3 | | | | | | | |

| b71 | b70 | b69 | b68 | b67 | b66 | b65 | b64 |
|------|------|------|------|------|------|------|------|
| β3 | | | | | | | |

| b63 | b62 | b61 | b60 | b59 | b58 | b57 | b56 |
|------|------|------|------|------|------|------|------|
| α4 | | | | | | | |

| b55 | b54 | b53 | b52 | b51 | b50 | b49 | b48 |
|------|------|------|------|------|------|------|------|
| β4 | | | | | | | |

FIG. 9C

| b47 | b46 | b45 | b44 | b43 | b42 | b41 | b40 |
|---|---|---|---|---|---|---|---|
| | | | α5 | | | | |
| b39 | b38 | b37 | b36 | b35 | b34 | b33 | b32 |
| | | | β5 | | | | |
| b31 | b30 | b29 | b28 | b27 | b26 | b25 | b24 |
| | | | α6 | | | | |
| b23 | b22 | b21 | b20 | b19 | b18 | b17 | b16 |
| | | | β6 | | | | |
| b15 | b4 | b13 | b12 | b11 | b10 | b9 | b8 |
| | | | α7 | | | | |
| b7 | b6 | b5 | b4 | b3 | b2 | b1 | b0 |
| | | | β7 | | | | |

FIG. 9D

ATSI_MAT

| RBP | | CONTENTS | NUMBER OF BYTES |
|---|---|---|---|
| 0 TO 11 | ATS_ID | ATS IDENTIFIER | 12BYTES |
| 12 TO 15 | ATS_EA | END ADDRESS OF ATS | 4BYTES |
| 16 TO 27 | RESERVED | RESERVED | 12BYTES |
| 28 TO 31 | ATSI_EA | END ADDRESS OF ATSI | 4BYTES |
| 32 TO 33 | VERN | VERSION NUMBER OF DVD VIDEO SPECIFICATION | 2BYTES |
| 34 TO 37 | ATS_CAT | ATS CATEGORY | 90BYTES |
| 38 TO 127 | RESERVED | RESERVED | 4BYTES |
| 128 TO 131 | ATSI_MAT_EA | END ADDRESS OF ATSI_MAT | 60BYTES |
| 132 TO 191 | RESERVED | RESERVED | 4BYTES |
| 192 TO 195 | ATSM_VOBS_SA | START ADDRESS OF ATSM_AOBS | 4BYTES |
| 196 TO 199 | ATSTT_VOBS_SA | START ADDRESS OF ATSTT_AOBS | 4BYTES |
| 200 TO 203 | ATS_PTT_SRPT_SA | START ADDRESS OF ATS_PTT_SRPT | 4BYTES |
| 204 TO 207 | ATS_PGCIT_SA | START ADDRESS OF ATS_PGCIT | 4BYTES |
| 208 TO 211 | ATSM_PGCI_UT_SA | START ADDRESS OF ATSM_PGCI_UT | 4BYTES |
| 212 TO 215 | ATS_TMAPT_SA | START ADDRESS OF ATS_TMAPT | 4BYTES |
| 216 TO 219 | ATSM_C_ADT_SA | START ADDRESS OF ATSM_C_ADT | 4BYTES |
| 220 TO 223 | ATSM_VOBU_ADMAP_SA | START ADDRESS OF ATSTT_AOBU_ADMAP | 4BYTES |
| 224 TO 227 | ATS_C_ADT_SA | START ADDRESS OF ATS_C_ADT | 4BYTES |
| 228 TO 231 | ATS_VOBU_ADMAP_SA | START ADDRESS OF ATS_AOBU_ADMAP | 4BYTES |
| 232 TO 255 | RESERVED | RESERVED | 24BYTES |
| 256 TO 257 | ATSM_V_ATR | VIDEO ATTRIBUTE OF ATSM | 2BYTES |
| 258 TO 259 | ATSM_AST_Ns | NUMBER OF AUDIO STREAMS OF ATSM | 2BYTES |
| 260 TO 267 | ATSM_AST_ATR | AUDIO STREAM ATTRIBUTE OF ATSM | 8BYTES |
| 268 TO 323 | RESERVED | RESERVED | 56BYTES |
| 324 TO 339 | RESERVED | RESERVED | 16BYTES |
| 340 TO 341 | ATSM_SPST_Ns | NUMBER OF SUB-PICTURE STREAMS OF ATSM | 2BYTES |
| 342 TO 347 | ATSM_SPST_ATR | SUB-PICTURE STREAMS ATTRIBUTE TABLE OF ATSM | 6BYTES |
| 348 TO 511 | RESERVED | RESERVED | 164BYTES |
| 512 TO 513 | ATS_V_ATR | VIDEO ATTRIBUTE OF ATS | 2BYTES |
| 514 TO 515 | ATS_AST_Ns | NUMBER OF AUDIO STREAMS OF ATS | 2BYTES |
| 516 TO 579 | ATS_AST_ATR | AUDIO STREAM ATTRIBUTE TABLE OF ATS | 64BYTES |
| 580 TO 595 | RESERVED | RESERVED | 16BYTES |
| 596 TO 597 | ATS_SPST_Ns | NUMBER OF SUB-PICTURE STREAMS OF ATS | 2BYTES |
| 598 TO 789 | ATS_SPST_ATRT | SUB-PICTURE STREAMS ATTRIBUTE TABLE OF ATS | 192BYTES |
| 790 TO 791 | RESERVED | RESERVED | 2BYTES |
| 792 TO 1298 | ATS_MU_AST_ATRT | MULTICHANNEL AUDIO STREAMS ATTRIBUTE TABLE OF ATS | 507BYTES |
| 1299 TO 1299 | RESERVED | RESERVED | 749BYTES |

FIG. 15

ATSM_AST_ATR

| b63 | b62 | b61 | b60 | b59 | b58 | b57 | b56 |
|---|---|---|---|---|---|---|---|
| AUDIO CODING MODE | | | RESERVED | RESERVED | | RESERVED | |

| b55 | b54 | b53 | b52 | b51 | b50 | b49 | b48 |
|---|---|---|---|---|---|---|---|
| QUANTIZATION/DRC | | FS | | | NUMBER OF AUDIO CHANNELS | | |

| b47 | b46 | b45 | b44 | b43 | b42 | b41 | b40 |
|---|---|---|---|---|---|---|---|
| RESERVED | | | | | | | |

| b39 | b38 | b37 | b36 | b35 | b34 | b33 | b32 |
|---|---|---|---|---|---|---|---|
| RESERVED | | | | | | | |

| b31 | b30 | b29 | b28 | b27 | b26 | b25 | b24 |
|---|---|---|---|---|---|---|---|
| RESERVED | | | | | | | |

| b23 | b22 | b21 | b20 | b19 | b18 | b17 | b16 |
|---|---|---|---|---|---|---|---|
| RESERVED | | | | | | | |

| b15 | b14 | b13 | b12 | b11 | b10 | b9 | b8 |
|---|---|---|---|---|---|---|---|
| RESERVED | | | | | | | |

| b7 | b6 | b5 | b4 | b3 | b2 | b1 | b0 |
|---|---|---|---|---|---|---|---|
| RESERVED | | | | | | | |

FIG. 16

ATS_AST_ATRT

| RBP | CONTENTS | NUMBER OF BYTES |
|---|---|---|
| 516 TO 523 | ATS_AST_ATR OF AUDIO STREAM #0 | 8BYTES |
| 524 TO 531 | ATS_AST_ATR OF AUDIO STREAM #1 | 8BYTES |
| 532 TO 539 | ATS_AST_ATR OF AUDIO STREAM #2 | 8BYTES |
| 540 TO 547 | ATS_AST_ATR OF AUDIO STREAM #3 | 8BYTES |
| 548 TO 555 | ATS_AST_ATR OF AUDIO STREAM #4 | 8BYTES |
| 556 TO 563 | ATS_AST_ATR OF AUDIO STREAM #5 | 8BYTES |
| 564 TO 571 | ATS_AST_ATR OF AUDIO STREAM #6 | 8BYTES |
| 572 TO 579 | ATS_AST_ATR OF AUDIO STREAM #7 | 8BYTES |

FIG. 17A

| RBP | CONTENTS | NUMBER OF BYTES |
|---|---|---|
| 792 TO 830 | ATS_MU_AST_ATR OF AUDIO STREAM #0 | 39BYTES |
| 831 TO 869 | ATS_MU_AST_ATR OF AUDIO STREAM #1 | 39BYTES |
| 870 TO 908 | ATS_MU_AST_ATR OF AUDIO STREAM #2 | 39BYTES |
| 909 TO 947 | ATS_MU_AST_ATR OF AUDIO STREAM #3 | 39BYTES |
| 948 TO 986 | ATS_MU_AST_ATR OF AUDIO STREAM #4 | 39BYTES |
| 987 TO 1025 | ATS_MU_AST_ATR OF AUDIO STREAM #5 | 39BYTES |
| 1026 TO 1064 | ATS_MU_AST_ATR OF AUDIO STREAM #6 | 39BYTES |
| 1065 TO 1103 | ATS_MU_AST_ATR OF AUDIO STREAM #7 | 39BYTES |
| 1104 TO 1142 | ATS_MU_AST_ATR OF AUDIO STREAM #8 | 39BYTES |
| 1143 TO 1181 | ATS_MU_AST_ATR OF AUDIO STREAM #9 | 39BYTES |
| 1182 TO 1220 | ATS_MU_AST_ATR OF AUDIO STREAM #10 | 39BYTES |
| 1221 TO 1259 | ATS_MU_AST_ATR OF AUDIO STREAM #11 | 39BYTES |
| 1260 TO 1298 | ATS_MU_AST_ATR OF AUDIO STREAM #12 | 39BYTES |
|  | TOTAL | 507BYTES |

FIG. 18A

ATS_MU_AST_ATR_EXT(1)

| b39 | b38 | b37 | b36 | b35 | b34 | b33 | b32 |
|---|---|---|---|---|---|---|---|
| AUDIO MIXED FLAG | | ACH8 MIX MODE | | AUDIO CHANNEL CONTENTS | | | |

| b31 | b30 | b29 | b28 | b27 | b26 | b25 | b24 |
|---|---|---|---|---|---|---|---|
| AUDIO MIXED FLAG | | ACH9 MIX MODE | | AUDIO CHANNEL CONTENTS | | | |

| b23 | b22 | b21 | b20 | b19 | b18 | b17 | b16 |
|---|---|---|---|---|---|---|---|
| AUDIO MIXED FLAG | | ACH10 MIX MODE | | AUDIO CHANNEL CONTENTS | | | |

| b15 | b14 | b13 | b12 | b11 | b10 | b9 | b8 |
|---|---|---|---|---|---|---|---|
| AUDIO MIXED FLAG | | ACH11 MIX MODE | | AUDIO CHANNEL CONTENTS | | | |

| b7 | b6 | b5 | b4 | b3 | b2 | b1 | b0 |
|---|---|---|---|---|---|---|---|
| AUDIO MIXED FLAG | | ACH12 MIX MODE | | AUDIO CHANNEL CONTENTS | | | |

FIG. 18B

ATS_MU_AST_ATR_EXT(2)

| b79 | b78 | b77 | b76 | b75 | b74 | b73 | b72 |
|-----|-----|-----|-----|-----|-----|-----|-----|
| $\alpha 8$ | | | | | | | |

| b71 | b70 | b69 | b68 | b67 | b66 | b65 | b64 |
|-----|-----|-----|-----|-----|-----|-----|-----|
| $\beta 8$ | | | | | | | |

| b63 | b62 | b61 | b60 | b59 | b58 | b57 | b56 |
|-----|-----|-----|-----|-----|-----|-----|-----|
| $\alpha 9$ | | | | | | | |

| b55 | b54 | b53 | b52 | b51 | b50 | b49 | b48 |
|-----|-----|-----|-----|-----|-----|-----|-----|
| $\beta 9$ | | | | | | | |

| b47 | b46 | b45 | b44 | b43 | b42 | b41 | b40 |
|-----|-----|-----|-----|-----|-----|-----|-----|
| $\alpha 10$ | | | | | | | |

| b39 | b38 | b37 | b36 | b35 | b34 | b33 | b32 |
|-----|-----|-----|-----|-----|-----|-----|-----|
| $\beta 10$ | | | | | | | |

| b31 | b30 | b29 | b28 | b27 | b26 | b25 | b24 |
|-----|-----|-----|-----|-----|-----|-----|-----|
| $\alpha 11$ | | | | | | | |

| b23 | b22 | b21 | b20 | b19 | b18 | b17 | b16 |
|-----|-----|-----|-----|-----|-----|-----|-----|
| $\beta 11$ | | | | | | | |

| b15 | b14 | b13 | b12 | b11 | b10 | b9 | b8 |
|-----|-----|-----|-----|-----|-----|-----|-----|
| $\alpha 12$ | | | | | | | |

| b7 | b6 | b5 | b4 | b3 | b2 | b1 | b0 |
|----|----|----|----|----|----|----|----|
| $\beta 12$ | | | | | | | |

FIG. 18C

DVD-AUDIO DISK, AND APPARATUS AND METHOD FOR PLAYING THE SAME

This application claims the benefit of Korean Application No. 10330/1997, filed Mar. 25, 1997 and Korean Application No. 51861/1997, filed Oct. 9, 1997, in the Korean Patent Office, and is a continuation-in-part of U.S. patent application Ser. No. 08/921,082, now abandoned.

BACKGROUND OF THE INVENTION

1. Field of the Invention

The present invention relates to a digital versatile disk (DVD), and an apparatus and method for playing the DVD, and more particularly, to an audio DVD (hereinafter referred to as "DVD-Audio") and an apparatus and method for playing the same.

2. Description of the Related Art

Recently, there has been developed a so-called video DVD (hereinafter referred to as "DVD-Video"), which has a considerably higher storage capacity than a laser disk (LD) so as to realize a significantly improved picture and sound quality. If the DVD is employed to store and retrieve only audio data, such DVD is called a DVD-Audio. The DVD-Audio provides means for storing and retrieving a large amount of audio data having a significantly improved quality compared to a compact disk (CD) or a digital audio tape (DAT).

The conventional CD stores an audio signal as linear pulse code modulated (PCM) audio data quantized into 16 bits by employing a sampling frequency of 44.1 KHz. The digital data stored in the CD is converted into analog signals by means of a CD player. The CD is much more convenient to use as compared to the previous microgroove phonograph record (LP), but is regarded as having a lower sound quality than the analog LP. This is because the audio signals are sampled at 44.1 KHz and quantized into 16 bits to be stored into a CD. Moreover, the audible frequency range may be over 20 KHz, and the dynamic range must be over 120 dB. In addition, the CD can only store audio signals of at most two channels, and therefore is impossible to store and reproduce the audio data concerned with multi-channel music. In these circumstances, there have been proposed various methods to improve the sound quality of the CD by increasing the numbers of the sampling frequency and the audio channels.

The DVD provides means to record video and audio data at high density. In this case, the video data is recorded in the MPEG (Moving Picture Expert Group) while the audio data is recorded in the linear PCM format, dolby AC-3 format, MPEG format, etc. Hence, the DVD-Video player is designed to reproduce both video and audio data recorded in a DVD-Video. Such a DVD-Video prepared to necessarily store video data is very uneconomical in view of the storage space when used for storing audio data only.

The audio data recorded in a DVD-Video has a much higher quality than that in a CD since the audio data of the DVD has a higher sampling frequency and larger numbers of quantization bits and channels than that of the CD. Namely, the DVD player reproduces high quality audio data in multiple channels.

The DVD is possible to transfer data at 10.08 Mbps at most. This makes it possible to reproduce data sampled at 192 KHz in two channels. This also approaches the maximum sampling frequency proposed as a prerequisite for the next advanced audio system at the Advanced Digital Audio Conference held in Japan in April, 1996. Thus, if audio data are recorded in a DVD-Audio, the DVD player may reproduce sounds of a significantly improved quality over that reproduced from the DVD-Video.

SUMMARY OF THE INVENTION

It is an object of the present invention to provide a DVD-Audio for storing digital audio signals sampled at the maximum sampling frequency and quantized in the maximum number of bits with the number of channels limited by the data transfer speed in linear PCM.

It is another object of the present invention to provide a DVD-Audio for compressively coding digital audio signals sampled at the maximum sampling frequency and quantized in the maximum number of bits and storing them with the number of channels limited by the data transfer speed and the coding system in linear PCM.

It is still another object of the present invention to provide a DVD player for playing a DVD-Audio recorded in linear is PCM and a method therefor.

It is a further object of the present invention to provide a DVD player for playing a DVD-Audio recorded with audio data compressively coded and a method therefor.

It is further another object of the present invention to provide a DVD player for properly playing a DVD-Video or DVD-Audio by distinguishing them.

According to a first aspect of the present invention, a DVD-Audio includes a data zone for storing data to be reproduced and an information zone for storing information on the data, the information zone including directories of a video title set (VIDEO_TS) and an audio title set (AUDIO_TS), wherein the AUDIO_TS directory includes information on an audio manager (AMG) having information on audio titles, wherein the data zone includes the audio titles each having audio title set information (ATSI) followed by a plurality of contiguous audio objects (AOBs), the ATSI includes a plurality of audio stream attributes each having an audio coding mode indicator, first to third quantization bit numbers, first to third sampling frequencies and decoding algorithm information relating to the number of audio channels, and each of the AOBs includes a plurality of audio packs recorded with audio data corresponding to the decoding algorithm stored in the audio stream attribute.

According to a second aspect, an apparatus for playing the inventive DVD-Audio includes a data receiver for receiving the audio data retrieved from the DVD-Audio, a controller for generating an audio control signal containing an audio coding mode indicator, a sampling frequency, a channel number and quantization information by analyzing information on the audio data or stopping the playing operation according to whether the AUDIO_TS is detected to have effective data, an audio decoder to decode the received audio data and to multi-channel mix, sampling-frequency convert and requantize the decoded audio signal according to the audio control signal, and an audio output circuit to convert the decoded audio data into an analog audio signal.

According to a third aspect, a method for playing the inventive DVD-Audio includes the steps of locating the AMG when the AUDIO_TS directory includes an effective data, checking out all information of the DVD-Audio from the information of the AMG, reading the data of the position of an audio title selected according to the position information of the AMG when receiving a command for reproducing the audio title, and setting the audio decoder to carry out the algorithm for reproducing the audio title by reading the audio stream attribute of the audio title set information management table (ATSI_AMT).

The present invention will now be described more specifically with reference to the drawings attached only by way of example.

BRIEF DESCRIPTION OF THE DRAWINGS

FIG. 6 is a diagram for illustrating the structure of a video title set information (VTSI);

FIG. 7 is a diagram for illustrating the structure of a video title set management table (VTSI_MAT);

FIG. 8A is a diagram for illustrating the structure of the video title set audio stream attribute table (VTS_AST_ATRT);

FIG. 9A is a diagram for illustrating the structure of a multi-channel audio stream attribute table of a video title set (VTS_MU_AST_ATRT);

FIG. 9B is a diagram for illustrating the structure of a multi-channel audio stream attribute (1) of a video title set (VTS_MU_AST_ATR(1));

FIGS. 9C and 9D are diagrams for illustrating the structure of the VTS_MU_AST_ATR(2);

FIG. 15 is a diagram for illustrating the structure of an audio title set information management table (ATSI_MAT) of the DVD-Audio;

FIG. 16 is a diagram for illustrating the internal structure of an audio stream attribute of an audio title set menu (ATSM_AST_ATR) of the DVD-Audio;

FIG. 17A is a diagram for illustrating the structure of an audio stream attribute table of an audio title set (ATS_AST_ATRT) of the DVD-Audio;

FIG. 18A is a diagram for illustrating the structure of a multi-channel audio stream attribute of an audio title set (ATS_MU_AST_ATR) of the DVD-Audio;

FIG. 18B is a diagram for illustrating the structure of a first extension of a multi-channel audio stream attribute of an audio title set (ATS_MU_AST_ATR_EXT(1)) of the DVD-Audio;

FIG. 18C is a diagram for illustrating the structure of a second extension of a multi-channel audio stream attribute of the audio title set (ATS_MU_AST_ATR_EXT(2)) of the DVD-Audio;

DETAILED DESCRIPTION OF THE PREFERRED EMBODIMENTS

Figure 1:
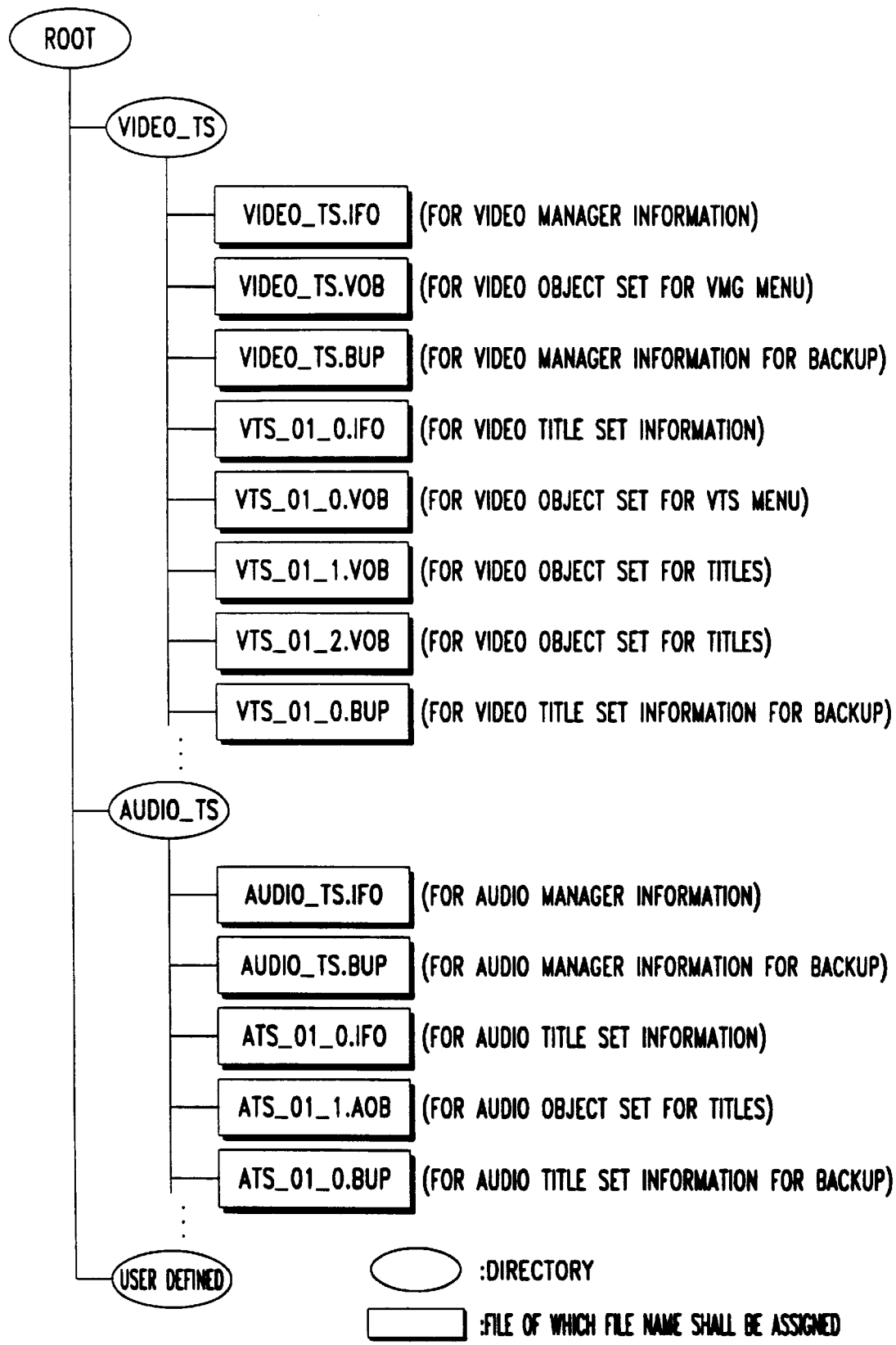
FIG. 1 is an example of the directory structure of a DVD.

In the attached drawings, the same reference numerals are used to represent parts serving the same functions and detailed descriptions are omitted concerning the parts not essential to describe the inventive concept, for convenience's sake.

The data structure of the DVD-Audio is similar to that of the DVD-Video. Hence, the DVD-Audio includes a data zone to record the audio data and an information zone to record the information on the audio data. The DVD player may be embodied in the form of a DVD-Audio player or a DVD-Audio/Video player. Of course, the DVD player has a mechanism to determine whether an inserted DVD is a DVD-Audio or DVD-Video. The inventive DVD-Audio has almost the same structure as the DVD-Video with some partly changed data structure to achieve the audio data of high quality.

The fundamental file structure recorded in the information zone of the DVD-Audio is as shown in FIG. 1 for illustrating a directory structure for the DVD-Video and DVD-Audio. The directory structure generally includes a video title set directory (VIDEO_TS), audio title set directory (AUDIO_TS) and a user defined directory. Each of the directories contains a plurality of files of which the names shall be assigned. The directory structure is to represent the locations of the files in the disk. The files connected to the VIDEO_TS are prepared for the DVD-Video and DVD-Video player while those connected to the AUDIO_TS are prepared for the DVD-Audio and DVD-Audio player.

Generally, each of the DVD-Video and DVD-Audio contains both VIDEO_TS and AUDIO_TS. However, the DVD-Video has the AUDIO_TS emptied (all of the information on the data stored in the DVD-Video disk being contained in the VIDEO_TS) while the DVD-Audio has the AUDIO_TS containing the information on the positions of the audio titles recorded on the disk and the VIDEO_TS also containing the information on the positions of the titles of Bs reproducible information (spec: e.g., sampling frequency) in the DVD-Video player. Hence, if a DVD has no effective data in the AUDIO_TS, it is determined as being DVD-Video, or otherwise, i.e., if the DVD player detects effective data in the AUDIO_TS, it determines the disk as being DVD-Audio. Namely, the DVD player detects the AUDIO_TS of a DVD to distinguish DVD-Video and DVD-Audio.

The logical data structure of DVD-Video is illustrated in FIG. 1. The concept of the logical data structure of DVD-Video includes structure of a volume space, structure of a video manager (VMG), structure of a video title set (VTS), and structure of a video object set (VOBS).

Figure 2:
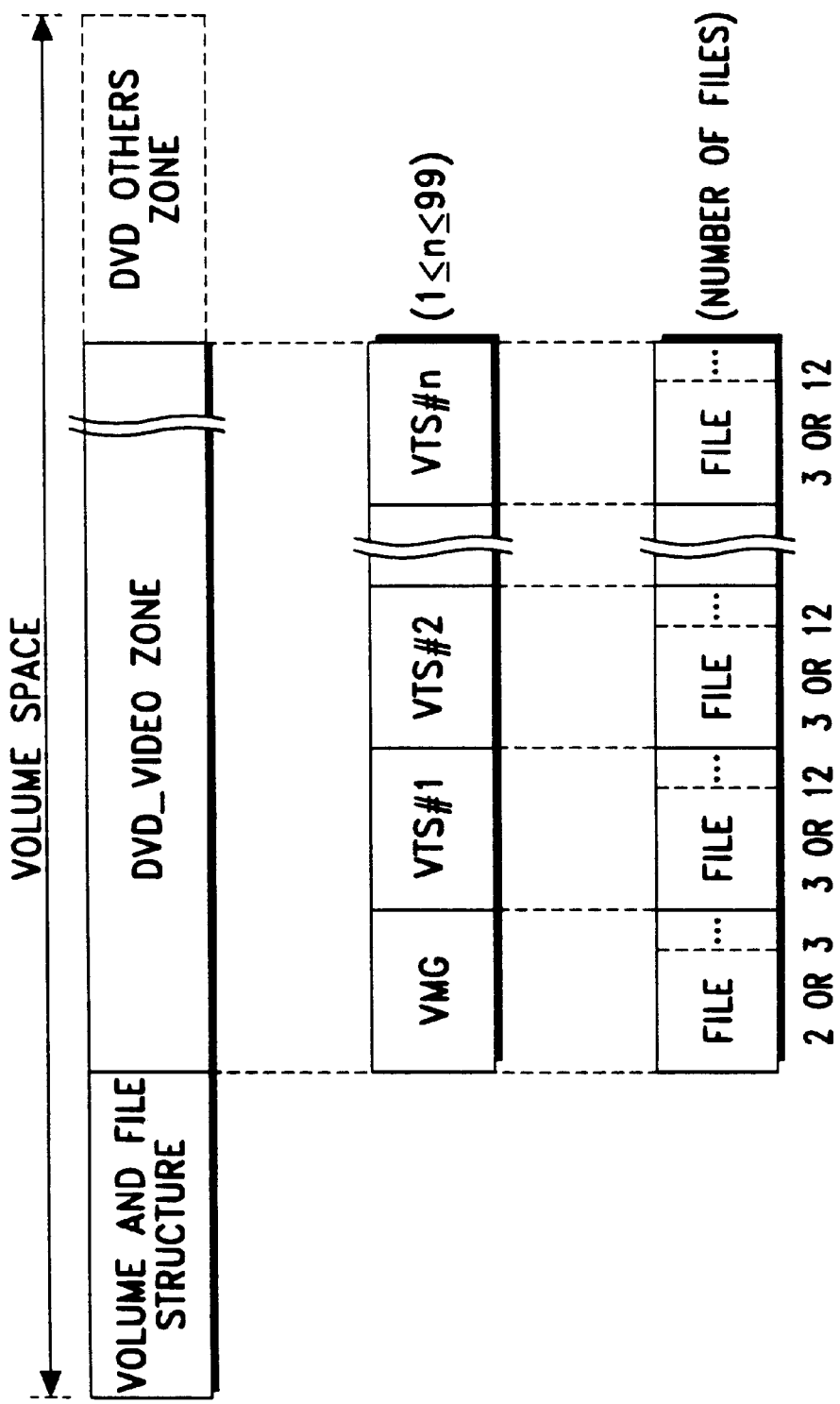
FIG. 2 is an example of the logical data structure of a DVD.

Describing the logical data structure of the volume space with reference to FIG. 2, it includes the volume and file structure, single DVD-Video zone and DVD others zone. The DVD-Video zone, which shall be assigned for the data structure of the DVD-Video, includes a single VMG and VTSs numbering from at least 1 to a maximum of 99. The VMG is allocated at the leading part of the DVD-Video zone. Each VTS includes between 3 and 12 files.

Figure 3:
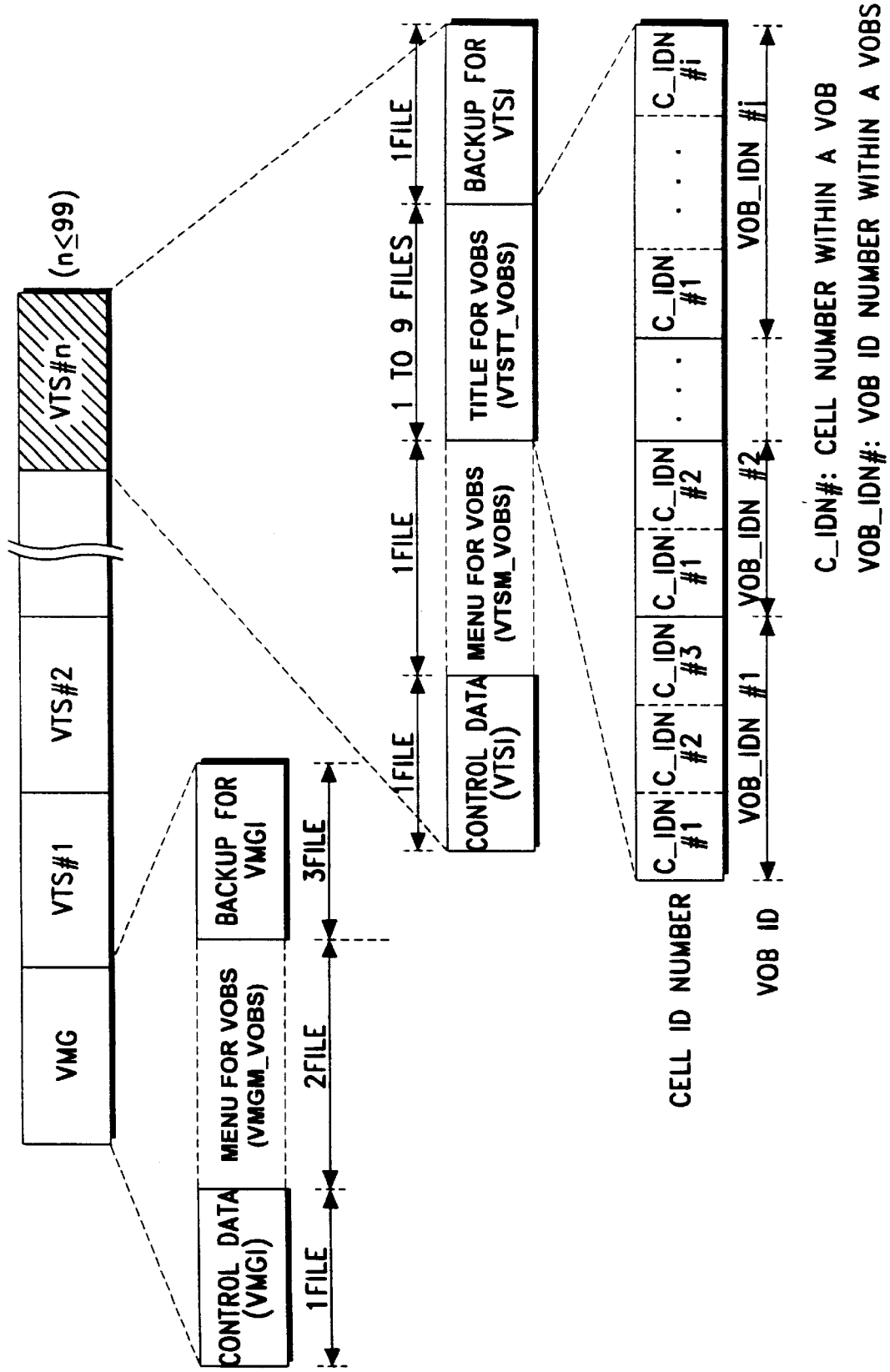
FIG. 3 is a diagram for illustrating the structure of the video manager (VMG) and VTS.

Referring to FIG. 3 for illustrating the VMG and VTS structure, all VOBs are recorded in contiguous blocks. Each VOB includes video, audio and sub-picture data. The VMG includes a video manager information file (VMGI) as control data, video manager menu file of the VOBs (VMGM_VOBS) and VGMI backup file. Each VTS includes VTSI as control data, a video title set menu of VOBS (VTSM_VOBS), a video title set title of VOBS (VTSTT_VOBS) and a VTSI backup file. The VTSTT_VOBS includes a plurality of cells (C_IDN). In the drawing, C_IDN# indicates cell ID number within a VOBS, and VOB_IDN# VOB ID number within a VOBS.

Figure 4:
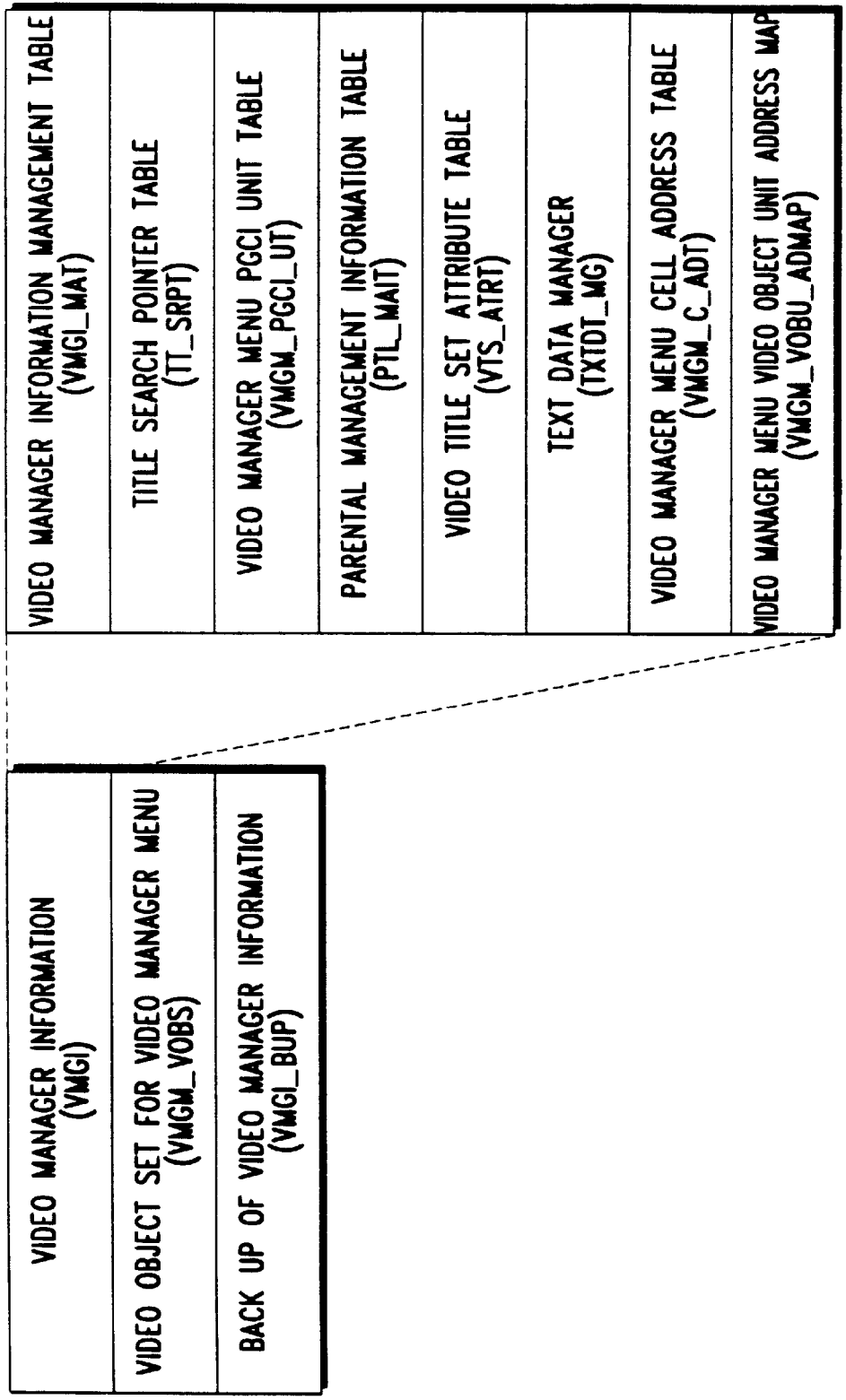
FIG. 4 is a diagram for illustrating the structure of the VMG of a DVD.

Referring to FIG. 4, the VMGI describes information on the related VIDEO_TS directory. The VMGI starts with a video manager information management table (VMGI_MAT), followed by a title search pointer table (TT_SRPT), followed by a video manager menu PGCI unit table (VMGM_PGCI_UT), followed by a parental management information table (PTL_MAIT), followed by a video title set attribute table (VTS_ATRT), followed by a text data manager (TXTDT_MG), followed by a video manager menu cell address table (VMGM_C_ADT), followed by a video manager menu video object unit address map (VMGM_VOBU_ADMAP).

Figure 5:
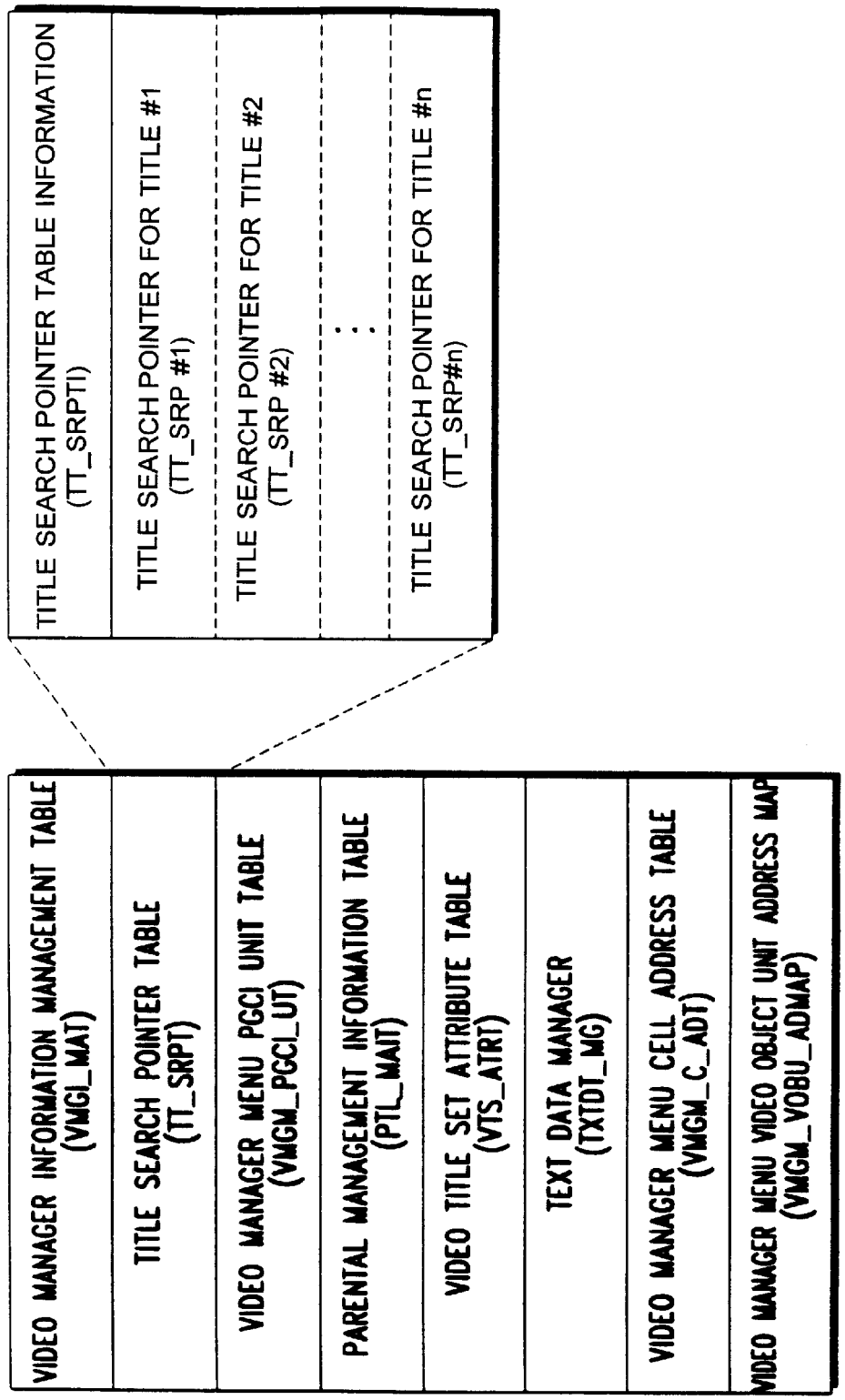
FIG. 5 is a diagram for illustrating the structure of a title search pointer table (TT_SRPT) of a DVD.

Referring to FIG. 5 for describing search information of a video title under the VIDEO_TS directory, the TT_SRPT starts with TT_SRPT information (TT_SRPTI) followed by title search pointers (TT_SRPs) for every title under the VIDEO_TS directory. The title number # ranges from 1 to 99.

Referring to FIG. 6, the VTSI provides information for one or more video titles and the video title set menu (VTSM). The VTSI describes the management information of these titles such as the information to search the part_of title (PTT) and the information to play back the video object set (VOBS), and the video title set menu (VTSM), as well as the information on the attribute of the VOBS.

The VTSI starts with a video title set information management table (VTSI_MAT), followed by a video title set part_of_title search pointer table (VTS_PTT_SPRT), followed by a video title set program chain information table (VTS_PGCIT), followed by a video title set menu PGCI unit table (VTSM_PGCI_UT), followed by a video title set time map table (VTS_TMAPT), followed by a video title set menu cell address table (VTSM_C_ADT), followed by a video title set menu video object unit address map (VTSM_VOBU_ADMAP), followed by a video title set cell address table (VTS_C_ADT), followed by a video title set video object unit address map (VTS_VOBU_ADMAP) as shown in FIG. 6.

Figure 8B:
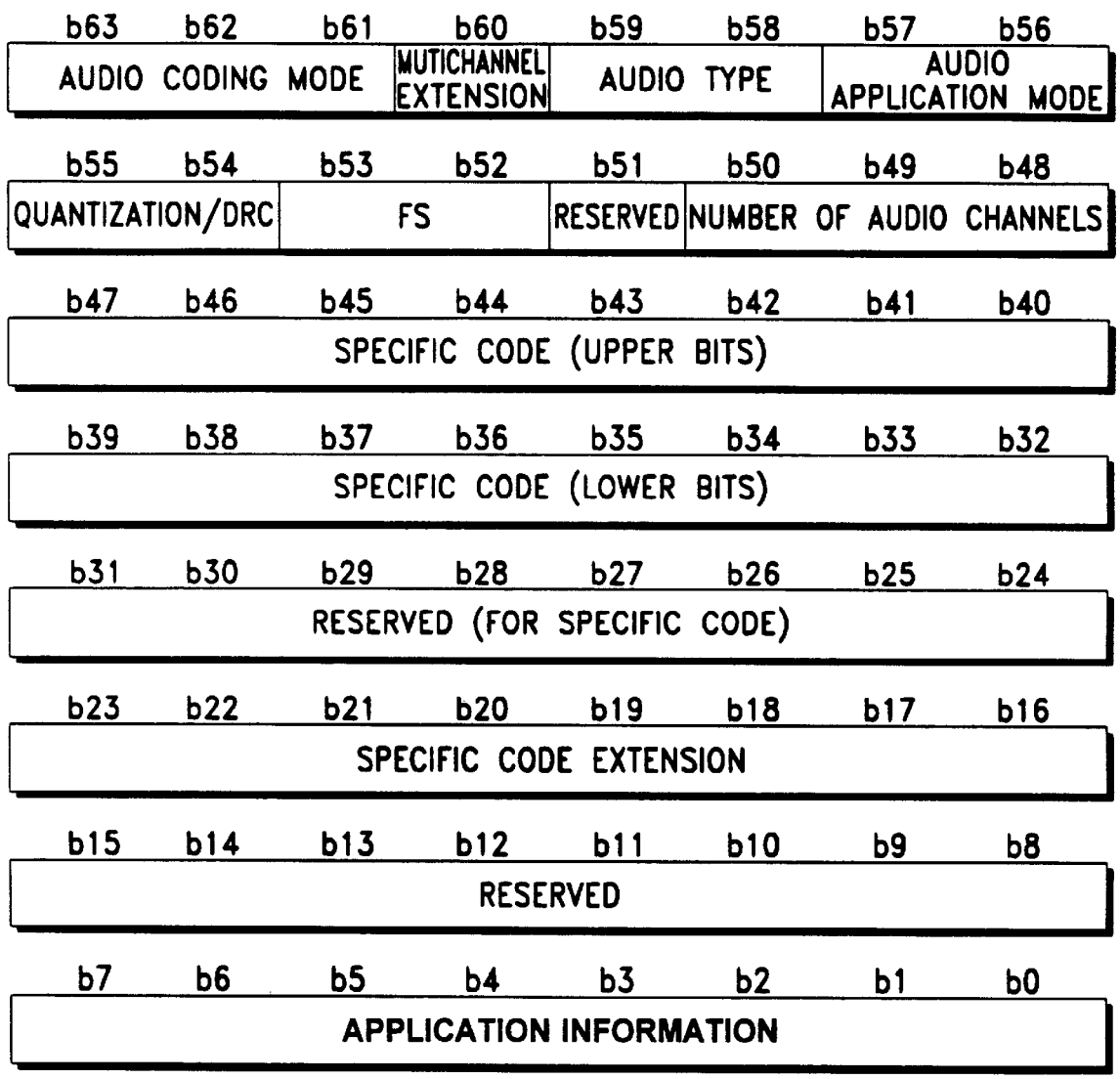
FIG. 8B is a diagram for illustrating the internal structure of VTS_AST_ATRT.

Referring to FIG. 7, the VTSI_MAT describes the start address of each piece of information in the VTSI and the attribute of the VOBS in the VTS. In this VTSI_MAT, the audio stream attribute table of the VTS (VTS_AST_ATRT) of RBP 516 to 579 stores 8 VTS_AST_ATRs #0 to #7 as shown in FIG. 8A. Each VTS_AST_ATR includes 8 bytes arranged as shown in FIG. 8B. Each field value represents the internal information of the audio stream of the VTSM_VOBS. Describing the contents of one VTS_AST_ATR with reference to FIG. 8B, the audio coding mode of b63 to b61 is as shown in the following Table 1:

TABLE 1

| b63-b61 | Audio Coding Mode |
|---------|-------------------|
| 000b | Dolby AC-3 |
| 010b | MPEG-1 or MPEG-2 without extension bit stream |
| 011b | MPEG-2 with extension bitstream |
| 100b | Linear PCM audio |
| 110b | DTS (option) |
| 111b | SDDS (option) |
| Others | reserved |

The multichannel extension of b60 is to store information on whether the multichannel extension is made or not. Namely, 0b represents the multichannel extension not selected while 1b represents the multichannel extension selected according to the information of the VTS_MU_AST_ATRT recorded in RBP 792 to 983 of the VTSI_MAT shown in FIG. 7.

The audio type of b59 to b58 is as shown in Table 2.

TABLE 2

| b59-b58 | audio type |
|---------|------------|
| 00b | Not specified |
| 01b | Language included |
| others | reserved |

The audio application mode of b57 to b56 is as shown in the following Table 3.

TABLE 3

| b57-b56 | audio application mode |
|---------|------------------------|
| 00b | Not specified |
| 01b | Karaoke mode |
| 10b | Surround mode |
| 11b | reserved |

For the quantization/DRC of b55 to b54, when the audio coding mode is '000b', '11b' is recorded. When the audio coding mode is '010b' or '011b', the quantization/DRC is defined as:

00b: Dynamic range control data do not exist in MPEG audio stream

01b: Dynamic range control data exist in MPEG audio stream

10b: reserved

11b: reserved

When the audio coding mode '100b', then the quantization/DRC is defined as in the following Table 4.

TABLE 4

| b55-b54 | Quantization DRC |
| --- | --- |
| 00b | 16 bits |
| 01b | 20 bits |
| 10b | 24 bits |
| 11b | reserved |

The sampling frequency fs of b53 to b52 is as shown in Table 5.

TABLE 5

| b53-b52 | fs |
| --- | --- |
| 00b | 48 KHz |
| 01b | 96 KHz |
| 10b | reserved |
| 11b | reserved |

The number of audio channels stored in b50 to b48 is as shown in Table 6.

TABLE 6

| b50-b48 | No. of Audio channels |
| --- | --- |
| 000b | 1 ch (mono) |
| 001b | 2 ch (stereo) |
| 010b | 3 ch (multichannel) |
| 011b | 4 ch (multichannel) |
| 100b | 5 ch (multichannel) |
| 101b | 6 ch (multichannel) |
| 110b | 7 ch (multichannel) |
| 111b | 8 ch (multichannel) |
| others | reserved |

In addition, the multichannel audio stream attribute table of the VTS of RBP 792 to 983 in the VTSI_MAT of FIG. 7 provides the VTS_MU_AST_ATRs #0 to #7 of 8 audio streams as shown in FIG. 9A. Each VTS_MU_AST_ATR includes a VTS_MU_AST_ATR (1) of 8 bytes as shown in FIG. 9B and a VTS_MU_AST_ATR (2) of 16 bytes as shown in FIGS. 9C and 9D.

Thus, the information zone VIDEO_TS of the DVD-Video is constructed as shown in FIGS. 2 to 9D. Such a DVD-Video stores both video and audio data, and therefore can not provide audio data of good quality. Hence, it is impossible to record the audio data on a DVD-Video at the maximum rate 10.08 Mbps of the DVD. Namely, the maximum bit rate to record the audio data on the DVD-Video is 6.75 Mbps, and the maximum sampling frequency 96 KHz. The linear PCM multichannel audio data recorded on the DVD-Video is as shown in Table 7.

TABLE 7

| fs | Qb | Maximum Number of Channels | Maximum Bit Rate |
| --- | --- | --- | --- |
| 48 KHz | 16 bit | 8 ch | 6.144 Mbps |
| 48 KHz | 20 bit | 6 ch | 5.760 Mbps |
| 48 KHz | 24 bit | 5 ch | 5.760 Mbps |
| 96 KHz | 16 bit | 4 ch | 6.144 Mbps |
| 96 KHz | 20 bit | 3 ch | 5.760 Mbps |
| 96 KHz | 24 bit | 2 ch | 4.608 Mbps |

The present invention is to provide a DVD-Audio for recording only audio data not including video data. Hence, the DVD-Audio can store multichannel audio data in the range of the maximum bit rate 10.08 Mbps of the DVD, which is different from the DVD-Video. Thus, the DVD-Audio may use the sampling frequency of at most 192 KHz, and extend the number of the audio channels to 13.

The file structure stored in the information zone of the DVD-Audio is essentially the same as shown in FIG. 1. The files included in the AUDIO_TS directory are to provide for the DVD-Audio and its player. Hence, the DVD-Audio has both AUDIO_TS and VIDEO_TS, where the VIDEO_TS stores the positional information of the VMG and titles which are reproducible in a DVD-Video player. The AUDIO_TS stores the positional information of the AMG and titles which are reproducible in a DVD-Audio player. The DVD player determines whether an inserted DVD is DVD-Audio or not by checking the contents of the audio title set directory AUDIO_TS.

Figure 10:
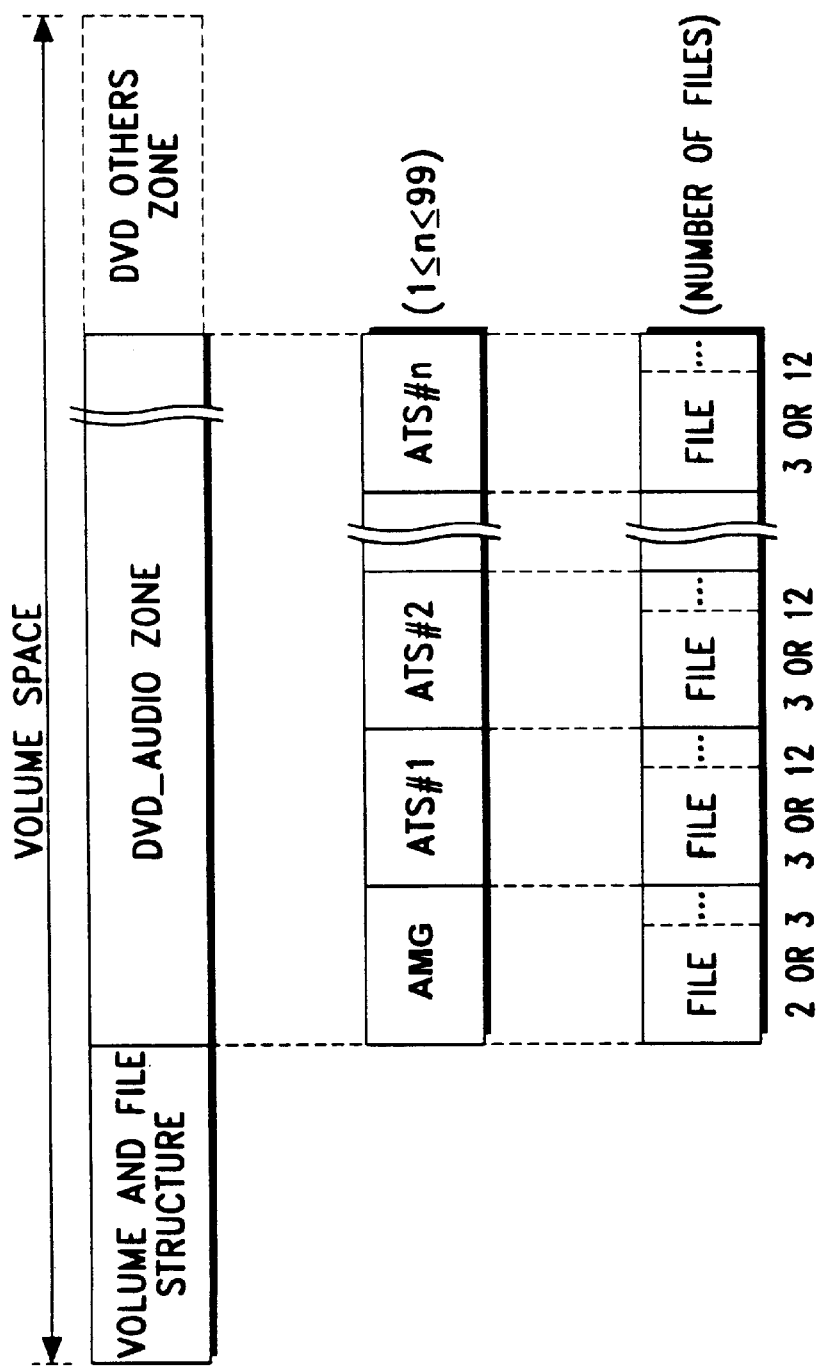
FIG. 10 is a diagram for illustrating a logical structure of the DVD-Audio.

Referring to FIG. 10, the logical data structure of the DVD-Audio includes structure of a volume space, structure of an audio manager (AMG), structure of an audio title set (ATS), and structure of an audio object set (AOBS). The volume space includes the volume and file structure, a single DVD-Audio zone and DVD others zone. The DVD-Audio zone, which is assigned for the data structure of the DVD-Audio, includes a single AMG and VTSS numbering from at least 1 to a maximum of 99. The AMG is allocated at the leading part of the DVD-Audio zone, including 2 or 3 files. Each VTS includes between 3 and 12 files.

The AMG and ATS are structured similar to the VMG and VTS of the DVD-Video, as shown in FIGS. 11–17C. However, the data structure for the linear PCM and pseudo-lossless psychoacoustic coded data (PLPCD) of the DVD-Audio is not proper for processing the linear PCM, lossless coded data or PLPCD according to the new sampling frequency of the DVD-Audio. Therefore, the data structures of the AMG and ATS are made somewhat different from that of the VMG and VTS. Namely, the part allocated for the sampling frequency and channel number in the part allocated for the audio attribute of the VMG and VTS is extended for the AMG and ATS.

Figure 11:
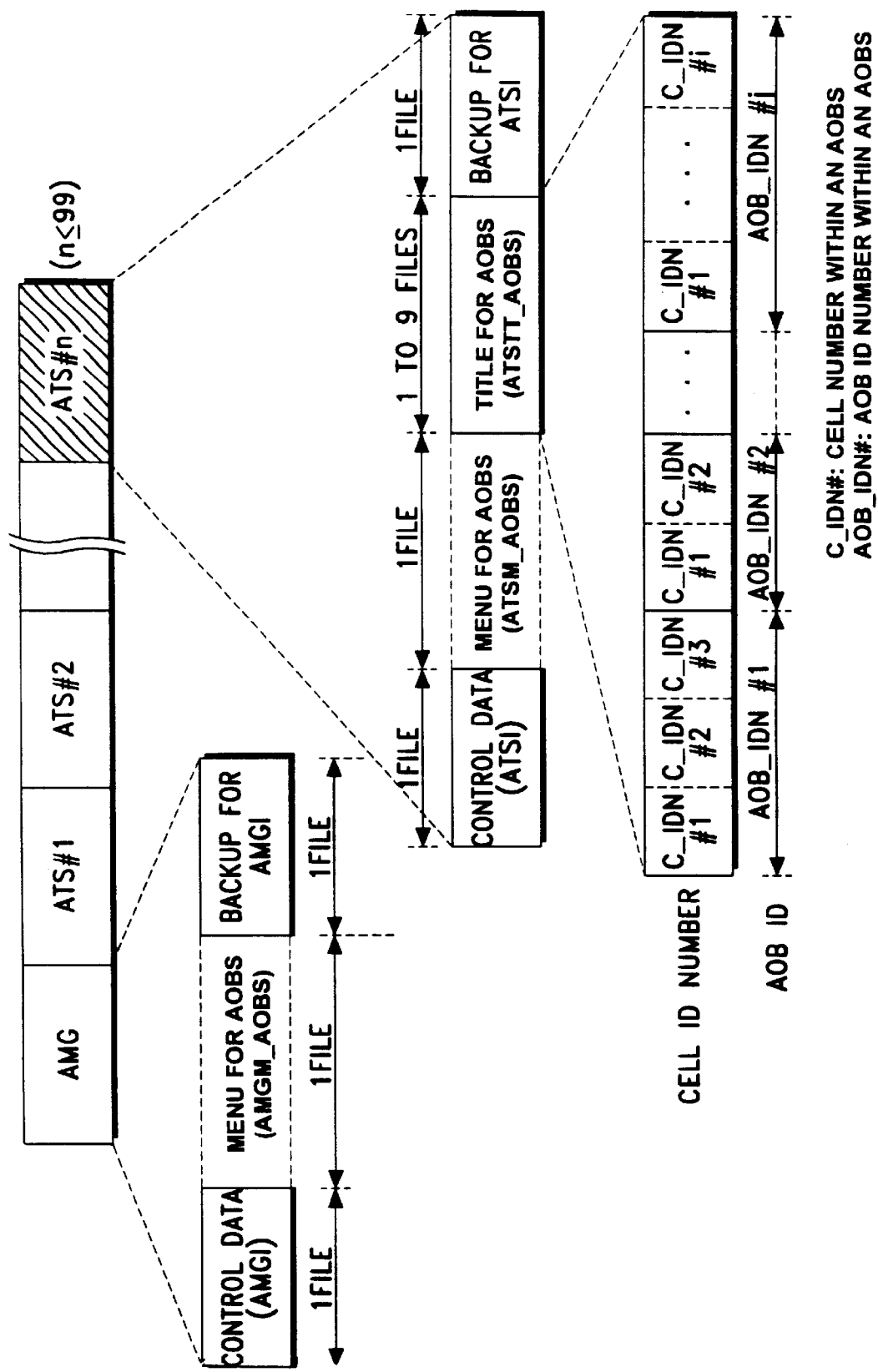
FIG. 11 is a diagram for illustrating the structures of an audio manager (AMG) and audio title set (ATS) of the DVD-Audio.

Referring to FIG. 11 for illustrating the AMG and ATS structures, all AOBs are recorded in contiguous blocks. The AMG includes an audio manager information file (AMGI) as control data, an audio manager menu file of the AOBs (AMGM_AOBS) and an AGMI backup file. Each ATS includes ATSI as control data, an audio title set menu of AOBS (ATSM_AOBS), an audio title set title of AOBS (ATSTT_AOBS) and an ATSI backup file. The ATSTT_AOBS includes a plurality of cells (C_IDN). In the drawing, C_IDN# indicates cell ID number within an AOBS, and AOB_IDN# AOB ID number within an AOBS.

Figure 12:
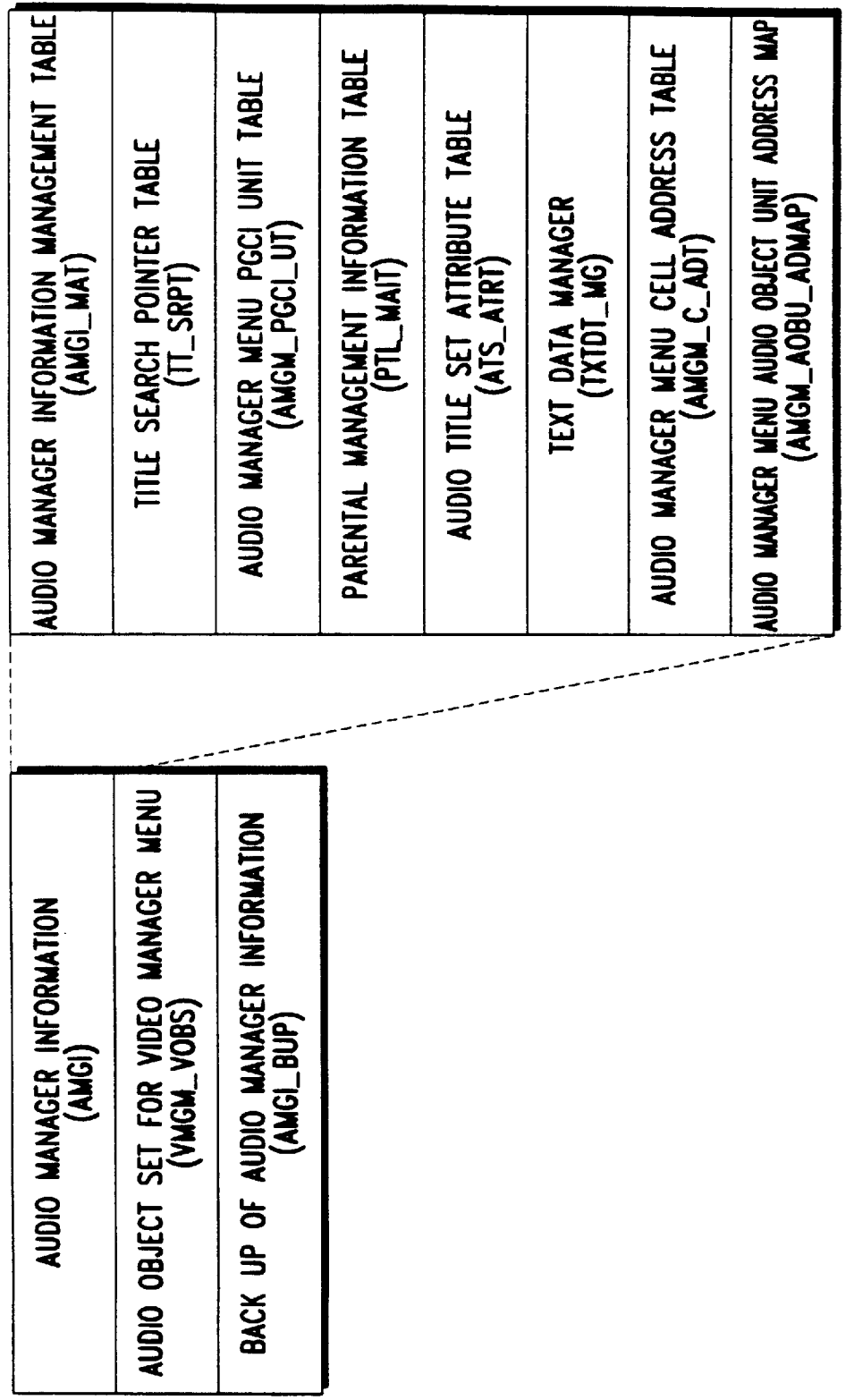
FIG. 12 is a diagram for illustrating the structure of an audio manager information (AMGI) of the DVD-Audio.

Referring to FIG. 12, the AMGI describes information on the related AUDIO_TS directory. The AMGI starts with an audio manager information management table (AMGI_MAT), followed by a title search pointer table (TT_SRPT), followed by an audio manager menu PGCI unit table (AMGM_PGCI_UT), followed by a parental management information table (PTL_MAIT), followed by an audio title set attribute table (ATS_ATRT), followed by a text data manager (TXTDT_MG), followed by an audio manager menu cell address table (AMGM_C_ADT), followed by an audio manager menu audio object unit address map (AMGM_AOBU_ADMAP).

Figure 13:
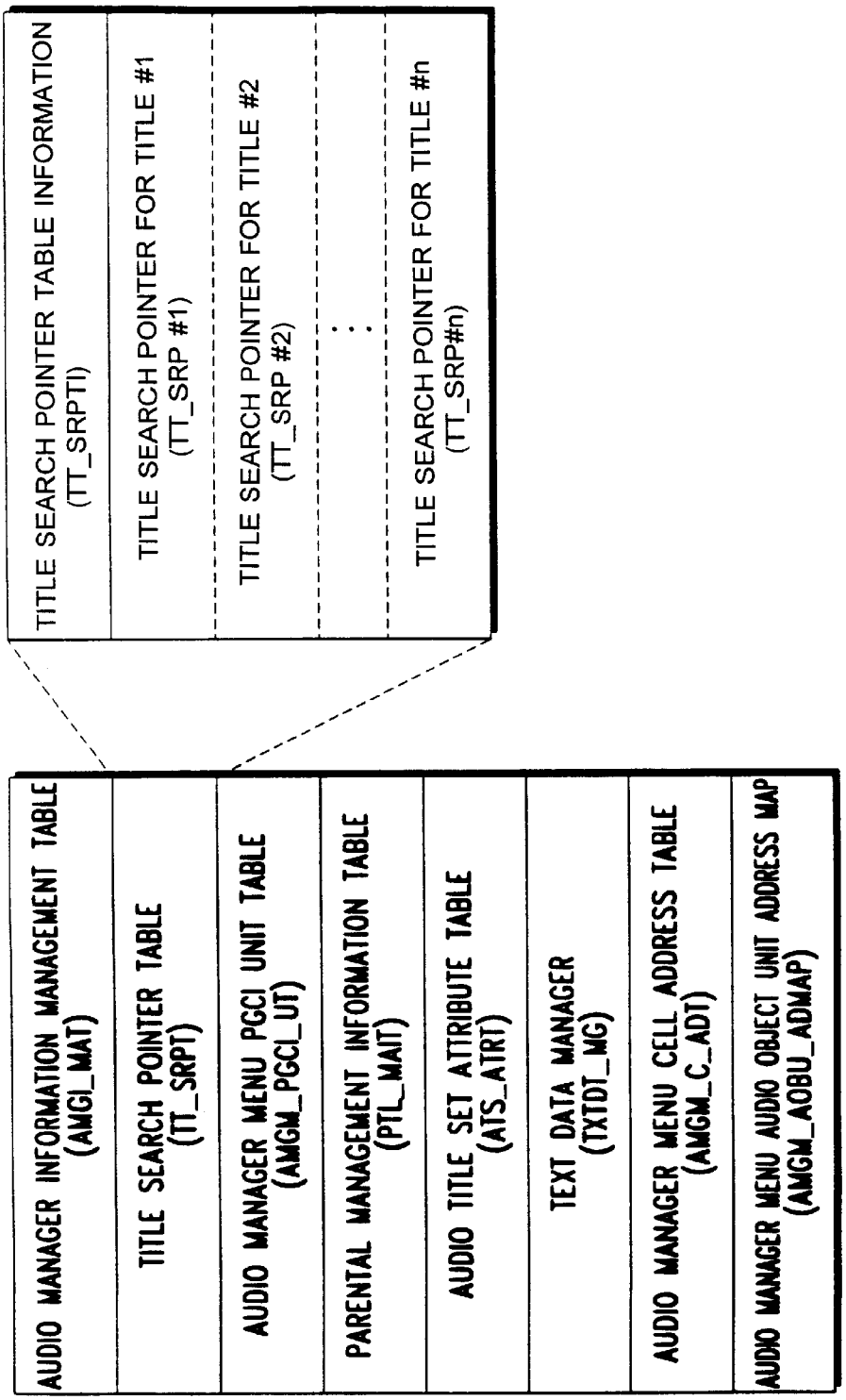
FIG. 13 is a diagram for illustrating the structure of a title search pointer table (TT_SRPT) of the DVD-Audio.

Referring to FIG. 13 for describing search information of an audio title under the VIDEO_TS directory, the TT_SRPT starts with TT_SRPT information (TT_SRPTI) followed by title search pointers (TT_SRPS) for every title under the AUDIO_TS directory. The title number # ranges from 1 to 99.

Figure 14:
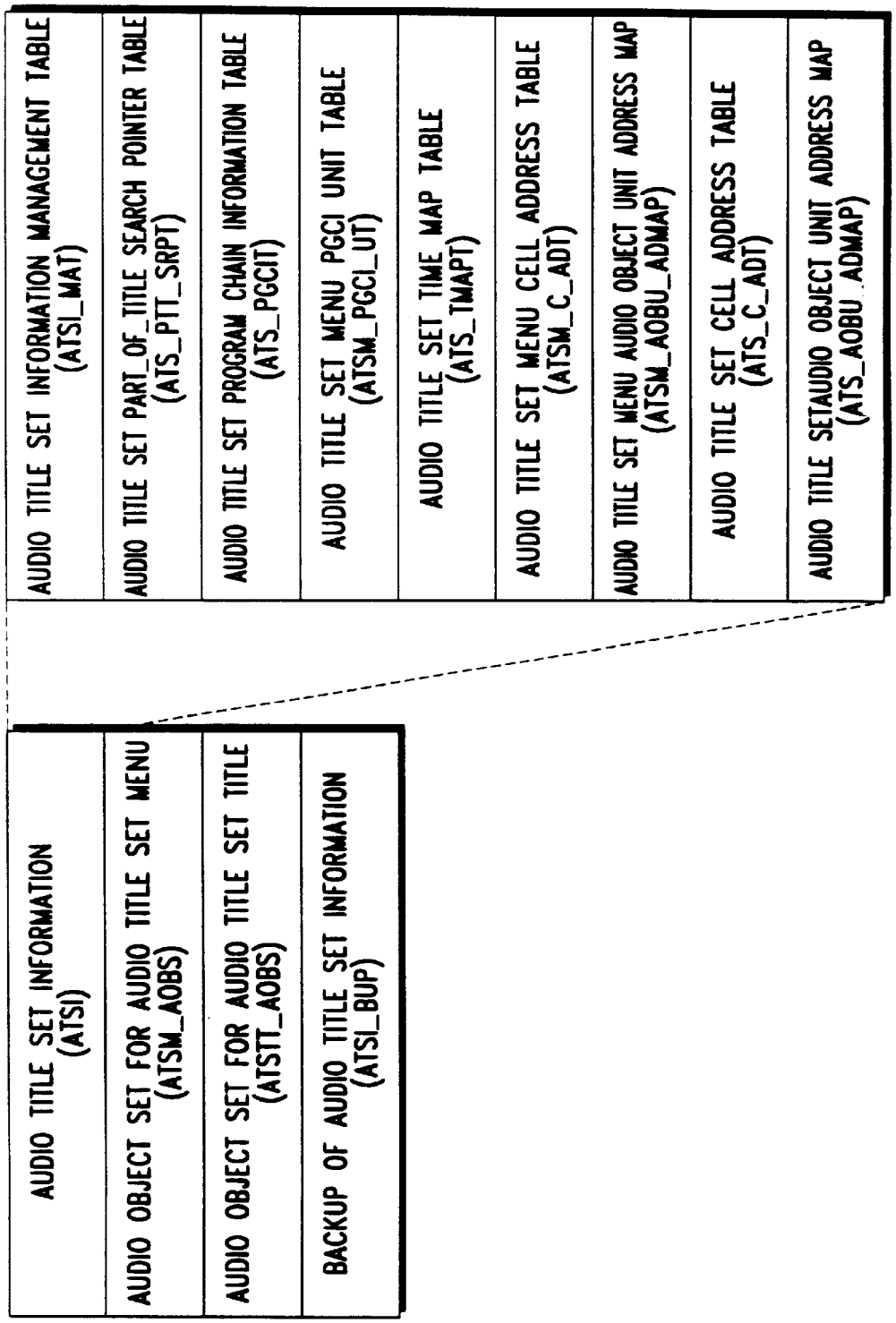
FIG. 14 is a diagram for illustrating the structure of an audio title set information (ATSI) of the DVD-Audio.

Referring to FIG. 14, the ATSI provides information for one or more audio titles and audio title set menu (ATSM). The ATSI describes the management information of these titles such as the information to search the part_of title (PTT) and the information to play back the audio object set (AOBS), and the audio title set menu (ATSM), as well as the information on the attribute of the AOBS.

The ATSI starts with audio title set information management table (ATSI_MAT), followed by an audio title set part_of_title search pointer table (ATS_PTT_SPRT), followed by an audio title set program chain information table (ATS_PGCIT), followed by an audio title set menu PGCI unit table (ATSM_PGCI_UT), followed by an audio title set time map table (ATS_TMAPT), followed by an audio title set menu cell address table (ATSM_C_ADT), followed by an audio title set menu audio object unit address map (ATSM_AOBU_ADMAP), followed by an audio title set cell address table (ATS_C_ADT), followed by an audio title set audio object unit address map (ATS_AOBU_ADMAP) as shown in FIG. 14.

Referring to FIG. 15, the ATSI_MAT describes the start address of each information in the ATSI and the attribute of the AOBS in the ATS. The ATSI_MAT is provided with ATSM_AST_ATR of RBP 260 to 267, ATS_AST_ATRT of RBP 516 to 579 and ATS_MU_AST_ATR_EXT of RBP 792 to 1298.

The audio coding mode of the ATSM_AST_ATR and ATS_AST_ATRT stores the coding information of the audio data recorded in the DVD-Audio. The present embodiment describes the recording on the DVD-Audio of the audio data of lossless psychoacoustic coding and pseudo-lossless psychoacoustic coding (hereinafter referred to as "psychoacoustic coding"). In addition, it is assumed that the psychoacoustic coding mode is performed with a DTS coding system, which may support the lossless psychoacoustic coding and pseudo-lossless psychoacoustic coding. In this case, the DTS coding mode is optional, and if b63 to b61 is '110b', the DTS audio coding mode is selected.

For the change of ATSM_AST_ATR, the data pattern and definition of b55 to b48 are changed. Namely, the sampling frequency data of b53 to b52 is changed, and the reserved bit of b51 is included in the audio channels, as shown in FIG. 16. Thus, the audio sampling frequency fs is changed as shown in Table 8.

TABLE 8

| b53-b52 | b51 | fs |
| --- | --- | --- |
| 00b | 0 | 48 KHz |
| 01b | 0 | 96 KHz |

TABLE 8-continued

| b53-b52 | b51 | fs |
| --- | --- | --- |
| 10b | 0 | 192 KHz |
| 11b | 0 | reserved |
| 00b | 1 | 44.1 KHz |
| 01b | 1 | 88.2 KHz |
| 10b | 1 | 176.4 KHz |
| 11b | 1 | reserved |

In addition, the number of the audio channels is changed as shown in Tables 9a and 9b.

TABLE 9a

| b51-b48 | Number of Audio Channels |
| --- | --- |
| 0000b | 1 ch (mono) |
| 0001b | 2 ch (stereo) |
| 0010b | 3 ch (multichannel) |
| 0011b | 4 ch (multichannel) |
| 0100b | 5 ch (multichannel) |
| 0101b | 6 ch (multichannel) |
| 0110b | 7 ch (multichannel) |
| 0111b | 8 ch (multichannel) |
| 1000b | 9 ch (multichannel) |
| 1001b | 10 ch (multichannel) |
| 1010b | 11 ch (multichannel) |
| 1011b | 12 ch (multichannel) |

TABLE 9b

| 1100b | 13 ch (multichannel) |
| --- | --- |
| 1101b | 14 ch (multichannel) |
| 1110b | 15 ch (multichannel) |
| 1111b | 16 ch (multichannel) |

Figure 17B:
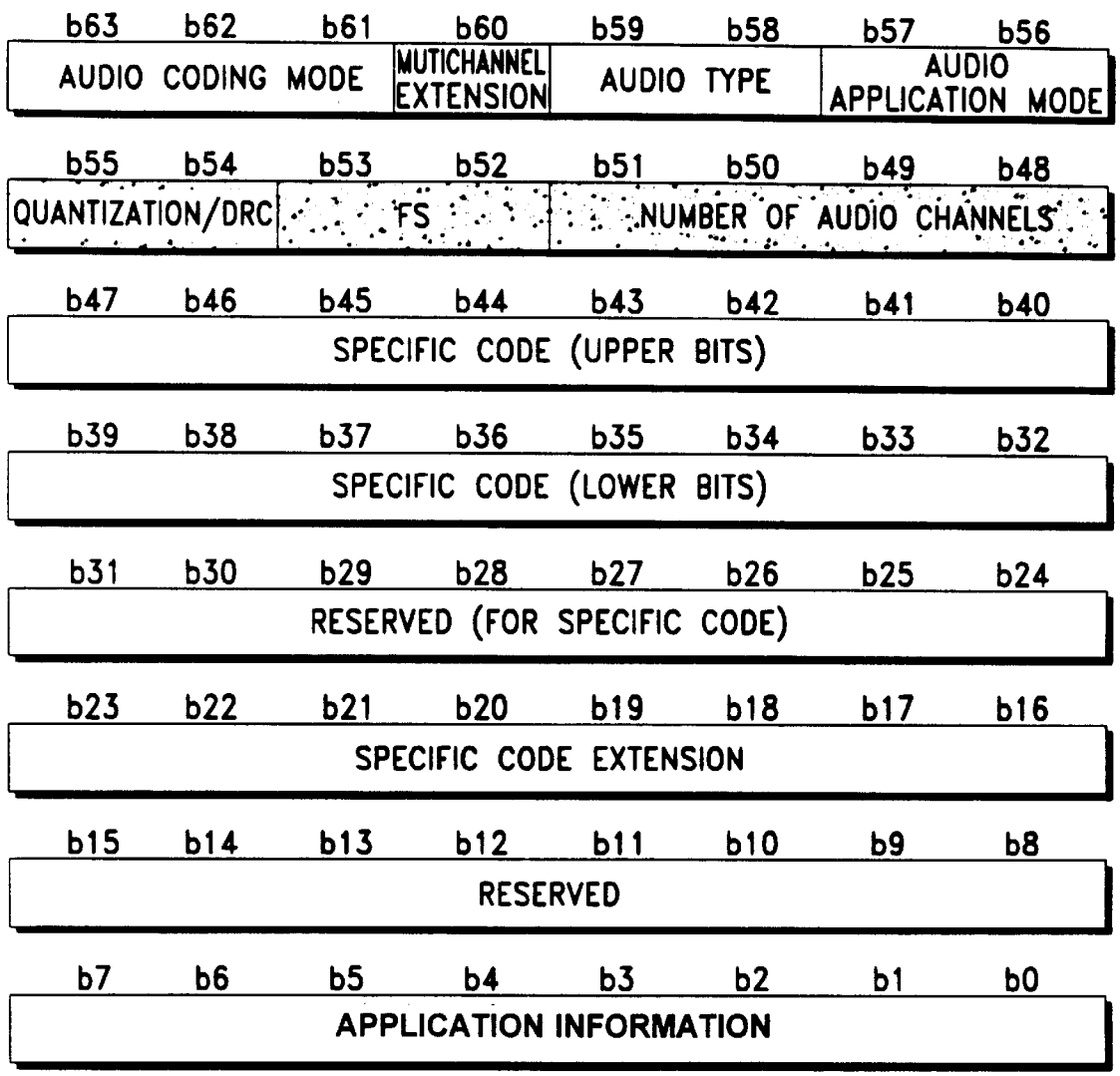
FIG. 17B is a diagram for illustrating the structure of an audio stream attribute of an audio title set (ATS_AST_ATR) of the DVD-Audio.

The ATS_AST_ATRT of RBP 516 to 579 in the ATSI_MAT as shown in FIG. 15 stores ATS_AST_ATRs of 8 audio streams #0 to #7 as shown in FIG. 17A, each of which includes 8 bytes structured as shown in FIG. 17B, and each field value serves as the internal information of the audio stream of the ATSM_AOBS.

The data pattern and definition of b55 to b48 are changed as shown in FIG. 17B. Namely, in b55 to b48 of the VTS_AST_ATRT as shown in FIG. 8B, the reserved bit of b51 is included in the audio channels. Consequently, the audio sampling frequency fs is changed as shown in Table 8 while the number of the audio channels is changed as shown in Tables 9a and 9b.

In the ATS_MU_AST_ATRT, the information as shown in FIGS. 18B and 18C are added to the information of FIGS. 9B and 9C. The ATS_MU_AST_ATR(1) and ATS_MU_AST_ATR(2) provide the information on the audio data and channel mixing coefficients up to 8 channels, and therefore can not provide the information on the linear PCM audio over 8 channels. The present invention may provide up to 13 channels, so that the information from the 9th channel to the 13th channel are recorded in the reserved regions after the ATS_MU_AST_ATR(1) and ATS_MU_AST_ATR(2). Referring to FIG. 18A, the ATS_MU_AST_ATRT provides 13 ATS_MU_AST_ATRs #0 to #12 each having 39 bytes to store the information on 13 audio channels and the mixing coefficients.

Each ATS_MU_AST_ATR includes the audio channel information as shown in FIG. 18B and the mixing coefficient information as shown in FIG. 18C. FIG. 18B illustrates only the information of the extended five audio channels ATS_MU_AST_ATR_EXT(1), while omitting the ATS_MU_

AST_ATR(1) for storing the data information of the 8 audio channels. Likewise, FIG. 18C illustrates only the information of the extended five audio channels ATS_MU_AST_ATR_EXT(2), while omitting the ATS_MU_AST_ATR (2) for storing the data information of the 8 audio channels.

Figure 19:
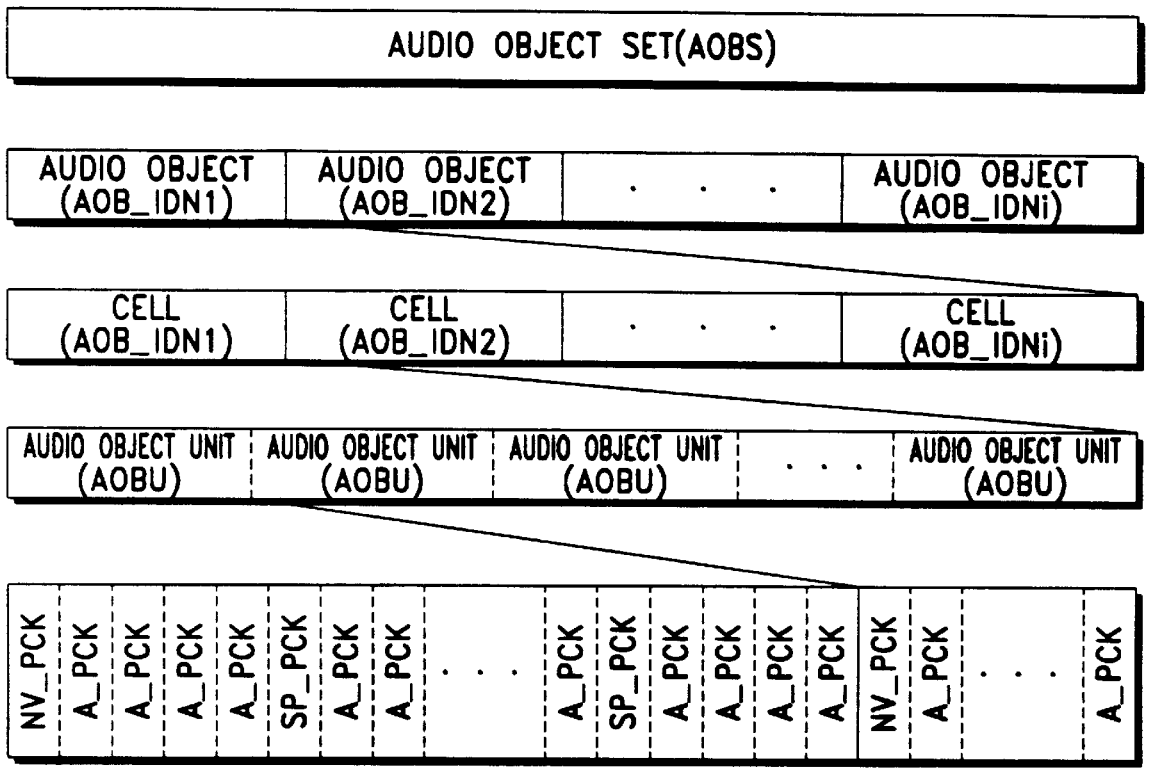
FIG. 19 is a diagram for illustrating the structure of an audio object set (AOBS) of the DVD-Audio.

The ATSI_MAT represents the information on the audio data recorded on the DVD-Audio, forming the first part of each audio title and followed by the AOBS of substantial audio data. Of course, the VTSI_MAT as shown in FIG. 7 represent also the information on the video data, sub-picture data and audio data recorded on the DVD-Video, forming the first part of each video title and followed by the VOBS of substantial data. The AOBS is structured as shown in FIG. 19, providing a plurality of audio packs to store the audio data. Likewise, the VOBS is structured similar to FIG. 19, providing a plurality of video packs, sub-picture packs and audio packs to respectively store the video data, sub-picture data and audio data.

The structure of the AOBS is similar to that of the VOBS, and therefore description of the structure of the VOBS will help understand the structure of the AOBS. The VOBS includes a plurality of video objects VOB_IDN1 to VOB_IDNi, each of which in turn includes a plurality of cells C_IDN1 to C_IDNj, each of which in turn includes a plurality of video object units VOBUs, each of which in turn includes a plurality of video packs.

Figure 20:
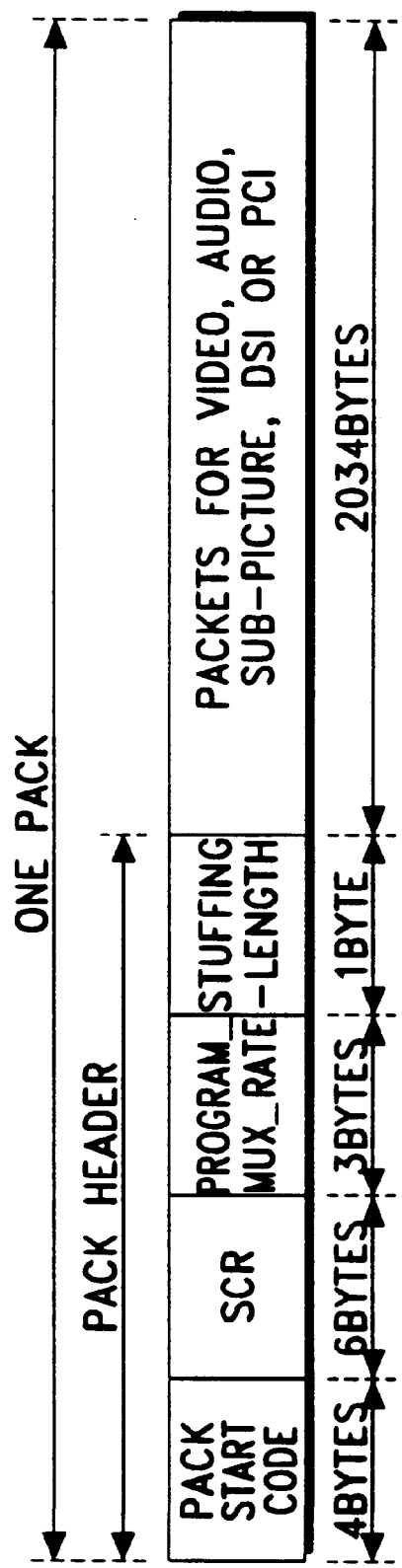
FIG. 20 is a diagram for illustrating a pack structure of the DVD-Audio.

The video data recorded in a DVD-Video includes a plurality of packs, whose structure is illustrated in FIG. 20 without a padding packet. Referring to FIG. 20, one pack has a size of 2048 bytes including a pack header of 14 bytes and a plurality of packets for video, audio, sub-picture, DSI or PCI of 2034 bytes. Further, the packet header includes a pack start code of 4 bytes, SCR of 6 bytes, program_mux_rate of 3 bytes and stuffing_length of 1 byte.

Figure 21A:
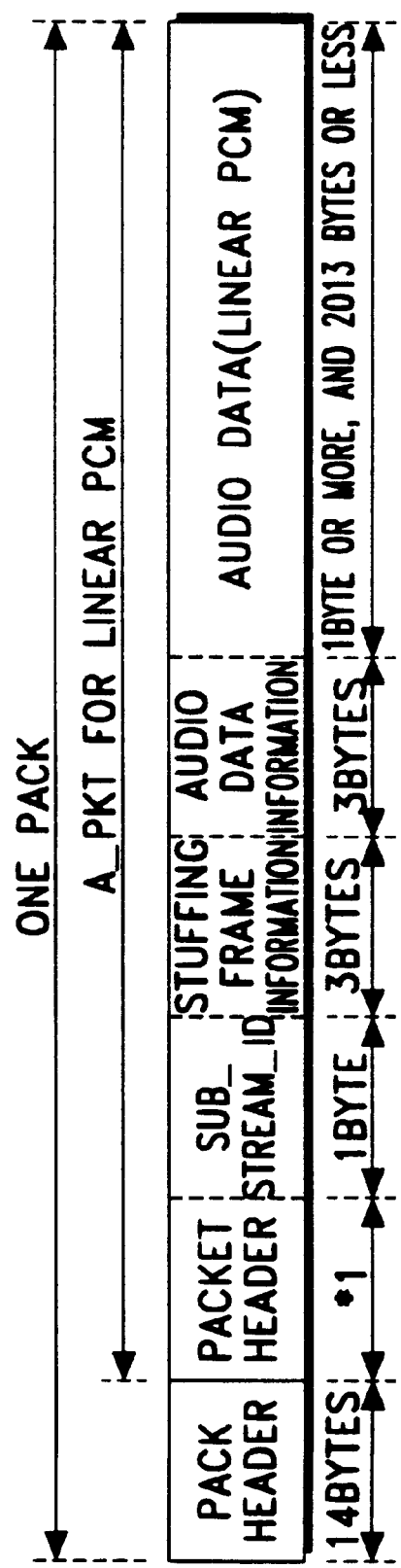
FIGS. 21A to 21D are diagrams for illustrating various pack structures of the DVD-Audio.

Referring to FIG. 21A, the linear PCM audio pack includes a pack header of 14 bytes and a linear audio packet of 2034 bytes. The audio packet includes a packet header of 1 byte, sub_stream_id of 1 byte, audio frame information of 3 bytes and linear PCM audio data of 1 to 2013 bytes.

Figure 21B:
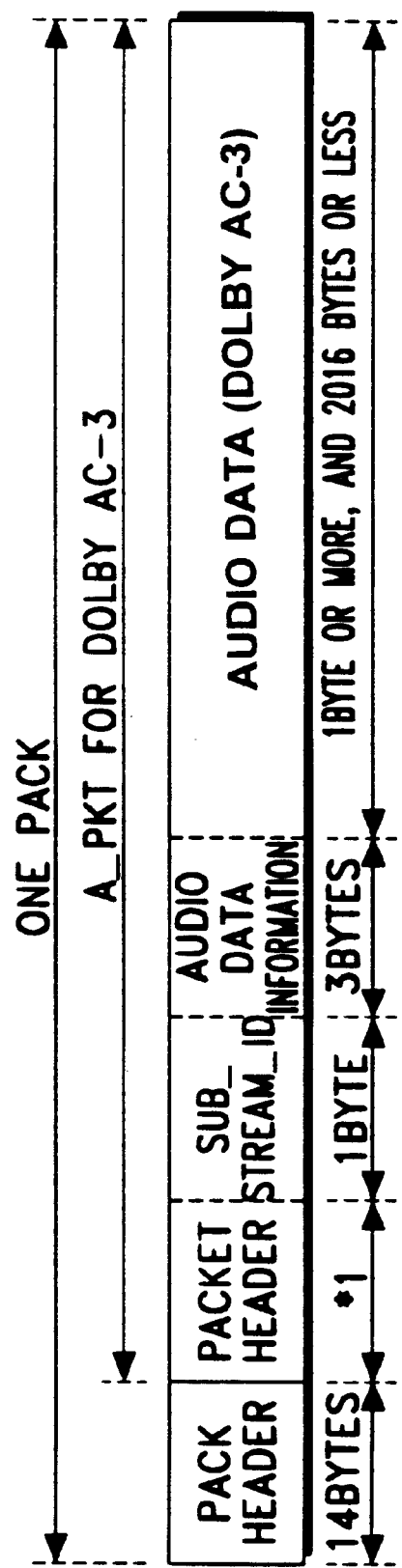

Referring to FIG. 21B, the dolby AC-3 audio pack includes a pack header of 14 bytes and a dolby AC-3 audio packet of 2034 bytes. The audio packet further includes a packet header of 1 byte, sub_stream_id of 1 byte, audio frame information of 3 bytes and AC-3 audio data of 1 to 2016 bytes.

Figure 21C:
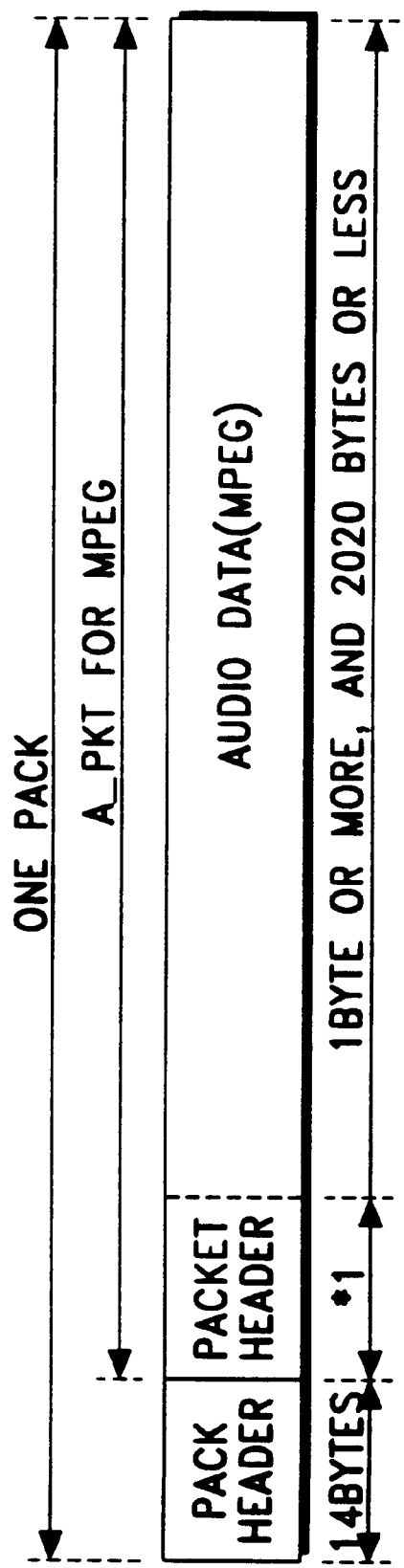
Figure 21D:
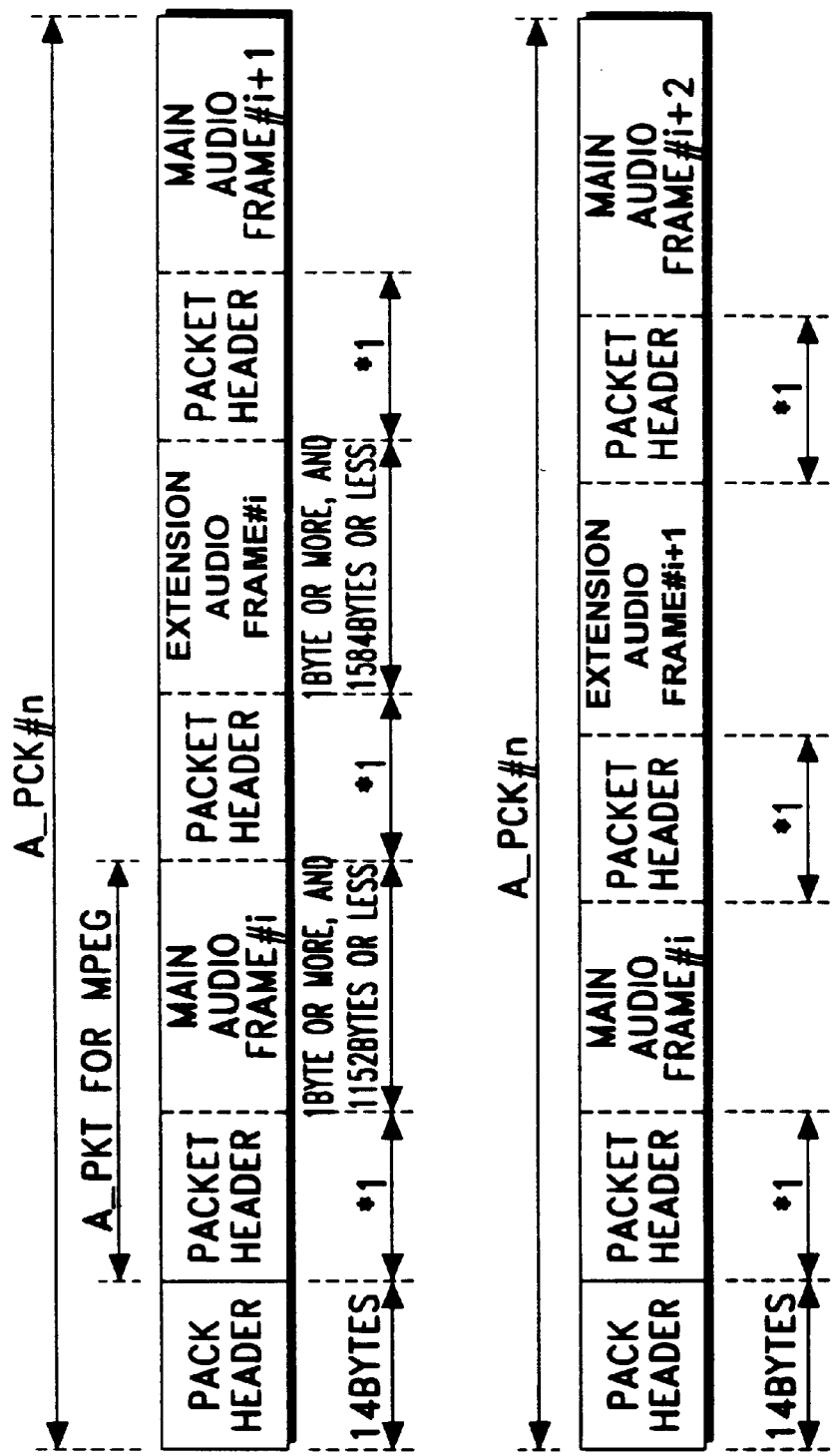

FIG. 21C illustrates the structure of an MPEG-1 or MPEG-2 audio pack without an extension bit stream, and FIG. 21D the structure of MPEG-2 with an extension stream. The structures of the audio packs as shown in FIGS. 21A to 21D are shown in Table 10, additionally provided with private data areas corresponding to their formats.

TABLE 10

| Field | Bit | Byte | Value | Comment |
|---|---|---|---|---|
| packet_start_code_prefix | 24 | 3 | 00 0001h | |
| stream_id | 8 | 1 | 1011 1101b | private_stream_1 |
| PES_packet_length | 16 | 2 | | |
| '10' | 2 | 3 | | |
| PES_scrambling_control | 2 | 3 | 00b | not scrambled |
| PES_priority | 1 | 3 | 0 | not priority |
| data_alignment_indicator | 1 | 3 | 0 | not defined by descriptor |
| copyright | 1 | 3 | 0 | not defined by descriptor |
| original_or_copy | 1 | 3 | 1 or 0 | original: 1 copy: 0 |
| PTS_DTS_flags | 2 | 3 | 10 or 00b | |
| ESCR_flag | 1 | 3 | 0 | no ESCR field |
| ES_rate_flag | 1 | 3 | 0 | no EST rate field |
| DSTM_trick_mode_flag | 1 | 3 | 0 | no trick mode field |
| additional_copy_info_flag | 1 | 3 | 0 | no copy info field |
| PES_CRC_flag | 1 | 3 | 0 | no CRC field |
| PES_extension_flag | 1 | 3 | 0 or 1 | |
| PES_header_data_length | 8 | 3 | 0 to 15 | |
| '0010' | 4 | 5 | provider defined | Note 1 |
| PTS [32...30] | 3 | 5 | provider defined | Note 1 |
| marker_bit | 1 | 5 | provider defined | Note 1 |
| PTS [29...15] | 15 | 5 | provider defined | Note 1 |
| marker_bit | 1 | 5 | provider defined | Note 1 |
| PTS [14...0] | 15 | 5 | provider defined | Note 1 |
| marker_bit | 1 | 5 | provider defined | Note 1 |
| PES_private_data_flag | 1 | 1 | 0 | Note 2 |
| pack_header_field_flag | 1 | 1 | 0 | Note 2 |
| program_packet_sequence_counter_flag | 1 | 1 | 0 | Note 2 |
| P_STD_buffer_flag | 1 | 1 | 1 | Note 2 |
| reserved | 3 | 1 | 111b | Note 2 |
| PES_extension_flag_2 | 1 | 1 | 0 | Note 2 |
| '01' | 2 | 2 | 01b | Note 2 |
| P_STD_buffer_scale | 1 | 2 | 1 | Note 2 |
| P_STD_buffer_size | 13 | 2 | 58 | Note 2 |
| stuffing_byte | — | 0–7 | | |

In Table 10, Notes 1 and 2 are described as follows:

Note 1: "PTS[32 ... 0]" shall be described in every audio packet in which the first sample of an audio frame is included.

Note 2: These fields occur in the first audio packet of each VOB, and are prohibited in the subsequent audio packets.

TABLE 11

| Field | Bit | Byte | Value | Comment |
|---|---|---|---|---|
| sub_stream_id | 8 | 1 | 10100***b | Note 1 |
| number_of_frame_headers | 8 | | Provider | Note 2 |
| first_access_unit_pointer | 16 | | Defined | Note 3 |
| audio_emphasis_flag | 1 | | | Note 4 |
| audio_mute_flag | 1 | 3 | | Note 5 |
| reserved | 1 | | 0 | |
| audio_frame_number | 5 | | Provider | Note 6 |
| quantization_word_length | 2 | | Defined | Note 7 |
| audio sampling frequency | 2 | | | Note 8 |
| reserved | 1 | | 0 | |
| number_of_audio_channels | 3 | 3 | Provider Defined | Note 9 |
| dynamic_range_control | 8 | | | Note 10 |
| Audio Data Area (Linear PCM) | | | | |

In Table 11, Notes 1 to 10 are described as follows:

Note 1: *** represents decoding an audio data stream number.

Note 2: "number_of_frame_headers" describes the number of audio frames whose first byte is in this audio packet.

Note 3: The access unit is the audio frame. The first access unit is the first audio frame which has the first byte of the audio frame.

Note 4: "audio_13emphasis_flag" describes the state of emphasis. When "audio_sampling_frequency" is 96 KHz, "emphasis off" is described in this field. The emphasis is applied to all audio samples decoded from the first access unit.

0b: emphasis off

1b: emphasis on

Note 5: "audio_mute_flag" describes the state of mute while all data in the audio frame is ZERO. The mute is applied to all audio samples decoded from the first access unit.

Note 6: "audio_frame_number" describes the frame number of the first access unit in the Group of audio frame (GOF) with the numbers between '0' and '19'.

Note 7: "quantization_word_length" describes the wordlength which the audio samples are quantized to.

00b: 16 bits

01b: 20 bits

10b: 24 bits

11b: reserved

Note 8: "audio_sampling_frequency" describes the sampling frequency of the audio sample.

00b: 48 KHz

01b: 96 KHz Others: reserved

Note 9: "number_of_channels" describes the number of audio channels.

000b: 1ch (mono)

001b: 2ch (stereo)

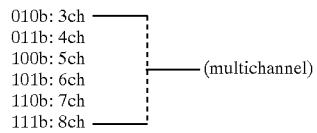

Note 10: "dynamic_range_control" describes the dynamic word control word to compress the dynamic range from the first access unit.

In the audio packets as shown in FIGS. 21A to 21D, the stream_id of the linear PCM audio packet is 1011 1101b (private_stream_1), and the sub_stream_id 1010 0* * *b. The stream_id of the AC-3 audio packet is 1011 1101b (private_stream_1), and the sub_stream_id 1000 0* * *b. The stream_id of the MPEG audio packet is 1100 0* * *b or 1101 0* * *b, and no sub_stream_id. "* * * " in the stream_id or sub_stream_id indicates the decoding audio stream number which has a value between "0" and "7", and the decoding audio stream numbers are not assigned the same number regardless of the audio compression mode.

Figure 22:
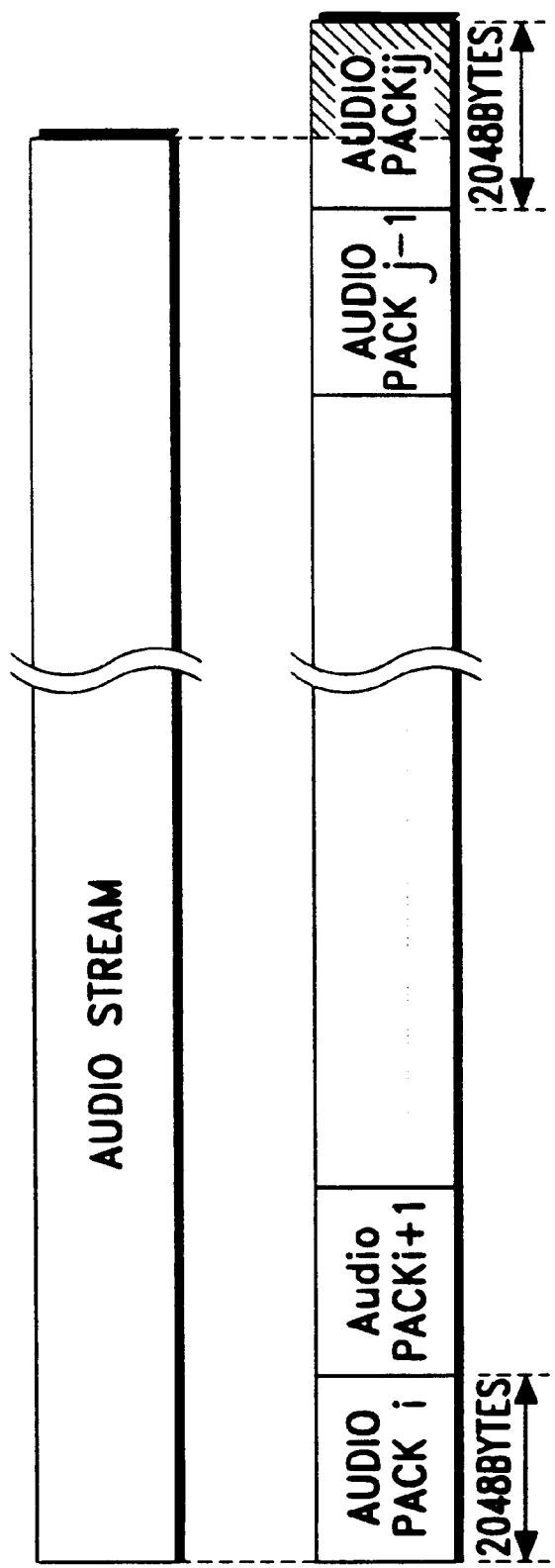
FIG. 22 is a diagram for illustrating a linear PCM audio packet in the audio pack as shown in FIG. 21A.

FIG. 22 illustrates the structure of the audio stream and packs. The audio data used in the DVD-Audio may include linear PCM data, dolby AC-3 data and MPEG audio data. The audio stream further includes a plurality of audio packs. In addition, each audio pack constitutes a unit of 2048 bytes as shown in FIG. 22. In this case, the form of encoding the linear PCM audio is based on Table 12.

TABLE 12

| Sampling frequency (fs) | 48 KHz | 96 KHz |
|---|---|---|
| Sampling Phase | Shall be simultaneous for all channels in a stream | |
| Quantization | 16 bits or more, 2's complementary code | |
| Emphasis | Can be applied (zero point: 50 μs, pole: 15 μs) | Can not be applied |

In Table 12, the audio stream data for linear PCM includes contiguous GOFs (Group of Audio Frames), each of which includes 20 audio frames except for the last GOF. The last GOF includes no more than 20 audio frames.

Figure 23:
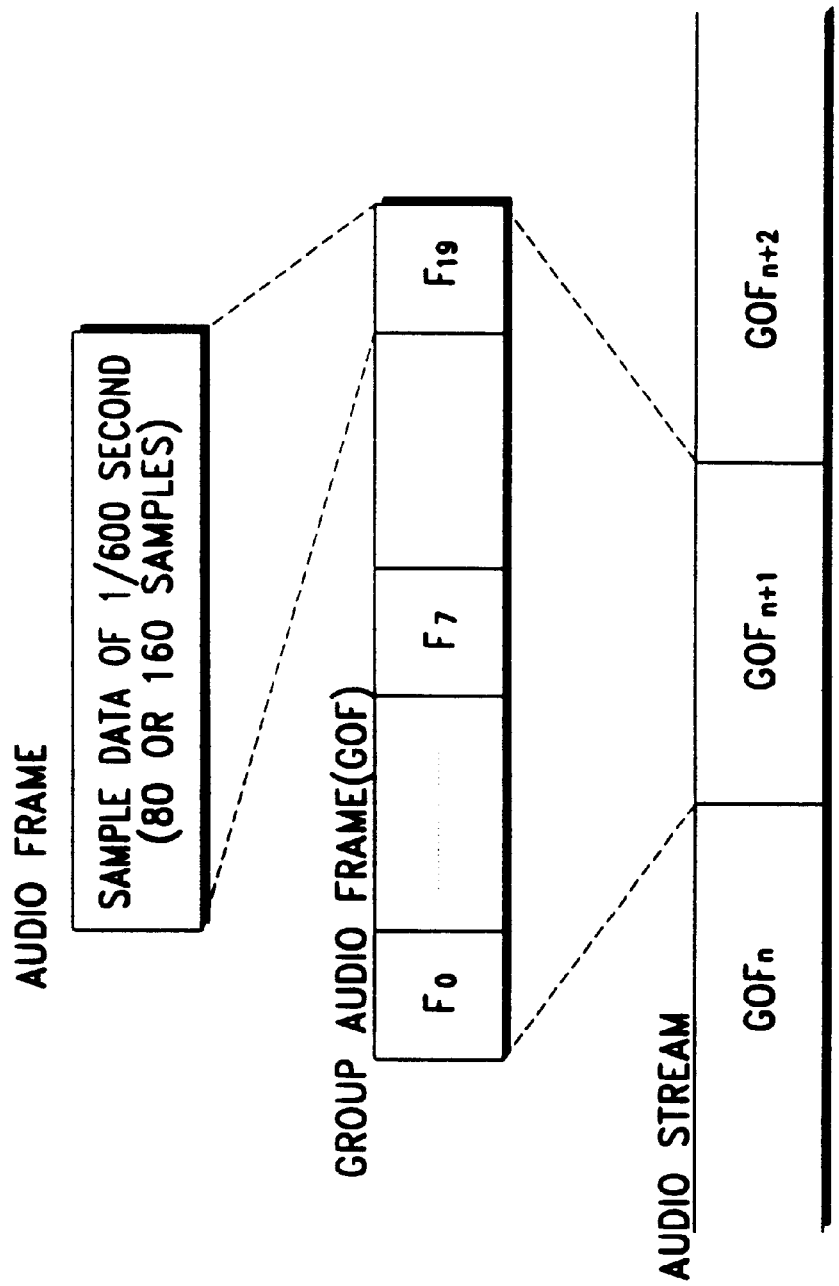
FIG. 23 is a diagram for illustrating the structure of a linear PCMA audio frame of the DVD-Audio.

FIG. 23 illustrates the structure of the audio frame. One audio frame includes sample data which correspond to the presentation time of 1/600 second. One audio frame contains 80 or 160 audio sample data according to a frequency (fs) of 48 KHz or 96 KHz. One GOF corresponds to the presentation time of 1/30 second.

Figure 24A:
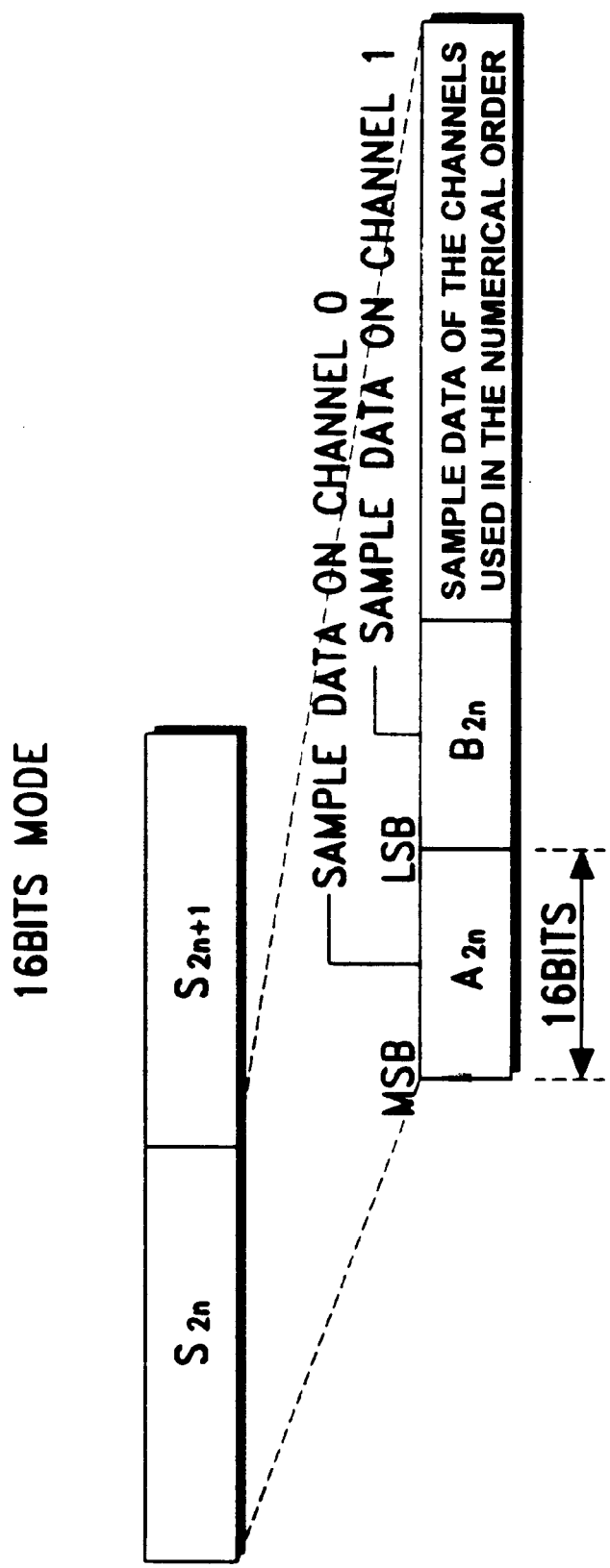
FIGS. 24A to 24C are diagrams for illustrating a sample data arrangement of the linear PCM.
Figure 24B:
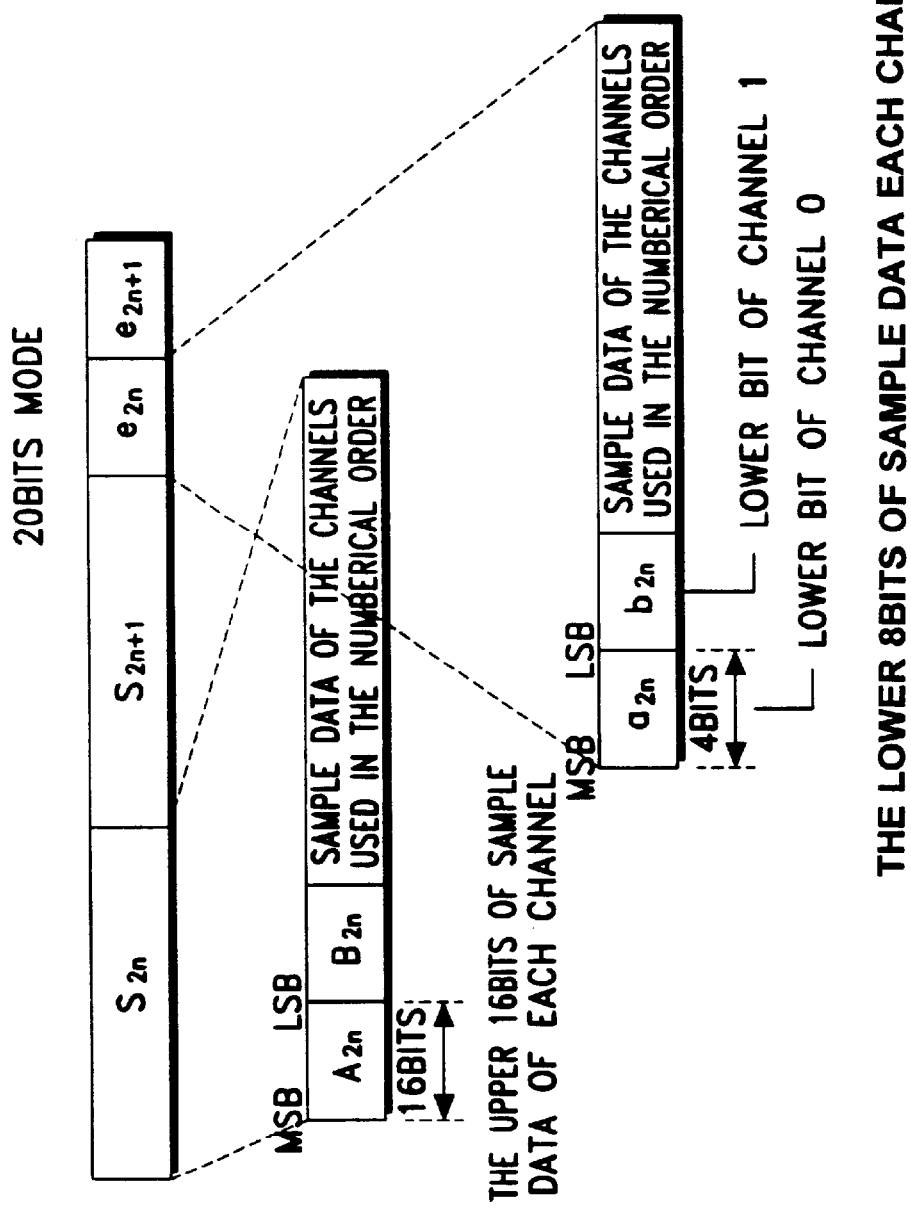
Figure 24C:
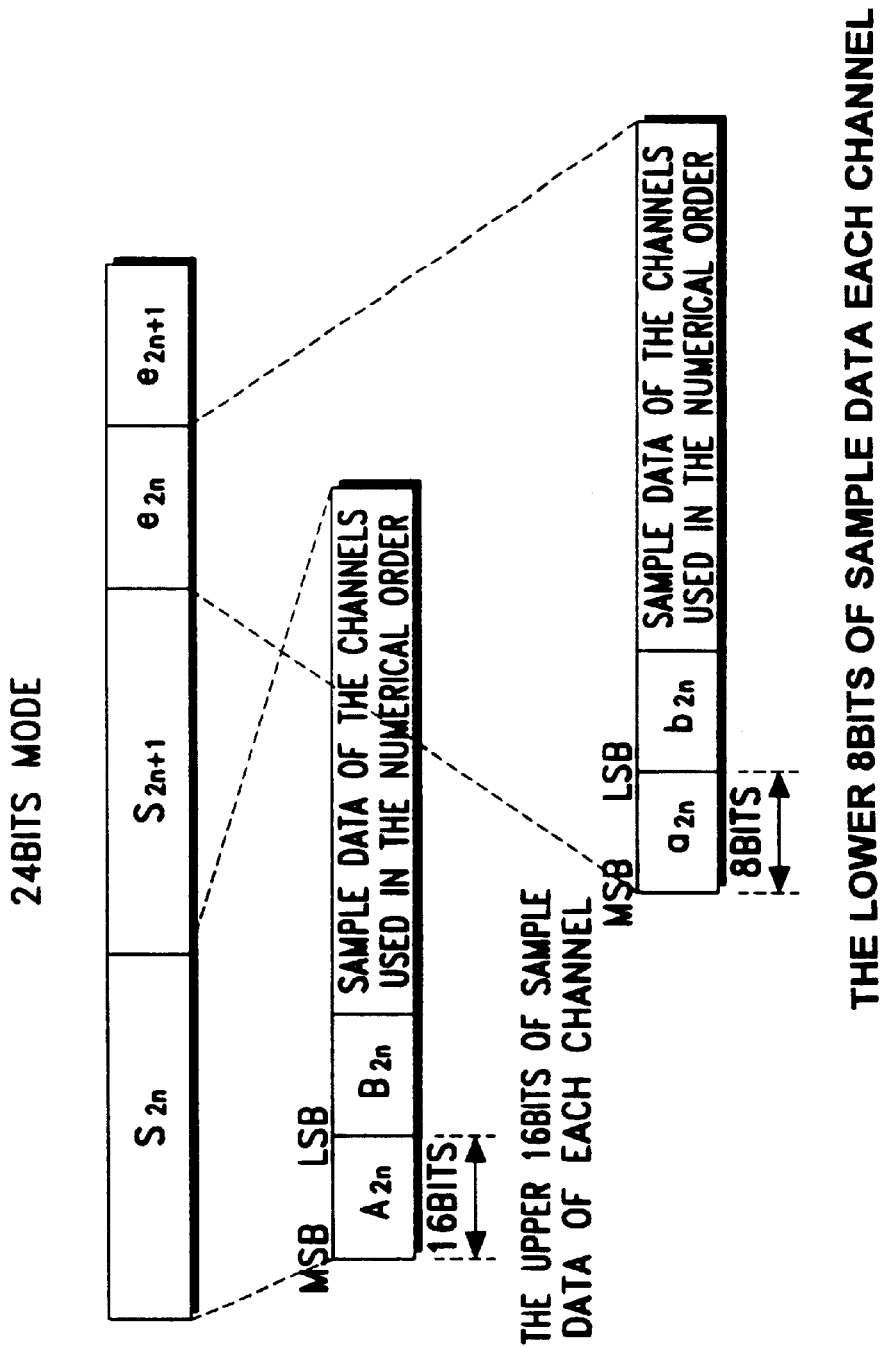

FIGS. 24A to 24C illustrate a sample data alignment for linear PCM. Sample data is formed by the data from each channel sampled out at the same time. Therefore, the size of sample data varies with the audio stream attribute. The sampled data is continuously arranged. Two sample data for each mode are shown in FIGS. 24A to 24C. FIG. 24A illustrates a 16 bits mode, FIG. 24B illustrates a 20 bits mode and FIG. 24C illustrates a 24 bits mode. The packet data structure of the linear PCM audio is as shown in Table 13.

TABLE 13

| Stream Mode | | | Data in a Packet | | | |
|---|---|---|---|---|---|---|
| Number of Channels | fs (KHz) | Quantization | Maximum number of samples in a packet | Data size (byte) | Packet Stuffing of first/other PES packet (byte) | Padding packet for first/other PES packet (byte) |
| 1 mono | 48/96 | 16 | 1004 | 2008 | 2/5 | 0/0 |
| | 48/96 | 20 | 804 | 2010 | 0/3 | 0/0 |
| | 48/96 | 24 | 670 | 2010 | 0/3 | 0/0 |
| 2 stereo | 48/96 | 16 | 502 | 2008 | 2/5 | 0/0 |
| | 48/96 | 20 | 402 | 2010 | 0/3 | 0/0 |
| | 48/96 | 24 | 334 | 2004 | 6/0 | 0/9 |
| 3 | 48/96 | 16 | 334 | 2004 | 6/0 | 0/9 |
| | 48/96 | 20 | 268 | 2010 | 0/3 | 0/0 |
| | 48 | 24 | 222 | 1988 | 0/0 | 12/15 |
| 4 | 48/96 | 16 | 250 | 2000 | 0/0 | 10/13 |
| | 48 | 20 | 200 | 2000 | 0/0 | 10/13 |
| | 48 | 24 | 166 | 1992 | 0/0 | 18/21 |
| 5 | 48 | 16 | 200 | 2000 | 0/0 | 10/13 |
| | 48 | 20 | 160 | 2000 | 0/0 | 10/13 |
| | 48 | 24 | 134 | 2010 | 0/3 | 0/0 |
| 6 | 48 | 16 | 166 | 1992 | 0/0 | 18/21 |
| | 48 | 20 | 134 | 2010 | 0/3 | 0/0 |
| 7 | 48 | 16 | 142 | 1988 | 0/0 | 22/25 |
| 8 | 48 | 16 | 124 | 1984 | 0/0 | 26/29 |

If the number of samples is less than in Table 13, the length of a padding packet may increase to adjust the pack size. Samples shall be aligned at packet boundary. Namely, the audio sample data of every audio packet for linear PCM audio always start with the first byte of $S_{2n}$ described in Table 13. The channel assignment for linear PCM is as follows:

In the stereo presentation mode, the descriptions of channels, ACH0 and ACH1 correspond to left channel (L-ch) and right channel (R-ch) respectively. Multichannel coding is required to keep compatibility with the stereo mode.

The structure of the DVD-Audio is as shown in FIG. 19. Since the DVD-Audio is to store audio data, it contains no video pack (V_PCK) or sub-picture pack (SP_PCK), or otherwise only small amounts of them. The AOBS includes a plurality of packs of data as the VOBS does. The general structure of the audio pack is as shown in FIGS. 20 and 21A to 21D. It is assumed that the inventive DVD-Audio does not employ MPEG and AC-3 and instead records audio data of linear PCM and compression coding system.

Tables 10 and 11 illustrate the linear PCM audio packet of the DVD-Video, which may be altered to obtain the linear PCM audio packet of the DVD-Audio. Describing the linear PCM system of the DVD-Audio, the sampling frequencies are 48, 44.1, 96, 188.2, 192 or 176.4 KHz, the number of quantization bits is 16, 20 or 24 bits, and the number of audio channels is from 1ch to the maximum allowed by the bit rate. The number of the audio channels may be determined by Eq. 1.

$$N = \frac{Mb\gamma}{Fs * Qb} \qquad \text{Eq. 1}$$

Fs: Sampling Frequency(Hz)→48 KHz, 44.1 KHz, 96 KHz, 88.2 KHz, 192 KHz, or 176.4 KHz Qb: Number of Quantization Bits→16 bits, 20 bits, or 24 bits Mbγ: Maximum Data Transfer Rate of DVD(Mbps) →10.08 Mbps N: Maximum Number of Possible Channels Determined by Data Transmission Rate, Sampling Frequency and Number of Quantization Bits of DVD.

The number of channels determined by Eq. 1 is shown in Table 14.

TABLE 14

| Sampling Frequency | Number of Quantization Bits | Maximum Number of Channels |
|---|---|---|
| 48 KHz/44.1 KHz | 16 bits | 8 |
| 48 KHz/44.1 KHz | 20 | 8 |
| 48 KHz/44.1 KHz | 24 | 8 |
| 96 KHz/88.2 KHz | 16 | 6 |
| 96 KHz/88.2 KHz | 20 | 5 |
| 96 KHz/88.2 KHz | 24 | 4 |
| 192 KHz/176.4 KHz | 16 | 3 |
| 192 KHz/176.4 KHz | 20 | 2 |
| 192 KHz/176.4 KHz | 24 | 2 |

Figure 25:
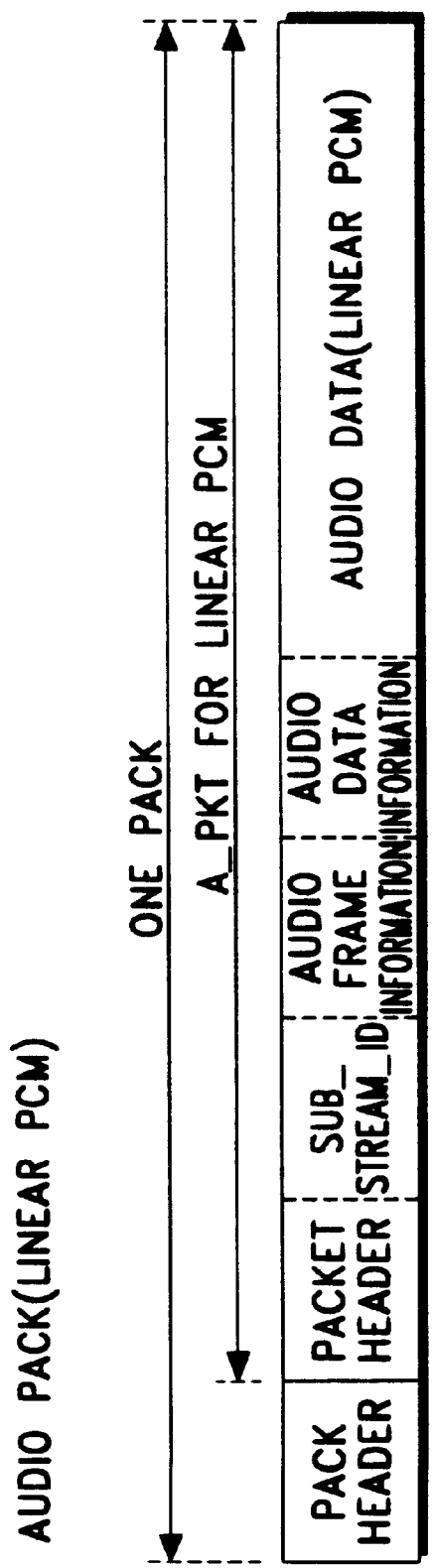
FIG. 25 is a diagram for illustrating the structure of a linear audio packet of the DVD-Audio.

The structure of the linear PCM audio pack of the DVD-Audio is constructed as shown in FIG. 25, which is the same as that of the DVD-Video as shown in FIG. 21A. Namely, one audio pack comprises a pack header of 14 bytes and one or more linear PCM packets of at maximum 2021 bytes. The pack header is based on an MPEG2 system layer.

The structure of the linear PCM audio packet is also based on the MPEG2 system layer. The linear PCM audio packet is constructed as shown in Tables 15 and 16. Table 15 has the same structure as Table 10 while Table 16 for representing private data structure has a structure different from that of Table 11.

TABLE 15

| Field | Bit | Byte | Value | Comment |
|---|---|---|---|---|
| packet_start_code_prefix | 24 | 3 | 00 0001h | |
| stream_id | 8 | 1 | 1011 1101b | private_stream_1 |
| PES_packet_length | 16 | 2 | | |
| '10' | 2 | 3 | | |
| PES_scrambling_control | 2 | 3 | 00b | scrambled |
| PES_priority | 1 | 3 | 0 | no priority |
| data_alignment_indicator | 1 | 3 | 0 | not defined by descriptor |
| copyright | 1 | 3 | 0 | not defined by descriptor |
| original_or_copy | 1 | 3 | 1 or 0 | original: 1 copy: 0 |
| PTS_DTS_flags | 2 | 3 | 10 or 00b | |
| ESCR_flag | 1 | 3 | 0 | no ESCR field |
| ES_rate_flag | 1 | 3 | 0 | no EST rate field |
| DSTM_trick_mode_flag | 1 | 3 | 0 | no trick mode field |
| additional_copy_info_flag | 1 | 3 | 0 | no copy info field |
| PES_CRC_flag | 1 | 3 | 0 | no CRC field |
| PES_extension_flag | 1 | 3 | 0 or 1 | |
| PES_header_data_length | 8 | 3 | 0 to 15 | |
| '0010' | 4 | 5 | provider defined | Note 1 |
| PTS [32...30] | 3 | 5 | provider defined | Note 1 |
| marker_bit | 1 | 5 | provider defined | Note 1 |
| PTS [29...15] | 15 | 5 | provider defined | Note 1 |
| marker_bit | 1 | 5 | provider defined | Note 1 |
| PTS [14...0] | 15 | 5 | provider defined | Note 1 |
| marker_bit | 1 | 5 | provider defined | Note 1 |
| PES_private_data_flag | 1 | 1 | 0 | Note 2 |
| pack_header_field_flag | 1 | 1 | 0 | Note 2 |
| program_packet_sequence_counter_flag | 1 | 1 | 0 | Note 2 |
| P_STD_buffer_flag | 1 | 1 | 1 | Note 2 |
| reserved | 3 | 1 | 111b | Note 2 |
| PES_extension_flag_2 | 1 | 1 | 0 | Note 2 |
| '01' | 2 | 2 | 01b | Note 2 |
| P_STD_buffer_scale | 1 | 2 | 1 | Note 2 |
| P_STD_buffer_size | 13 | 2 | 58 | Note 2 |
| stuffing_byte | — | 0–7 | | |

TABLE 16

| Field | Bit | Byte | Value | Comment |
|---|---|---|---|---|
| sub_stream-id | 8 | 1 | 10100***b | Note 1 |
| number_of_frame_headers | 8 | | Provider Defined | Note 2 |
| first_access_unit_pointer | 16 | | Provider Defined | Note 3 |
| audio_emphasis_flag | 1 | | Provider Defined | Note 4 |
| audio_mute_flag | 1 | | Provider Defined | Note 5 |
| reserved | 1 | 3 | 0 | |
| audio_frame_number | 5 | | Provider Defined | Note 6 |
| quantization_word_length | 2 | | Provider Defined | Note 7 |

TABLE 16-continued

| Field | Bit Byte | Value | Comment |
|---|---|---|---|
| audio_sampling_frequency | 3 | Provider Defined | Note 8 |
| number_of_audio_channels | 3 | Provider Defined | Note 9 |
| dynamic_range_control | 8 | Provider Defined | Note 10 |
| Audio Data Area (Linear PCM) | | | |

In Table 16, Notes 1 to 10 are described as follows:

Note 1: * * * represents decoding the audio data stream number.

Note 2: "number_of_frame_headers" describes the number of audio frames whose first byte is in this audio packet.

Note 3: The access unit is the audio frame. The first access unit is the first audio frame which has the first byte of the audio frame.

Note 4: "audio_emphasis_flag" describes the state of emphasis. When "audio_sampling_frequency" is 96 KHz, "emphasis off" is described in this field. The emphasis is applied to all audio samples decoded from the first access unit.

0b: emphasis off

1b: emphasis on

Note 5: "audio_mute$_{13}$flag" describes the state of mute while all data in the audio frame is ZERO. The mute is applied to all audio samples decoded from the first access unit.

0b: mute off

1b: mute on

Note 6: "audio_frame_number" describes the frame number of the first access unit in the Group of audio frame (GOF) with the numbers between '0' and '19'.

Note 7: "quantization_word_length" describes the word-length which the audio samples are quantized to.

00b: 16 bits

01b: 20 bits

10b: 24 bits

11b: reserved

Note 8: "audio_sampling_frequency" describes the sampling frequency of the audio sample.

00b: 48 KHz

01b: 96 KHz

10b: 192 Hz

11b: reserved

100b: 44.1 KHz

101b: 88.2 KHz

110b: 176.4 KHz

111b: reserved

Note 9: "number_of_channels" describes the number of audio channels.

0000b: 1ch (mono)

0001b: 2ch (stereo)

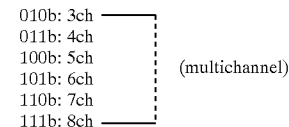

Note 10: "dynamic_range_control" describes the dynamic word control word to compress the dynamic range from the first access unit.

The packet data structure of the linear PCM audio and corresponding frame size of 48 KHz/192 KHz are as shown in Table 17.

TABLE 17

| Stream Mode | | | Data in a Packet | | | |
|---|---|---|---|---|---|---|
| Number of Channels | fs (KHz) | Quanti-zation | Maximum number of samples in a packet | Data size (byte) | Packet Stuffing of first/other PES packet (byte) | Padding packet for first/other PES packet (byte) |
| 1 mono | 48/96/192 | 16 | 1004 | 2008 | 2/5 | 0/0 |
| | 48/96/192 | 20 | 804 | 2010 | 0/3 | 0/0 |
| | 48/96/192 | 24 | 670 | 2010 | 0/3 | 0/0 |
| 2 stereo | 48/96/192 | 16 | 502 | 2008 | 2/5 | 0/0 |
| | 48/96/192 | 20 | 402 | 2010 | 0/5 | 0/0 |
| | 48/96/192 | 24 | 334 | 2004 | 6/0 | 0/9 |
| 3 | 48/96/192 | 16 | 334 | 2004 | 6/0 | 0/9 |
| | 48/96 | 20 | 268 | 2010 | 0/3 | 0/0 |
| | 48/96 | 24 | 222 | 1988 | 0/0 | 12/15 |
| 4 | 48/96 | 16 | 250 | 2000 | 0/0 | 10/13 |
| | 48/96 | 20 | 200 | 2000 | 0/0 | 10/13 |
| | 48/96 | 24 | 166 | 1992 | 0/0 | 18/21 |
| 5 | 48/96 | 16 | 200 | 2000 | 0/0 | 10/13 |
| | 48/96 | 20 | 160 | 2000 | 0/0 | 10/13 |
| | 48 | 24 | 134 | 2010 | 0/3 | 0/0 |
| 6 | 48/96 | 16 | 166 | 1992 | 0/0 | 18/21 |
| | 48 | 20 | 134 | 2010 | 0/3 | 0/0 |
| | 48 | 24 | 110 | 1980 | 0/0 | 30/33 |
| 7 | 48 | 16 | 142 | 1988 | 0/0 | 22/25 |
| | 48 | 20 | 114 | 1995 | 0/0 | 15/18 |
| | 48 | 24 | 94 | 1974 | 0/0 | 36/39 |
| 8 | 48 | 16 | 124 | 1984 | 0/0 | 26/29 |
| | 48 | 20 | 100 | 2000 | 0/0 | 10/13 |
| | 48 | 24 | 82 | 1968 | 0/0 | 42/45 |
| 9 | 48 | 16 | 110 | 1980 | 0/0 | 30/33 |
| | 48 | 20 | 88 | 1980 | 0/0 | 30/33 |
| 10 | 48 | 16 | 100 | 2000 | 0/0 | 10/13 |
| | 48 | 20 | 80 | 2000 | 0/0 | 10/13 |
| 11 | 48 | 16 | 90 | 1980 | 0/0 | 30/33 |
| 12 | 48 | 16 | 82 | 1968 | 0/0 | 42/45 |
| 13 | 48 | 16 | 76 | 1976 | 0/0 | 34/37 |

If the number of samples is less than in Table 17, the length of padding packet may increase to adjust the pack size. Samples shall be aligned at the packet boundary. Namely, the audio sample data of every audio packet starts with the first byte of $S_{2n}$. The number of the audio samples in a packet always becomes even.

Thus, in DVD-Audio format, the linear PCM data is processed in frames and GOF. The DVD-Audio may use the sampling frequency of 192 KHz, whereby the basic rule of linear PCM coding may be set as shown in Table 18.

TABLE 18

| Sampling frequency (fs) | 48 KHz/44.1 KHz | 96 KHz/88.2 KHz | 192 KHz/176.4 KHz |
|---|---|---|---|
| Sampling Phase | Shall be simultaneous for all channels in all streams | | |
| Quantization | 16 bits or more, 2's complementary code | | |
| Emphasis | Can be applied (zero point: 50 µs, pole: 15 µs) | | cannot be applied |

One audio frame contains 320 audio sample data when fs is 192 KHz. One GOF corresponds to the presentation time of 1/30 second as in the DVD-Video. The sampling frequency of 96 KHz is used to achieve multichannel to store quality audio data.

When recording the linear PCM audio data using the sampling frequency of 48 KHz and quantization of 16bits, 13 channels are available so as to record the audio data of 10 channels required by the present multichannel music. However, when using the sampling frequency of 192 KHz and quantization of 24bits, only 2 channels are available to record audio data, which can not meet the requirement of the multichannel music. Namely, it is impossible to achieve multichannel audio function with high sampling frequency and a great number of data bits. However, such limitation may be resolved by lossless coding or pseudo-lossless coding. The compression ratio of lossless coding is about 2:1 while that of pseudo-lossless psychoacoustic coding is about 4:1.

It is assumed that the inventive DVD-Audio employs DTS (Digital Theater System) coding which is pseudo-lossless psychoacoustic coding with the compression ratio of about 4:1. Further, the DTS makes it possible to perform lossless coding. The DTS can provide a sufficient number of channels without significant degradation of sound quality. For the DTS may carry out coding for a high specification with the sampling frequency of 192 KHz and 24 bit quantization compared to different compression coding algorithms presently proposed, and has been developed to minimize degradation of sound quality instead of reducing the bit rate. The DTS has the sampling frequencies of 48 KHz, 44.1 KHz, 96 KHz, 88.2 KHz, 192 KHz or 176.4 KHz, the quantization bit number of 16, 20 and 24, and the number of channels from ich coding to the maximum allowed by the bit rate. The number of audio channels may be determined by Eq. 2.

$$N = \frac{Mb\gamma * Cc\gamma}{Fs * Qb} \quad \text{Eq. 2}$$

Fs: Sampling Frequency(Hz)→48 KHz, 44.1 KHz, 96 KHz, 88.2 KHz, 192 KHz, or 176.4 KHz Qb: Number of Quantization Bits→16, 20, or 24

Mbγ: Maximum Data Transfer Rate of DVD(Mbps) →10.08 Mbps

Ccγ: Compression ratio of Pseudo-Lossless Psychoacoustic Coding

N: Maximum Number of Audio Channels Determined by Data Transfer Rate, Sampling Frequency and Number of Quantization Bits of DVD Assuming the DTS coding with the compression ratio of 4:1 is used for compression coding, the number of channels determined by Eq. 2 is as shown in Table 19. Therefore, in accordance with Eq. 2, each sampling frequency can support 8 or more channels.

TABLE 19

| Sampling Frequency | Number of Quantization Bits | Maximum Number of Channels |
|---|---|---|
| 48 KHz/44.1 KHz | 16 bits | 52 |
| 48 KHz/44.1 KHz | 20 | 42 |
| 48 KHz/44.1 KHz | 24 | 35 |
| 96 KHz/88.2 KHz | 16 | 26 |
| 96 KHz/88.2 KHz | 20 | 21 |
| 96 KHz/88.2 KHz | 24 | 17 |
| 192 KHz/176.4 KHz | 16 | 13 |
| 192 KHz/176.4 KHz | 20 | 10 |
| 192 KHz/176.4 KHz | 24 | 8 |

Figure 26:
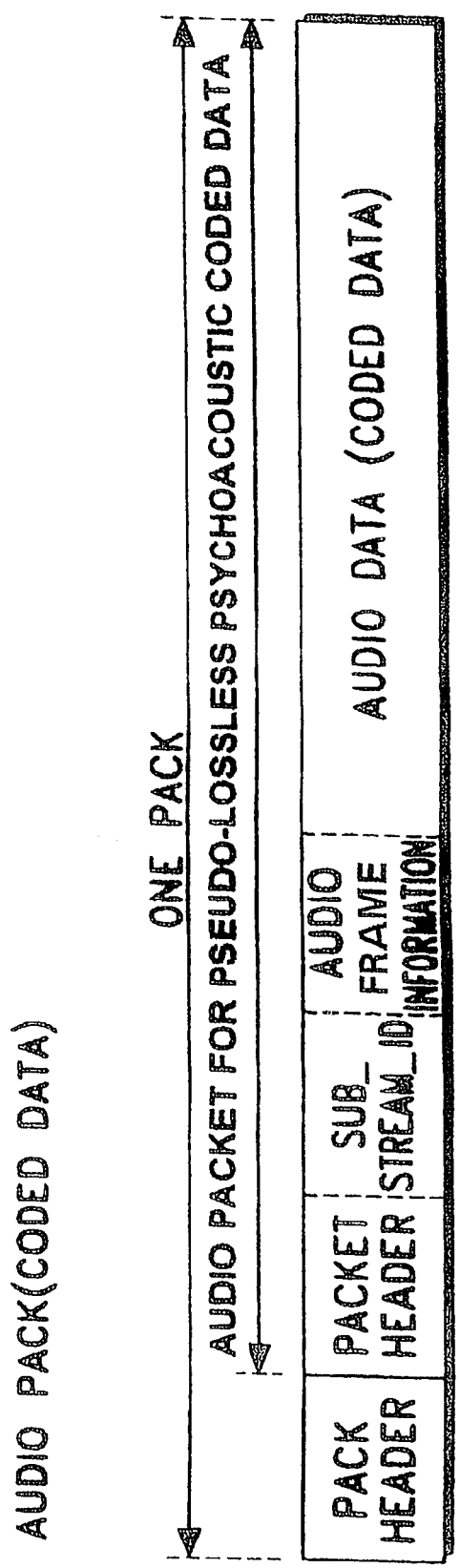
FIG. 26 is a diagram for illustrating the structure of a DTS audio packet of the DVD-Audio.

Thus, the inventive DVD-Audio is constructed based on the structure of the MPEG2 system layer, and therefore, the compression coded audio pack structure comprises a pack header of 14 bytes and compression coded audio packets each having at maximum 2021 bytes, as shown in FIG. 26. The pack header meets the specification of MPEG2 system layer.

The structure of the compression coded audio packet is also based on the specification of MPEG2 system layer. The compression coded audio packet is constructed as shown in Tables 20 and 21. The Table 20 has the same structure as Table 10 presenting the structure of linear PCM audio packet of the DVD-Video.

TABLE 20

| Field | Bit | Byte | Value | Comment |
|---|---|---|---|---|
| packet_start_code_prefix | 24 | 3 | 00 0001h | |
| stream_id | 8 | 1 | 1011 1101b | private_stream_1 |
| PES_packet_length | 16 | 2 | | |
| '10' | 2 | 3 | | |
| PES_scrambling_control | 2 | 3 | 00b | not scrambled |
| PES_priority | 1 | 3 | 0 | no priority |
| data_alignment_indicator | 1 | 3 | 0 | not defined by descriptor |
| copyright | 1 | 3 | 0 | not defined by descriptor |
| original_or_copy | 1 | 3 | 1 or 0 | original: 1 copy: 0 |
| PTS_DTS_flags | 2 | 3 | 10 or 00b | |
| ESCR_flag | 1 | 3 | 0 | no ESCR field |
| ES_rate_flag | 1 | 3 | 0 | no EST rate field |
| DSTM_trick_mode_flag | 1 | 3 | 0 | no trick mode field |
| additional_copy_info_flag | 1 | 3 | 0 | no copy info field |
| PES_CRC_flag | 1 | 3 | 0 | no CRC field |
| PES_extension_flag | 1 | 3 | 0 or 1 | |
| PES_header_data_length | 8 | 3 | 0 to 15 | |
| '0010' | 4 | 5 | provider defined | Note 1 |
| PTS[32 . . . 30] | 3 | 5 | provider defined | Note 1 |
| marker_bit | 1 | 5 | provider defined | Note 1 |

TABLE 20-continued

| Field | Bit | Byte | Value | Comment |
|---|---|---|---|---|
| PTS[29 . . . 15] | 15 | 5 | provider defined | Note 1 |
| marker_bit | 1 | 5 | provider defined | Note 1 |
| PTS[14 . . . 0] | 15 | 5 | provider defined | Note 1 |
| marker_bit | 1 | 5 | provider defined | Note 1 |
| PES_private_data_flag | 1 | 1 | 0 | Note 2 |
| pack_header_field_flag | 1 | 1 | 0 | Note 2 |
| program_packet_sequence_counter_flag | 1 | 1 | 0 | Note 2 |
| P_STD_buffer_flag | 1 | 1 | 1 | Note 2 |
| reserved | 3 | 1 | 111b | Note 2 |
| PES_extension_flag_2 | 1 | 1 | 0 | Note 2 |
| '01' | 2 | 2 | 01b | Note 2 |
| P_STD_buffer_scale | 1 | 2 | 1 | Note 2 |
| P_STD_buffer_size | 13 | 2 | 58 | Note 2 |
| stuffing_byte | — | 0–7 | | |

TABLE 21

| Field | Bit | Byte | Value | Comment |
|---|---|---|---|---|
| sub_stream_id | 8 | 1 | &&&& &***b | Note 1 |
| number_of_frame_headers | 8 | 1 | Provider Defined | Note 2 |
| first_access_unit_pointer | 16 | 2 | Provider Defined | Note 3 |
| DTS Audio data area | | | | |

In Table 21, Notes 1 to 3 are described as follows:

Note 1: "sub_stream_id" varies with the compression coding system, and so becomes "1000 1* * * b" with the DTS. "* * *" represents decoding the audio data stream number.

Note 2: "number_of_frame_headers" describes the number of audio frames whose first byte is in this audio packet.

Note 3: The access unit is the audio frame. The first_access_unit is the first audio frame which has the first byte of the audio frame.

Thus, the DVD-Audio is provided with more than 8 channels to perform the compression coding, available sampling frequencies of 48 KHz, 44.1 KHz, 96 KHz, 88.2 KHz, 192 KHz or 176.4 KHz, quantization bit number of 16, 20 or 24, compression ratio from 1:1 to over 5:1, down mixing, dynamic range control and time stamp.

The DTS compression algorithm used in the present embodiment has a compression ratio low enough to provide significantly improved sound quality, and may optionally be employed in DVD-Video. The DVD-Video has the structures of DTS pack and packet and restricted items for DTS. For the restricted items, the bit rate after compression is limited up to 1.5 Mbps and the sampling frequency for compressible data is only 48 KHz. However, in the inventive DVD-Audio employing the DTS algorithm, the sampling frequency is extended to 192 KHz, quantization bit number to 24bits, multichannel data compressed to about 4:1, thereby providing desirable sound quality. Namely, the compression coding used in the inventive DVD-Audio employs sampling frequencies of 48 KHz/44.1 KHz/96 KHz/88.2 KHz/192 KHz/176.4 KHz and quantization bit number of 16 bits/20 bits/24 bits so as to compress multichannel linear PCM data by about 4:1 without degrading sound quality.

The DVD-Audio may additionally include VIDEO_TS and VMG for the information region in a structure which is the same as in the DVD-Video in order to have compatibility with a DVD-Video player. However, the DVD-Video restricts the data transfer rate of an audio stream within 6.144 Mbps, as shown in Table 11.

TABLE 22

| | Transfer Rate | | |
|---|---|---|---|
| | Total Streams | One Stream | Note |
| VOB | 10.08 Mbps | — | |
| Video Streams | 9.80 Mbps | 9.80 Mbps | Number of Streams = 1 |
| Audio Streams | 9.80 Mbps | 6.144 Mbps | Number of Streams = 8 (max) |
| Sub-picture Streams | 9.80 Mbps | 3.36 Mbps | Number of Streams = 32 (max) |

Hence, the DVD-Video player may reproduce only the data satisfying the DVD-Video specification among the audio data of the DVD-Audio. The linear PCM data reproduced by the DVD-Video player is as shown in Table 7. of course, compression coded DTS data is played by the DVD-Video player to reproduce only DTS streams specified by the DVD-Video. For example, it is assumed that the titles to be stored into a DVD are as shown in Table 23.

TABLE 23

| Sampling Frequency | Number of Quantization Bits | Number of Channels | Remark |
|---|---|---|---|
| 48 KHz | 16 | 8 ch | Title 1 |
| 96 KHz | 16 | 4 ch | Title 2 |
| 96 KHz | 24 | 2 ch | Title 3 |
| 96 KHz | 24 | 4 ch | Title 4 |
| 192 KHz | 24 | 2 ch | Title 5 |

Then, the VIDEO_TS and VMG are recorded with the attribute and position information of Titles 1 to 3 but not with the information of Titles 4 and 5. On the contrary, the AUDIO_TS and AMG of the DVD-Audio are recorded with the information of all the Titles 1 to 5 because the Titles 1 to 3 meet the specifications of both DVD-Video and DVD-Audio but the Titles 4 and 5 only meet the specification of the DVD-Audio. Hence, the Titles 4 and 5 may be played only by the DVD-Audio player. If there is an available space in the data zone, the Titles 4 and 5 may be separately recorded in the available data space with the sampling frequency, quantization bit number and channel number reduced, and the information on the Titles 4 and 5 are stored into the VIDEO_TS and VMG. Then, the Titles 4 and 5 may be reproduced by a DVD-Video player.

If the compression coding DTS does not meet the specification of the DVD-Video concerning data transfer rate, number of channels, sampling frequency of original data, quantization bit number, etc., the information is recorded only in the AUDIO_TS and AMG but not in the VIDEO_TS and VMG. Namely, only the DTS streams satisfying the specification of the DVD-Video may be recorded in the VIDEO_TS and VMG. In order to reproduce the DTS streams not conforming to the specification of the DVD-Video, they must be coded to meet the transfer rate, number of channels, sampling frequency and quantization bit number specified for the DVD-Video, stored to be recorded in the VIDEO_TS and VMG.

The AMG and ATSI_MAT of the DVD-Audio has the same structure as the VMG and VTSI of the DVD-Video. However, the audio data exceeding the specification of the DVD-Video such as sampling frequency of 192 KHz and 8 or more channels must be changed to be reproduced by the DVD-Video player. Hence, the disk is made as follows:

When the content of a title to be recorded on the disk is within the specification of the DVD-Video, any one of the VMG and the AMG is kept to make the VIDEO_TS and AUDIO_TS direct the file through the VMG or AMG. Then, the DVD-Audio player regards the file as AMG to play while the DVD-Video player regards the file as VMG to play.

Meanwhile, if any of the titles to be recorded in the disk has an audio stream which does not meet the specification of the DVD-Video, both the VMG and the AMG are kept together, and the VMG is not recorded with the information on the titles which do not conform to the specifications of the DVD-Video. Of course, the AMG has not recorded with the information on the titles which have the sampling frequency, number of quantization bits and number of channels altered to be compatible with the DVD-Video player.

However, when the AMG and ATSI_MAT of the DVD-Audio are structured entirely different from the VMG and VTSI_MAT of the DVD-Video, both VMG and AMG must be prepared, and thus both VTSI_MAT and ATSI_MAT. Of course, the VMG and VTSI_MAT are provided with the information on the audio titles conforming to the specification of the DVD-Video.

The apparatus for playing the DVD-Audio may be designed independently from the DVD-Video player, but the inventive DVD-Audio player may be combined with the DVD-Video player.

Figure 27:
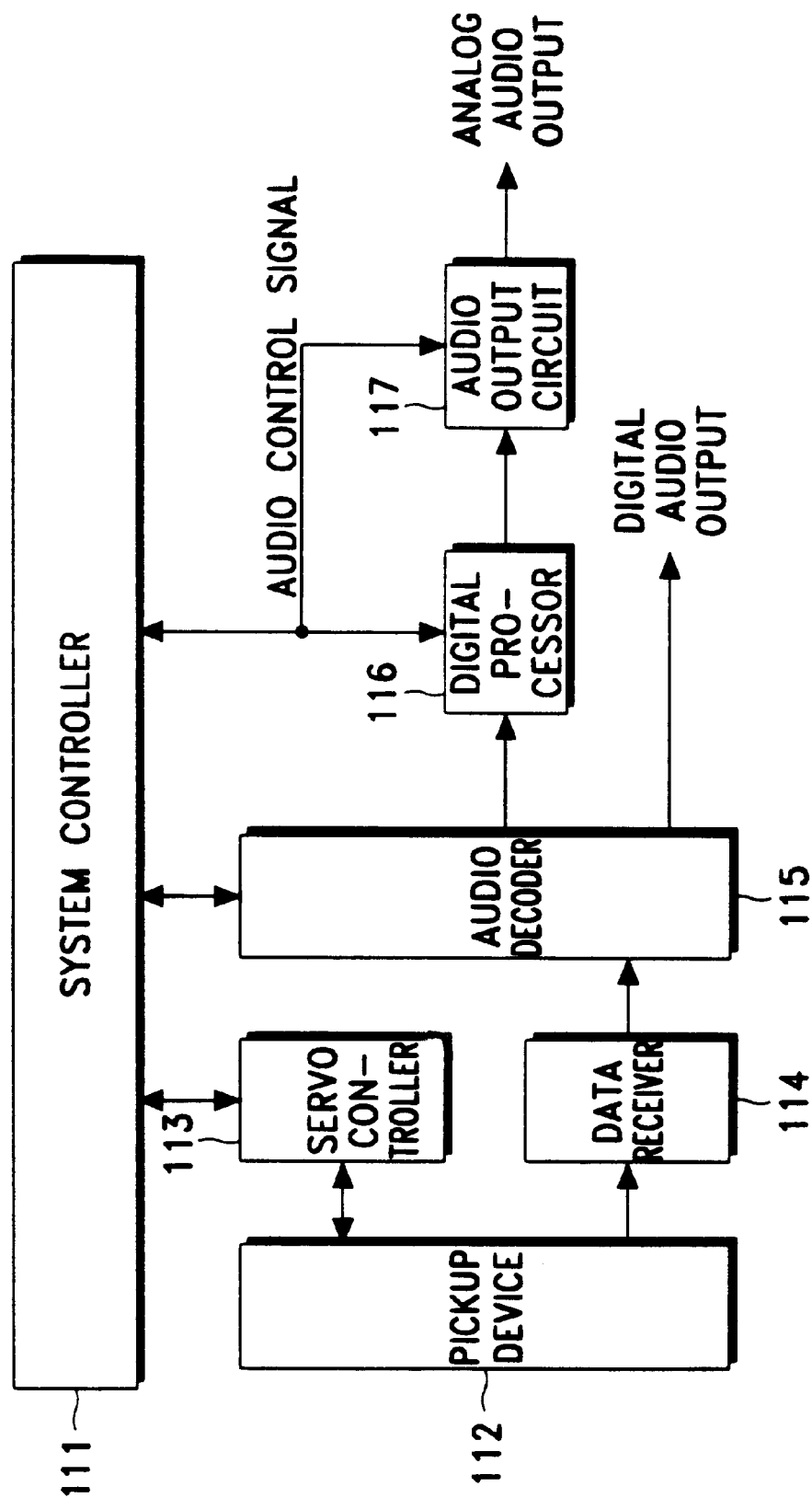
FIG. 27 is a block diagram for illustrating the functional structure of a DVD-Audio player according to a first embodiment of the present invention.

Referring to FIG. 27 for illustrating the structure of a DVD-Audio player, a system controller 111 controls the whole operation of the DVD-Audio player, serving the user interface. The system controller 111 determines whether the inserted disk is a DVD-Video or DVD-Audio by checking effective data included in the VIDEO_TS and AUDIO_TS directory. When it is checked that effective data exists from the AUDIO_TS directory, the system controller 111 determines the inserted disk to be a DVD-Audio and thus, controls its playing operation. But if it is determined that no effective data exists from the AUDIO_TS, the system controller 111 determines the inserted disk to be a DVD-Video, and thus, stops the playing operation.

A pickup device 112 is provided to read the data stored in the DVD-Audio. A servo controller 113 controls the pickup device 112 to perform various servo functions under the control of the system controller 111. A data receiver 114 analyzes and corrects an error occurring in the data output from the pickup device 112, and includes an error correction circuit. An audio decoder 115 transfers the audio information from the data receiver 114 to the system controller 111, decoding received audio data under the control of the system controller 111.

Figure 28:
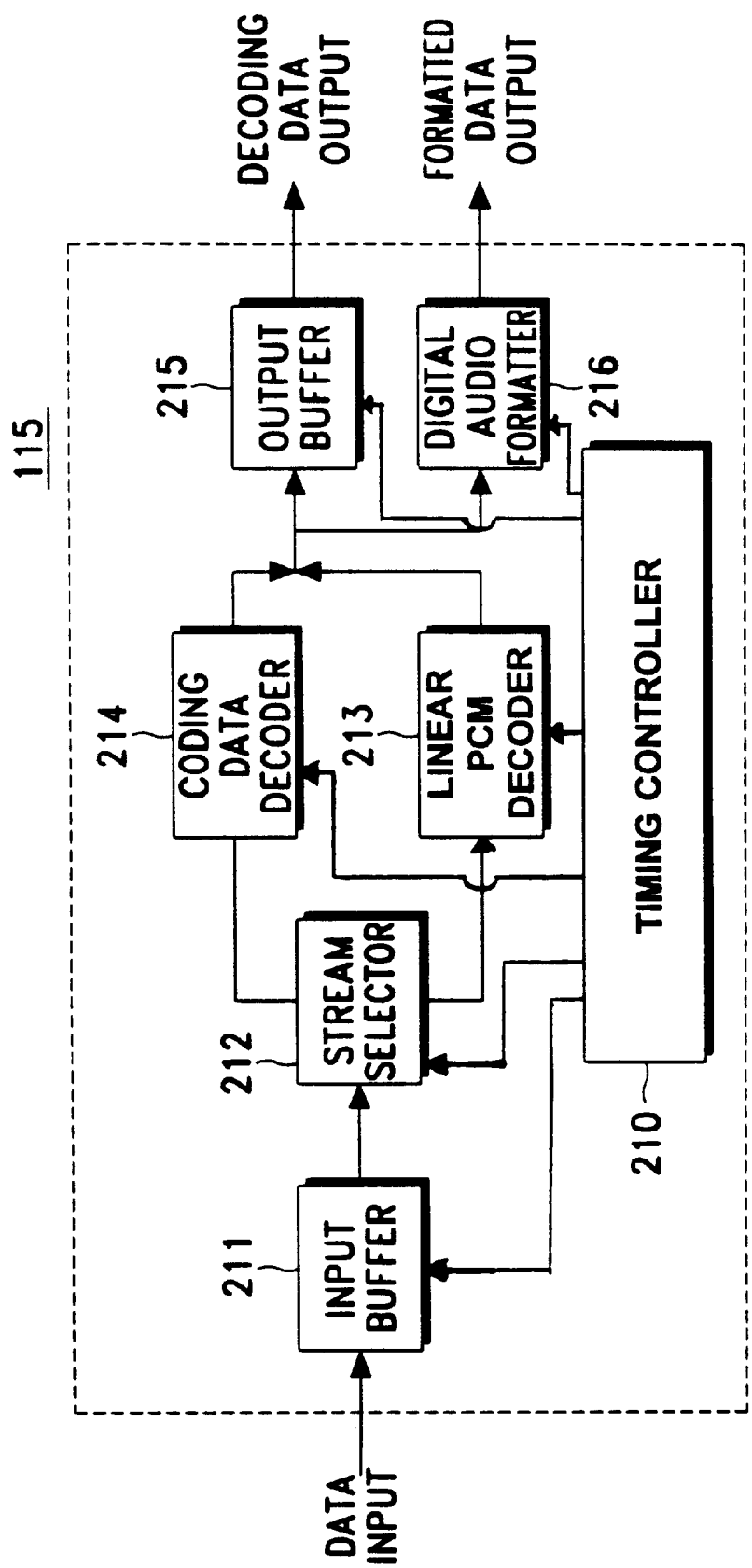
FIG. 28 is a block diagram for illustrating the structure of an audio decoder as shown in FIG. 27.

The audio decoder 115 is designed to decode the linear PCM audio data and compression coded audio data according to the present invention, as shown in FIG. 28. Referring to FIG. 28, an input data buffer 211 stores the audio data output from the data receiver 114. A stream selector 212 selectively outputs the audio data stream from the input buffer 211 under the control of the system controller 111. A linear PCM decoder 213 decodes linear PCM audio data received from the stream selector 212 to the original audio data. A coding data decoder (Pseudo-Lossless Psychoacoustic Decoding Circuit) 214 decodes compression coded data from the stream selector 212 to the original audio data. An output buffer 215 stores the audio data delivered by the decoding parts 213 and 214. A digital audio formatter 216 converts the audio data from the decoding parts 213 and 214 into a format specified by the system controller 111. The timing controller 210 generates timing control signals to control the operations of the parts of the audio decoder 115 under the control of the system controller 111.

A digital processor (High-bit High-sampling Digital Filter) 116 filters audio data from the audio decoder 115 under the control of the system controller 111. An audio output circuit (High Performance Digital to Analog Converters and Analog Audio Circuitry) 117 converts the audio data from the digital processor 116 into an analog signal.

Referring to FIGS. 27 and 28, the data receiver 114 transfers the audio data reproduced from a DVD-Audio through the pickup device 112 to the audio decoder 115. The reproduced audio data are sequentially stored into the input buffer 211 of the audio decoder 115. The audio data stored in the input buffer 211 are selected by the stream selector 212 and transferred to the decoding parts 213 and 214. Namely, when the system controller 111 demands decoding of the linear PCM audio data, the stream selector 212 transfers the audio data stored in the input buffer 211 to the linear PCM decoder. In addition, when the system controller 111 demands decoding of the compression coded data, the stream selector 212 transfers the audio data stored in the input buffer to the coding data decoder 214.

Describing the decoding operation of the linear PCM audio data, the linear PCM decoder 213 generally performs multichannel downmixing, sampling frequency conversion and requantization of the input signal. For example, when 8-channel data produced from the stream selector 212 is required to be converted into 2-channel data, the linear PCM decoder 213 performs multichannel downmixing to produce an output of the required channel number. Further, when the input data sampled at 192 KHz is required by the system controller 111 to be converted into data sampled at 96 KHz, the linear PCM decoder 213 performs the sampling frequency conversion to produce audio data of the required sampling frequency. In addition, when the input audio data of 24 bit quantization is required by the system controller 111 to be converted into data of 16 bit quantization, the linear PCM decoder 213 performs the requantization process to produce audio data of the required number of bits.

Describing the decoding operation of the compression coded audio data, the coding data decoder 214 decodes the compression coded audio data by carrying out the corresponding algorithm under the control of the system controller 111. In this case, the form of the audio data produced from the coding data decoder 214 is specified by the system controller 111. In the present embodiment, the coding data decoder 214 may be a DTS decoder. In addition, the coding data decoder 214 also carries out the multichannel downmixing, sampling frequency conversion and requantization of the input signal together with the algorithm decoding.

The audio data decoded by the decoding parts 213 and 214 is transferred to the output buffer 215 and digital audio formatter 216. The output buffer 215 stores the decoding audio data to synchronize with a control signal supplied by the timing controller 210. The digital audio formatter 216 adjusts the decoded audio data to the transmission format between the digital devices, synchronizing it with a control signal from the timing controller 210. In this case, the output audio data may be delivered to an audio/video system or a computer having the same transmission format.

The decoded audio data from the audio decoder 115 is processed through the digital processor 116 and converted by the audio output circuit 117 into an analog signal. The digital processor 116 comprises a plurality of digital filters to eliminate noises outside the audio signal band. The digital processor 116 requires a filter coefficient having a much higher resolution and number of taps than the digital filters used in the conventional DVD or CD to process the audio data sampled at 192 KHz and quantized by 24 bits. Of course, when a D/A converter of 96 KHz and 192 KHz becomes commonly available, the digital processor 116 may be included in the D/A converter. The audio output circuit 117 includes a plurality of D/A converters to convert the audio data deprived of noises into an analog audio signal.

Figure 29:
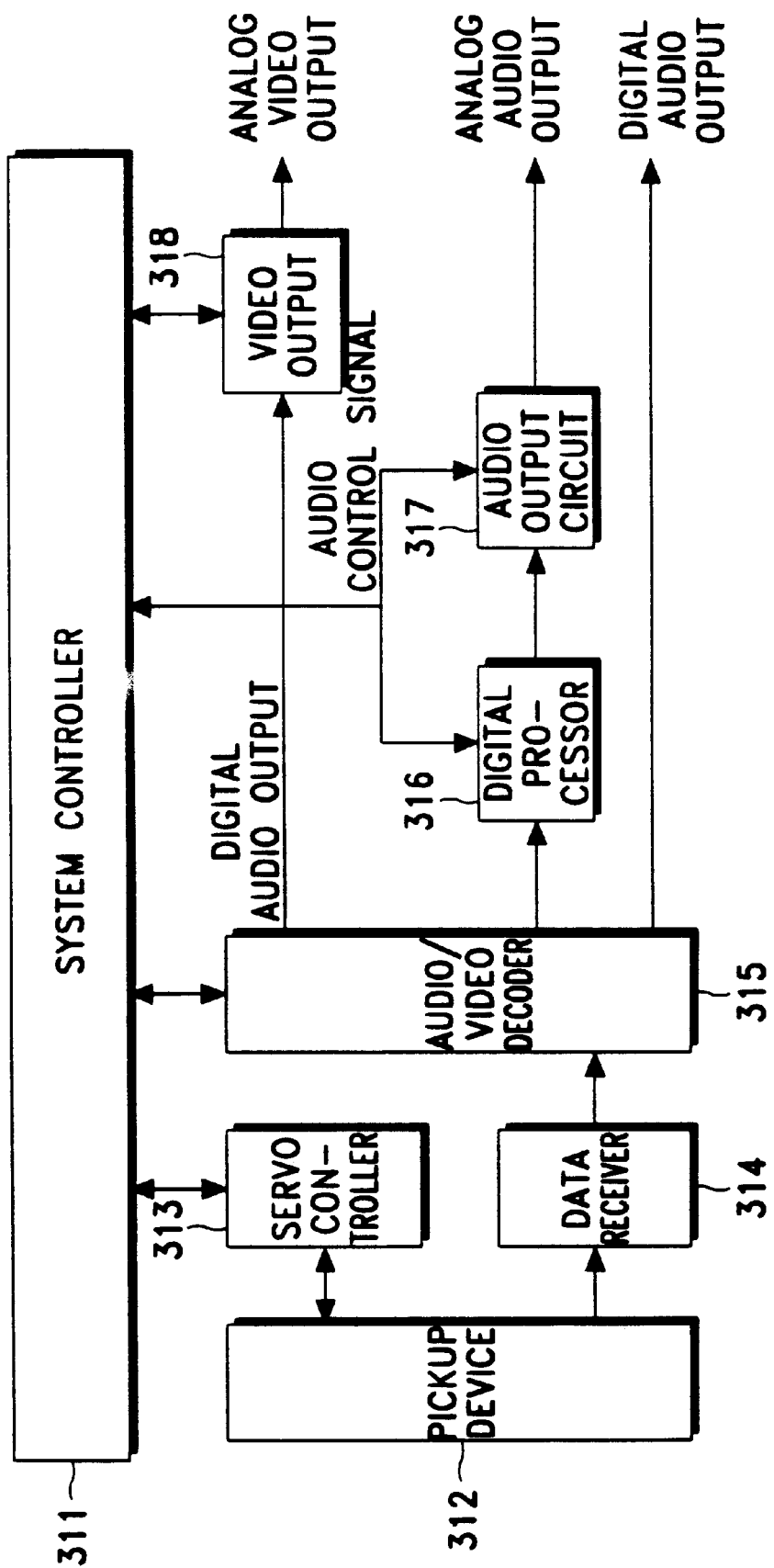
FIG. 29 is a block diagram for illustrating the functional structure of a DVD-Audio/DVD-Video player according to a second embodiment of the present invention.

Referring to FIG. 29 for illustrating an apparatus for playing both DVD-Video and DVD-Audio, the system controller 311 controls the whole operation of the DVD-Audio/Video player, serving the user interface. The system controller 311 determines whether the inserted disk is a DVD-Video or DVD-Audio by checking effective data included in the VIDEO_TS and AUDIO_TS directory. When there is effective data from the AUDIO_TS directory, the system controller 311 determines the inserted disk to be a DVD-Audio and thus, controls its playing operation. But if there is no effective data from the AUDIO_TS, the system controller 311 determines the inserted disk to be a DVD-Video, stops the present DVD-Audio playback mode, and changes to the playback mode of the DVD-Video.

A pickup device 312 is provided to read the data stored in the DVD-Audio. A servo controller 313 controls the pickup device 312 to perform various servo functions under the control of the system controller 311. A data receiver 314 analyzes and corrects an error occurring in the data output from the pickup device 312, and includes an error correction circuit. An audio/video decoder 315 transfers the audio information from the data receiver 314 to the system controller 311, decoding received audio data under the control of the system controller 311.

Figure 30:
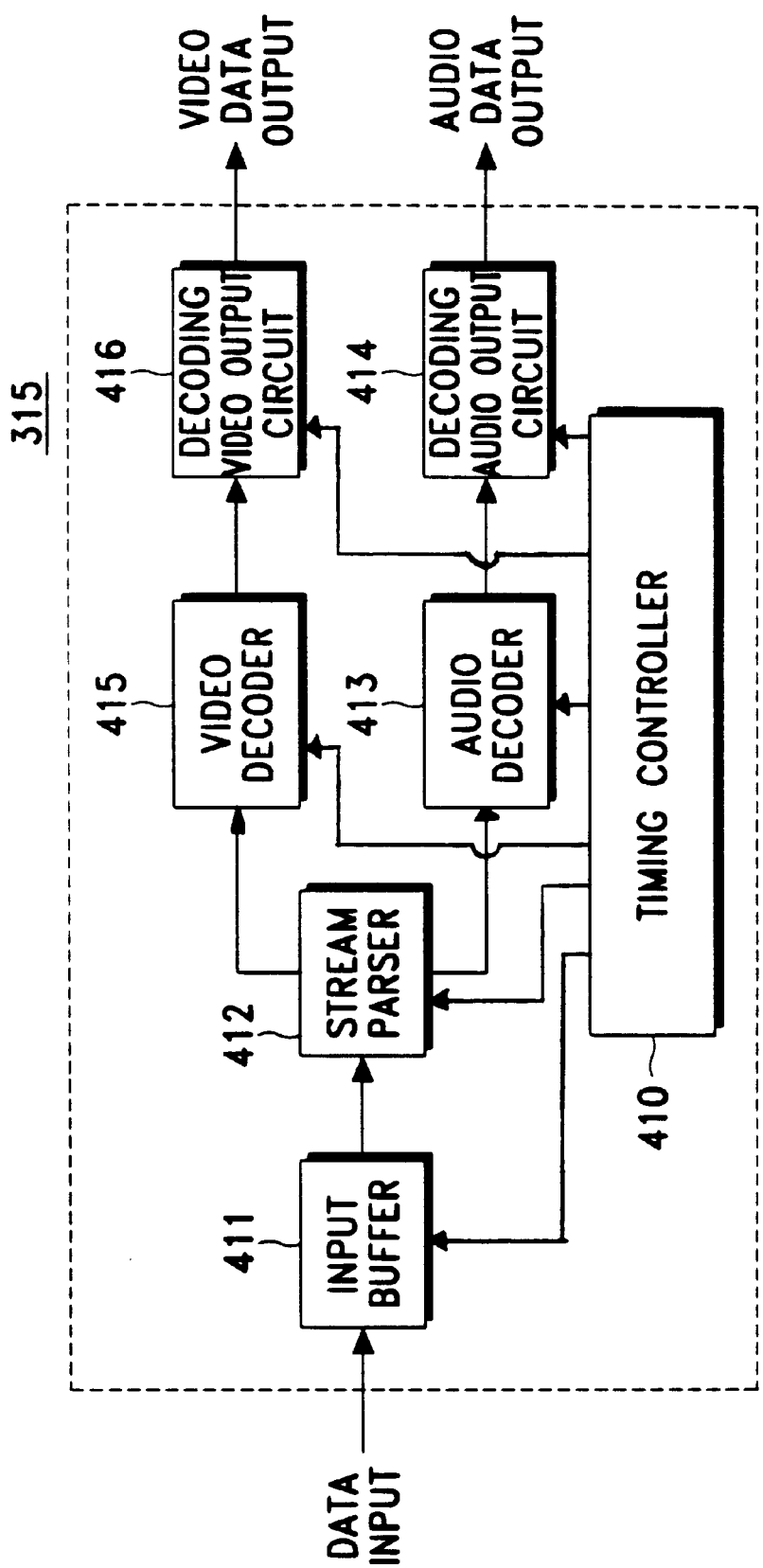
FIG. 30 is a block diagram for illustrating the structure of an audio/video decoder as shown in FIG. 29.

The audio/video decoder 315 is designed to decode video data and audio data, as shown in FIG. 30. Referring to FIG. 30, an input data buffer 411 stores the audio and video data output from the data receiver 314. A stream parser 412 selectively outputs the audio and video data stream from the input buffer 411 under the control of the system controller 311. An audio decoding circuit 413 decodes the audio data selected by the stream parser 412 in response to a control data from the system controller 311. A decoding audio output circuit 414 outputs the decoded audio data from the audio decoding circuit 413. A video decoding circuit 415 decodes the video data selected by the stream parser 412 in response to a control signal of the system controller 311. A decoding video output circuit 416 outputs the decoded video data from the video decoding circuit 415. A timing controller 410 generates timing control signals to control the operations of the parts of the audio/video decoder 315 under the control of the system controller 311.

The audio decoding circuit 413 must be provided with decoding elements corresponding to a linear PCM system, an MPEG system, an AC-3 system and a compression coding system. The linear PCM system and compression coding system require additional elements to reproduce the audio data recorded in the inventive DVD-Audio. Namely, the decoding elements are provided to reproduce the audio data formed by sampling frequency, quantization bits and audio channels according to the present invention. Also provided is a stream selector to distribute the audio data corresponding to the decoding elements.

A digital processor (High-bit High-sampling Digital Filter) 316 filters audio data from the audio/video decoder 315 under the control of the system controller 311. An audio output circuit (High Performance Digital to Analog Converters and Analog Audio Circuitry) 117 converts the audio data from the digital processor 316 into an analog signal. A video output circuit (NTSC Encoder Video Digital to Analog Converter's Analog Video Circuitry) 318 encodes video data from the audio/video decoder 315 in NTSC, converting the video data into an analog video signal.

Referring to FIGS. 29 and 30, the data reproduced from the disk through the pickup device 312 is transferred to the data receiver 314 to analyze it and correct an error in it, and is applied to the audio/video decoder 315. The data produced from the data receiver 314 is applied to the input buffer 411 of the audio/video decoder 315. The stream parser 412 selects a required stream according to a control data of the system controller 311, and analyzes the stream to deliver the video data to the video decoding circuit 415 and the audio data to the audio decoding circuit 413.

The audio decoding circuit 413 transforms the audio data from the stream parser 412 according to the requirements of the system controller 311. The audio decoding circuit 413 must include the decoding functions to decode audio data of both DVD-Video and DVD-Audio. The video decoding circuit 415 decodes and transforms the input video data. The video data transformation means sub_title process, pan_scan, etc.

The decoded audio and video data are respectively transferred to the decoding audio and video output circuits 414 and 416, and are finally transmitted outside in synchronism with timing control signals of the timing controller 410. The decoding audio output circuit 414 adjusts the decoded audio data to the transmission format between the digital devices. The audio data generated from the decoding audio output circuit 414 is transferred to a different audio/video system or computer.

As shown in FIG. 29, the audio/video decoder 315 follows the specification of the DVD-Video when processing video signals, and carries out both the inventive algorithm and the audio decoding algorithm according to the specification of the DVD-Video. Thus, the audio decoding circuit 413 contains the linear PCM and DTS algorithms of the audio specification of the DVD-Video, and therefore both DVD-Video and DVD-Audio may be reproduced.

In this case, the algorithm required for the audio decoding of the DVD-Video indicates linear PCM decoding(1)+AC-3 decoding+MPEG decoding while the algorithm required for the audio decoding of the DVD-Audio indicates linear PCM decoding(2)+coding data decoding (Pseudo-Lossless Psychoacoustic Decoding). Hence, the linear PCM algorithm in the DVD-Video is included in the linear PCM algorithm according to the present invention. The decoding algorithm employed in the DVD-Video and DVD-Audio includes the functions as expressed by Eq. 3, carried out by the audio decoding circuit $$\text{Audio Decoder} = \text{Linear PCM Decoder(2)} + \text{Pseudo-Lossless Psychoacoustic Decoder} + \text{AC-3 Decoder} + \text{MPEG Decoder}. \quad \text{Eq. 3}$$

Thus, such an apparatus for playing both DVD-Video and DVD-Audio detects the VIDEO_TS and AUDIO_TS of the inserted DVD to set the audio decoding mode. The audio data of the DVD-Audio with the video data eliminated is shown in Table 24.

TABLE 24

| Sampling Frequency | Number of Quantization Bits | Bit Rate per Channel | Number of Channels | Required Data Capacity |
|---|---|---|---|---|
| 48 KHz | 16 bits | 768 Kbps | 8 ch | 5.99 Gbyte |
|  | 20 bits | 960 Kbps | 8 ch | 5.76 Gbyte |
|  | 24 bits | 1.152 Mbps | 8 ch | 5.53 Gbyte |
| 96 KHz | 16 bits | 1.536 Mbps | 6 ch | 5.53 Gbyte |
|  | 20 bits | 1.920 Mbps | 5 ch | 5.76 Gbyte |
|  | 24 bits | 2.304 Mbps | 4 ch | 5.53 Gbyte |

The compression coding system specified in the DVD-Video may compress data at a maximum of 448 Kbps. The sampling frequency to allow compression is 48 KHz, and the number of quantization bits to allow compression is 16 bits. Hence, the amount of data to be handled is limited, and the compression ratio is about 10:1. Therefore, it is unsuitable for audio data, especially in view of sound quality. If the compression algorithm is a dolby AC-3 algorithm, the quantization system is 16 bit linear PCM, the sampling frequency is 48 KHz, the maximum number of channels to record at is a maximum of 6 ch (one of the audio channels having a subwoofer channel containing audio data below 200 Hz and using 0.1 of that channel), and possible bit rate is 192 Kbps–448 Kbps. The dolby AC-3 algorithm is very limited in the number of quantization bits, the sampling frequency, and the high compression ratio, resulting in serious degradation of sound quality and is thus unsuitable for audio use exclusively. In addition, when the compression algorithm is MPEG2 algorithm, the quantization system is 16 bits-24 bits linear PCM, the sampling frequency is 48 KHz, the maximum number of channels to record is 8ch (one of the audio channels having a subwoofer channel containing audio data below 200 Hz and using 0.1 of that channel), and the possible bit rate is 64 Kbps–912 Kbps. This algorithm has a high quantization bit number for possible coding and a high channel number to record, but the sampling frequency is limited and the compression ratio high, thereby causing degradation of sound quality.

However, assuming that the transfer rate is 10.08 Mbps and the time for reproducing is 80 minutes for the DVD-Audio, the linear PCM audio is achieved as shown in Table 25. Furthermore, even in the case that the sampling frequency is 44.1 KHz, 88.2 KHz and 176.4 KHz, the PCM audio may have similar values as those shown in Table 25.

TABLE 25

| Sampling Frequency | Number of Quantization Bits | Bit Rate per Channel | Number of Channels | Required Data Capacity |
|---|---|---|---|---|
| 48 KHz | 16 bits | 768 Kbps | 13 ch | 5.99 Gbyte |
| 48 KHz | 20 bits | 960 Kbps | 10 ch | 5.76 Gbyte |
|  | 24 bits | 1.152 Mbps | 8 ch | 5.53 Gbyte |
| 96 KHz | 16 bits | 1.536 Mbps | 6 ch | 5.53 Gbyte |
|  | 20 bits | 1.920 Mbps | 5 ch | 5.76 Gbyte |
|  | 24 bits | 2.304 Mbps | 4 ch | 5.53 Gbyte |
| 192 KHz | 16 bits | 3.072 Mbps | 3 ch | 5.53 Gbyte |
|  | 20 bits | 3.840 Mbps | 2 ch | 4.61 Gbyte |
|  | 24 bits | 4.608 Mbps | 2 ch | 5.53 Gbyte |

Employing DTS in the compression coding system, the quantization uses 16 bit, 20 bit or 24 bit linear PCM, a sampling frequency of 48 KHz, 44.1 KHz, 96 KHz, 88.2 KHz, 192 KHz or 176.4 KHz, the maximum number of channels to record is 13 ch, and the compression ratio is about 4:1. The DTS compression coding has a high quantization bit number and sampling frequency with a reduced compression ratio, keeping high sound quality.

As described above with reference to FIGS. 27 and 29, the audio or audio/video player determines the kind of DVD by checking if effective data is stored in the AUDIO_TS directory. Namely, the DVD-Audio player performs the reproducing function or not according to whether is effective data stored in the AUDIO_TS directory. The audio/video player as shown in FIG. 29 performs the audio or video playing function according to whether effective data stored in the AUDIO_TS directory.

Figure 31:
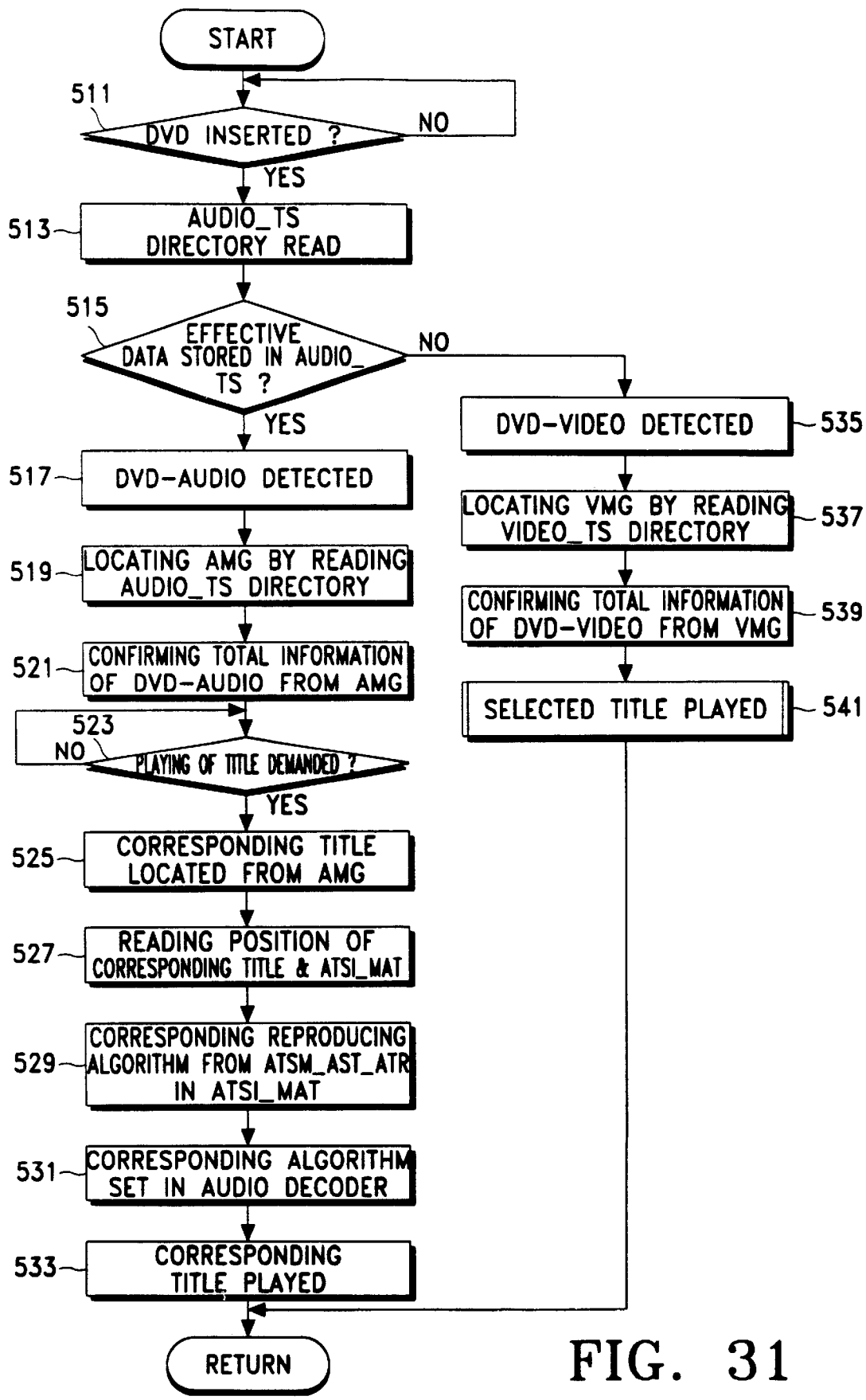
FIG. 31 is a flow chart for illustrating the process of reproducing audio data from a DVD-Audio in the DVD-Audio player.

FIG. 31 describes the operation of the inventive concept with reference to the audio/video player as shown in FIG. 29. An inserted DVD is checked by the system controller 311 in steps 511, and the content of the AUDIO_TS directory is read in step 513. In step 515, it is checked whether there is effective data stored in the AUDIO_TS directory. If the inserted DVD is a DVD-Video, there is no effective data in the AUDIO_TS directory. Namely, the DVD-Video has the AUDIO_TS directory, but it is empty. However, if the inserted DVD is a DVD-Audio, the AUDIO_TS directory contains the information on the positions of the audio data as shown in FIGS. 10 to 18C.

Detecting effective data in the AUDIO_TS directory in step 515, the system controller 311 determines the inserted disk as being a DVD-Audio in step 517. In step 519, the position of the AMG as shown in FIGS. 10 and 11 is located by reading the AUDIO_TS directory. Then, the pickup device 312 is moved to the position of the AMG in the DVD in step 521, where the AMG is read to confirm the information on the places storing the entire audio data. As shown in FIGS. 10 and 11, the AMG contains the information on all audio titles stored in the DVD-Audio as well as the attribute and position information of each title.

In step 523, the system controller 311 checks whether there is a demand for reproducing a specific audio title. The demand is made by the user or a command stored in the DVD-Audio. Detecting the demand to reproduce a title, the system controller 311 locates the position of the title in the disk according to the position information obtained from the AMG in step 525, and in step 527, moves the pickup device 312 to the position of the ATSI_MAT of the title to read it. In step 529, the information of the ATSI_MAT as shown in FIGS. 15 to 18C is analyzed to determine the reproducing algorithm by discovering the kind and attribute of the audio title to play. In step 531, the audio decoding circuit 413 of the audio/video decoder 315 is set to the selected audio data from the DVD-Audio according to the reproducing algorithm. The information required to set the audio decoding circuit 413 are the audio coding mode, the sampling frequency, the quantization bit number and the channel number. Finally, the selected title is decoded by the audio decoding circuit 413 played in step 533.

On the other hand, if there is no effective data in the AUDIO_TS directory in step 515, the system controller 311 determines the inserted disk as being a DVD-Video, and in step 537, the position of the VMG is located by reading the VIDEO_TS directory. Then, the pickup device 312 is moved to the position of the VMG in the DVD in step 539, where the VMG is read to confirm the information on the places storing the entire video data. Thereafter, if there is a demand to reproduce a title, the video, sub-picture and audio data of the selected title are played according to the information stored in the VTSI_MAT.

Likewise, a DVD-Audio player, which only reproduces data from a DVD-Audio, also performs the steps 511 to 533 for the DVD-Audio, but stops the playing operation for a DVD-Video.

Figure 32:
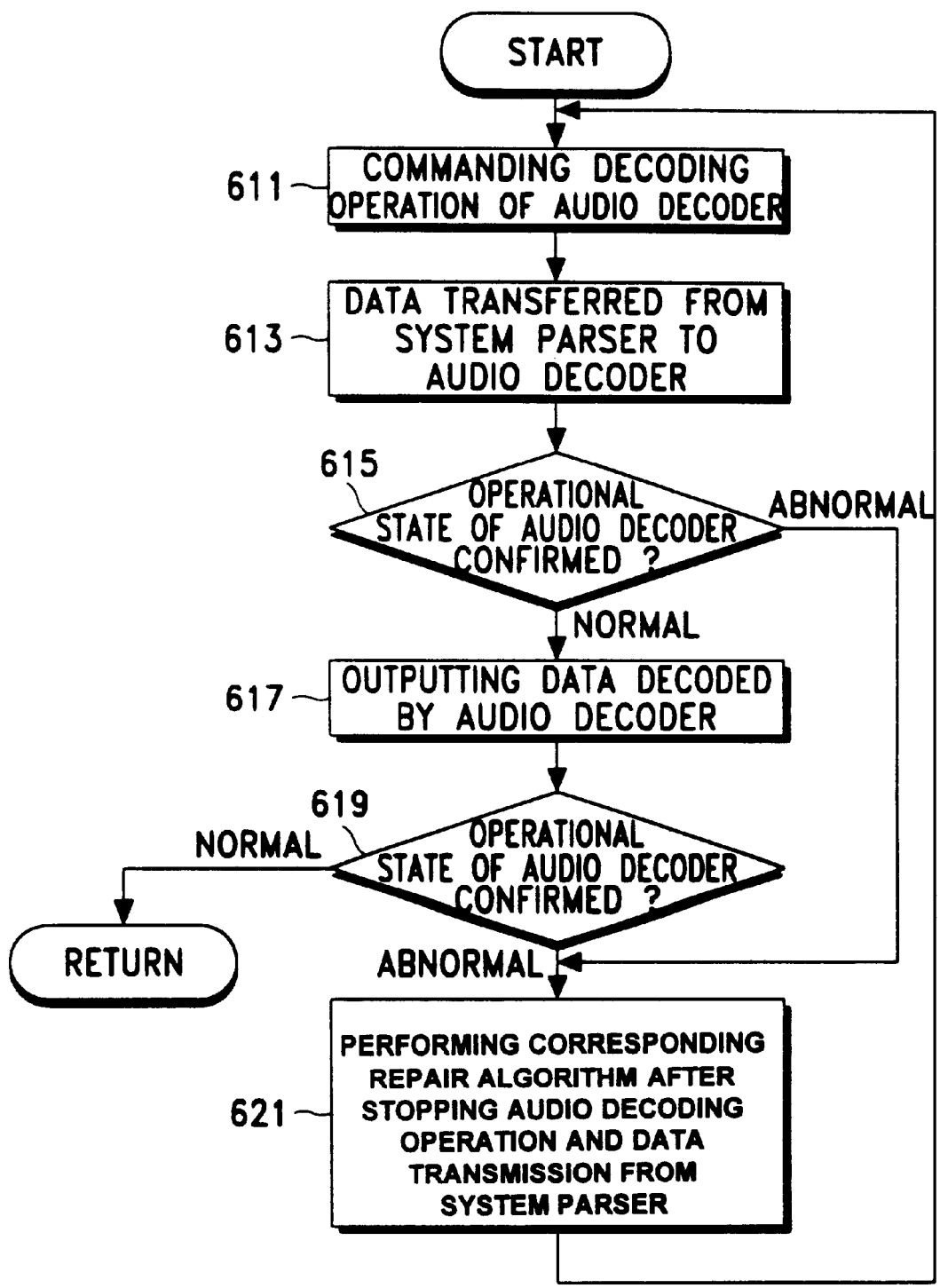
FIG. 32 is a flow chart for illustrating the operation of an audio decoder in the DVD-Audio player.

After setting the audio decoding circuit 413 according to the information stored in the ATSI_MAT, the system controller 311 analyzes the audio pack stored in the data area of a DVD-Audio from step 533 going through the steps as shown in FIG. 32.

In step 611, the system controller 311 commands a decoding operation of the audio decoding circuit 413, and in step 613, controls the stream parser 412 to transfer the received audio data to the audio decoding circuit 413 provided with the corresponding audio algorithm. Then, the audio decoding circuit 413 decodes the received audio data according to the algorithm set by the system controller 311. Here, the system controller 311 checks the operational state of the audio decoding circuit 413 in step 615. Detecting an abnormal state of the audio decoding circuit, the process proceeds to step 621 to control the decoding circuit 413 to stop the decoding operation, and the stream parser 412 is controlled to stop transferring data. Then, after performing the repair algorithm according to the abnormal state, the process is returned to step 611.

However, if the audio decoding circuit 413 performs the decoding operation normally in step 615, the decoded audio data is output through the decoding audio output circuit 414 in step 617. Thereafter, the operational state of the audio decoding circuit 413 is checked again in step 619. Detecting the abnormal state, the process proceeds to the step 621, or otherwise the process is returned to decode the next audio data. When the audio stream is fully decoded by the audio decoding circuit 413, the system controller 311 controls the digital processor 316 and audio output circuit 317 to convert the decoded audio data into an analog signal.

Thus, the inventive DVD includes a VIDEO_TS and AUDIO_TS directory to make it possible to distinguish a DVD-Audio from a DVD-Video by checking effective data stored in the AUDIO_TS directory. The DVD-Audio may be recorded with the audio data sampled at a maximum of 192 KHz and quantized by 24 bits. Further, audio channels may be extended greatly. Therefore, by reproducing the audio data in the DVD audio, it is possible to reproduce an audio signal of high quality which is suitable for multi-channel music. The number of channels limited by the data transfer speed, the sampling frequency and the quantization bit number is extended by using a coding algorithm.

In the case where the linear PCM data sampled at the sampling frequency of 192 KHz is divided into the linear PCM data of 96 KHz and the data of 192 KHz so that the data of 96 KHz is recorded by the lossless psychoacoustic coding, the DVD of the present invention records the audio titles at the sampling frequency of 192 KHz in the AUDIO_TS directory by linear PCM lossless coding, and records the video titles at the sampling frequency of 96 KHz in the VIDEO_TS directory by linear PCM coding. The DVD-audio player reads the AUDIO_TS to demodulate the data by the lossless psychoacoustic coding, and mixes it with the data of 96 KHz to reproduce it into the data of 192 KHz. The DVD-video player reads the VIDEO_TS directory to reproduce the data of 96 KHz. That is, by recording one title into the AUDIO_TS and VIDEO_TS separately, the DVD-audio player may reproduce the data at 192 KHz and the DVD-video player may reproduce the data at 96 KHz.

Furthermore, in the case where the music data sampled at the 44.1 KHz for an existing CD is provided to the DVD, the music data of 44.1 KHz should be converted into the music data of 48 KHz in order to provide it by using the conventional DVD-video format. Undesirably, however, the audio data may be degraded during the conversion. The DVD according to the present invention can support the audio frequency sampled at 44.1 KHz in DVD-audio format. Thus, it is possible to record the audio data as it is without conversion of the sampling frequency and provide it together with the video data, thereby providing the audio sound of high quality.

Preferably, a general DVD-video player should be connected to the DVD-audio player which can reproduce the 24-bit data of 192 KHz, since the general DVD-video has a specification inferior to that of the DVD-audio.

What is claimed is:

1. A DVD-Audio disk comprising:
a data zone to store data to be reproduced; and
an information zone to store information on said data to be reproduced;
wherein said information zone includes directories of a video title set (VIDEO_TS) and an audio title set (AUDIO_TS), said AUDIO_TS directory including information on an audio manager (AMG) having information on audio titles; and
wherein said data zone includes said audio titles each having audio title set information (ATSI) followed by a plurality of contiguous audio objects (AOBs), said ATSI includes a plurality of audio stream attributes each having an audio coding mode, a first, second or third quantization bit number corresponding to the data to be reproduced, a first, second, third, fourth, fifth, or sixth sampling frequency corresponding to the data to be reproduced, and decoding algorithm information relating to a number of audio channels of the data to be reproduced, and each of said AOBs includes a plurality of audio packs recorded with audio data corresponding to the decoding algorithm stored in the audio stream attribute.

2. A DVD-Audio disk as claimed in claim 1, wherein if said audio coding mode is linear pulse code modulated (PCM) audio, said first to third quantization bit numbers are respectively 16 bits, 20 bits and 24 bits, said first to third sampling frequencies are respectively 48 KHz, 96 KHz and 192 KHz, said fourth to sixth sampling frequencies are 44.1 KHz, 88.2 KHz, and 176.4 KHz, and a maximum number of said audio channels is 8.

3. A DVD-Audio disk as claimed in claim 1, wherein if said audio coding mode is a compression coding system, said first to third quantization bit numbers of the audio data before compression are respectively 16 bits, 20 bits and 24 bits, said first to third sampling frequencies are respectively 48 KHz, 96 KHz and 192 KHz, and a maximum number of said audio channels is 8.

4. A DVD-Audio disk as claimed in claim 1, wherein said VIDEO_TS directory includes information on a position of a video manager (VMG) having information on positions of said audio titles reproducible by a DVD-Video player, said VMG being recorded with the information on said audio titles, and each of said audio titles including video title set information and a plurality of contiguous video objects (VOBs).

5. A DVD-Audio disk as claimed in claim 2, wherein said VIDEO_TS directory includes information on a position of a video manager (VMG) having information on positions of said audio titles reproducible by a DVD-Video player, said VMG being recorded with the information on said audio titles, and each of said audio titles including video title set information and a plurality of contiguous video objects (VOBs).

6. A DVD-Audio disk as claimed in claim 3, wherein said VIDEO_TS directory includes information on a position of a video manager (VMG) having information on positions of said audio titles reproducible by a DVD-Video player, said VMG being recorded with the information on said audio titles, and each of said audio titles including video title set information and a plurality of contiguous video objects (VOBs).

7. A DVD-Audio disk as claimed in claim 1, wherein if said audio coding mode is linear pulse code modulated (PCM) audio, a maximum number of said audio channels is determined by the following Eq. 1:

$$N = \frac{Mb\gamma}{Fs*Qb}, \quad \text{Eq. 1}$$

wherein Fs is the sampling frequency(Hz), Qb is the quantization bit number, Mbγ is the maximum data transfer rate(Mbps) of the DVD-Audio disk, and N is the maximum number of said audio channels determined by the data transfer rate, sampling frequency and quantization bit number of the DVD-Audio disk.

8. A DVD-Audio disk as claimed in claim 1, wherein if said audio coding mode is a compression coding system, a maximum number of said audio channels is determined by the following Eq. 2:

$$N = \frac{Mb\gamma * Cc\gamma}{Fs*Qb}, \quad \text{Eq. 2}$$

wherein Fs is the sampling frequency(Hz), Qb is the quantization bit number, Mbγ is the maximum data transfer rate(Mbps) of the DVD-Audio disk, Ccγ is a compression ratio according to a DTS compression coding system and N is the maximum number of said audio channels determined by data transfer rate, sampling frequency and quantization bit number of the DVD-Audio disk.

9. A DVD-Audio disk as claimed in claim 1, wherein if said audio coding mode is linear pulse code modulated (PCM) audio, said first to third quantization bit numbers are respectively 16 bits, 20 bits and 24 bits, said first to third sampling frequencies are respectively 44.1 KHz, 88.2 KHz and 176.4 KHz, a maximum number of said audio channels is 8, and the number of said channels is determined by the following equation:

$$N = \frac{Mbr}{Fs*Qb};$$

wherein,

Fs is the sampling frequency (Hz) of the data to be reproduced, Qb is the quantization bit number (bits) of the data to be reproduced, Mbr is a maximum data transfer rate (Mbps) of the DVD-Audio disk, N is a maximum number of recording channels as determined by the maximum data transfer rate, sampling frequency and quantization bit number of the DVD-Audio disk.

10. A DVD-Audio disk as claimed in claim 1, wherein if said audio coding mode is pseudo lossless compression coding, said first to third quantization bit numbers of the data to be reproduced before compression are respectively 16 bits, 20 bits and 24 bits, said first to third sampling frequencies are respectively 44.1 KHz, 88.2 KHz and 176.4 KHz, a maximum number of said audio channels is 8, and the number of said channels is determined by the following equation:

$$N = \frac{Mbr*Ccr}{Fs*Qb};$$

wherein,

Fs is the sampling frequency (Hz) of the data to be reproduced, Qb is the quantization bit number (bits) of the data to be reproduced, Mbr is a maximum data transfer rate (Mbps) of the DVD-Audio disk, Ccr is a compression ratio according to a DTS compression coding system, and N is a maximum number of recording channels determined by the maximum data transfer rate, sampling frequency and quantization bit number of the DVD-Audio disk.

11. A DVD-Audio disk comprising:

a data storage area to store audio data to be reproduced, audio titles each having an audio title set management table followed by a plurality of contiguous audio objects, a plurality of audio stream attributes each having an audio coding mode, a quantization bit number, a sampling frequency and decoding algorithm information relating to a number of audio channels of said audio data, wherein each of said audio objects includes a plurality of audio packs having portions of said audio data corresponding to said decoding algorithm stored in said audio stream attribute.

12. A DVD-Audio disk as claimed in claim 11, wherein each of said audio packs comprises:

a pack header;

a packet header;

a sub-stream identification value;

stuffing frame information;

audio frame information; and one of said portions of said audio data.

13. A DVD-Audio disk as claimed in claim 12, wherein said pack header is 14 bytes, said packet header is 1 byte, said sub-stream identification value is 1 byte, said stuffing frame information is 1 byte, said audio frame information is 3 bytes, and said one portion of said audio data is between 1 and 2013 bytes of linear pulse code modulated (PCM) data.

14. A DVD-Audio disk as claimed in claim 11, wherein each of said audio packs comprises:

a pack header;

a packet header;

a sub-stream identification value;

audio frame information; and one of said portions of said audio data.

15. A DVD-Audio disk as claimed in claim 14, wherein said pack header is 14 bytes, said packet header is 1 byte, said sub-stream identification value is 1 byte, said audio frame information is 3 bytes and said one portion of said audio data is between 1 and 2016 bytes of Dolby AC-3 data.

16. A DVD-Audio disk as claimed in claim 11, wherein each of said audio packs comprises:

a pack header;

a packet header; and one of said portions of said audio data.

17. A DVD-Audio disk as claimed in claim 16, wherein said pack header is 14 bytes, said packet header is 1 byte, and said one portion of said audio data is between 1 and 2020 bytes of MPEG data.

18. A DVD-Audio disk as claimed in claim 11, wherein each of said audio packs comprises:
   a pack header;
   a first packet header for a main audio frame;
   a first one of said portions of said audio data in said main audio frame;
   a second packet header for an extension audio frame; and
   a second one of said portions of said audio data in said extension audio frame.

19. A DVD-Audio disk as claimed in claim 18, wherein said pack header is 14 bytes, said first packet header is 1 byte, said first portion of said audio data is between 1 and 1152 bytes of MPEG data, said second packet header is 1 byte, and said second portion of said audio data is between 1 and 1584 bytes of MPEG data.

20. A DVD-Audio disk as claimed in claim 11, wherein each of said audio packs further comprises a padding packet which is increased based upon a number of samples of said audio data.

21. A DVD-Audio disk as claimed in claim 11, wherein said sampling frequency is approximately 48 KHz, said quantization bit number is 24 bits, and said number of audio channels is 10, when said audio data is linear pulse code modulated (PCM) data.

22. A DVD-Audio disk as claimed in claim 11, wherein a compression rate of said audio data is approximately 2:1 for lossless psychoacoustic coding and approximately 4:1 for lossless pseudo psychoacoustic coding.

23. A DVD-Audio disk comprising:
   a data zone; and
   VIDEO_TS and AUDIO_TS directories positioned at said data zone;
   wherein said AUDIO_TS directory includes positional information of an audio manager (AMG), wherein the AMG stores positional information of audio titles of the DVD-Audio disk;
   wherein said data zone includes said audio titles which include an audio title set information (ATSI) and a plurality of contiguous audio objects (AOBs);
   wherein each ATSI includes audio stream attributes having an audio coding mode, first, second or third quantization bits corresponding to the audio data, a first, second, third, fourth, fifth or sixth sampling frequency corresponding to the audio data and decoding algorithm information related to an audio channel number of the audio; and
   wherein each AOB includes a plurality of audio packs having the audio data corresponding to the decoding algorithm recorded on said audio stream attributes.

24. A DVD-Audio disk as claimed in claim 23, wherein if said audio coding mode is linear pulse code modulated (PCM) audio, said first to third quantization bit numbers are respectively 16 bits, 20 bits and 24 bits, said first to sixth sampling frequencies are respectively 48 KHz, 44.1 KHz, 96 KHz, 88.2 KHz, 192 KHz and 176.4 KHz, a maximum number of said audio channels is 8, and the number of said channels is determined by the following equation:

$$N = \frac{Mbr}{Fs*Qb};$$

wherein,
   Fs is the sampling frequency (Hz), Qb is the quantization bit number (bits), Mbr is a maximum data transfer rate (Mbps) of the DVD-Audio disk, and N is a maximum number of recording channels determined by the maximum data transfer rate, sampling frequency and quantization bit number of the DVD-Audio disk.

25. A DVD-Audio disk as claimed in claim 23, wherein if said audio coding mode is pseudo lossless compression coding, said first to third quantization bit numbers of the audio data before compression are respectively 16 bits, 20 bits and 24 bits, said first to sixth sampling frequencies are respectively 48 KHz, 44.1 KHz, 96 KHz, 88.2 KHz, 192 KHz and 176.4 KHz, a maximum number of said audio channels is 8, and the number of channels is determined by the following equation:

$$N = \frac{Mbr*Ccr}{Fs*Qb};$$

wherein,
   Fs is the sampling frequency (Hz) of the audio data, Qb is the quantization bit number (bits) of the audio data, Mbr is a maximum data transfer rate (Mbps) of the DVD-Audio disk, Ccr is a compression ratio according to a DTS compression coding system, and N is a maximum number of recording channels determined by the maximum data transfer rate, sampling frequency and quantization bit number of the DVD-Audio disk.

26. A DVD-Audio disk comprising:
   a video title set directory; and
   an audio title set directory to store audio data and control data for allowing reproduction of the audio data.

27. The DVD-Audio disk as claimed in claim 26, wherein the control data comprises a logical data structure containing information on the audio data.

28. The DVD-Audio disk as claimed in claim 26, wherein said video title set directory also stores audio data.

29. The DVD-Audio disk as claimed in claim 28, wherein the audio data in said video title set directory has a first sampling frequency no greater than a limit of a DVD-Video standard, and the audio data in said audio title set directory has a second sampling frequency above the limit.

30. The DVD-Audio disk as claimed in claim 28, wherein the audio data in said video title set directory has sampling frequencies of at least one of 44.1 Khz, 48 KHz, 88.2 KHz and 96 KHz and the audio data in said audio title directory has sampling frequencies of at least one of 44.1 Khz, 48 KHz, 88.2 KHz, 96 KHz, 176.4 KHz and 192 KHz.

31. The DVD-Audio disk as claimed in claim 28, wherein the audio data in said video title set directory has a sampling frequency of 96 KHz, and the audio data in said audio title set directory has a sampling frequency of 192 KHz.

32. The DVD-Audio disk as claimed in claim 31, wherein the audio data in said video title set directory has a sampling frequency of 88.2 KHz, and the audio data in said audio title set directory has a sampling frequency of 176.4 KHz.

33. A DVD-Audio disk comprising:
   a data zone to store data to be reproduced; and
   an information zone to store information on said data to be reproduced;
   wherein said information zone includes directories of a video title set (VIDEO_TS) and an audio title set (AUDIO_TS), said AUDIO_TS directory including information on an audio manager (AMG) having information on audio titles; and
   wherein said data zone includes said audio titles each having audio title set information (ATSI) followed by contiguous audio objects (AOBs), said ATSI includes audio stream attributes, each audio stream attribute indicates an audio coding mode, a first, second or third quantization bit number corresponding to the data to be reproduced, a sampling frequency, which is differentiated from first, second, third, fourth, fifth, and sixth sampling frequencies corresponding to the data to be reproduced, at least two of the sampling frequencies being 176.4 khz and 192 khz, and includes decoding algorithm information relating to a number of audio channels of the data to be reproduced, and each of said AOBs includes a plurality of audio packs recorded with audio data corresponding to the decoding algorithm stored in the audio stream attribute.

\* \* \* \* \*